United States Patent
Minamikawa et al.

(10) Patent No.: US 11,685,168 B2
(45) Date of Patent: Jun. 27, 2023

(54) IMAGE FORMING APPARATUS AND COMPUTER-READABLE STORAGE MEDIUM

(71) Applicant: BROTHER KOGYO KABUSHIKI KAISHA, Nagoya (JP)

(72) Inventors: Shunsuke Minamikawa, Nagoya (JP); Kenta Horade, Tokai (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 17/726,022

(22) Filed: Apr. 21, 2022

(65) Prior Publication Data

US 2022/0242134 A1    Aug. 4, 2022

Related U.S. Application Data

(63) Continuation of application No. 17/020,917, filed on Sep. 15, 2020, now Pat. No. 11,396,187, which is a
(Continued)

(30) Foreign Application Priority Data

Dec. 27, 2017    (JP) .................................. 2017-252598

(51) Int. Cl.
  *B41J 2/175*       (2006.01)
  *G06F 3/0481*    (2022.01)
  *B41J 29/13*       (2006.01)

(52) U.S. Cl.
  CPC ......... *B41J 2/17566* (2013.01); *B41J 2/1752* (2013.01); *B41J 2/17509* (2013.01);
(Continued)

(58) Field of Classification Search
  CPC .. G06F 9/453; G06F 3/04842; G06F 11/3476; G06F 8/34; G06F 3/0482; G06F 3/0481; G06F 11/3438
  See application file for complete search history.

(56) References Cited

U.S. PATENT DOCUMENTS 5,315,317 A     5/1994 Terasawa et al.
2002/0005869 A1  1/2002 Locher et al.
(Continued)

FOREIGN PATENT DOCUMENTS

JP    H03-032851 A    2/1991
JP    2002-283591 A  10/2002
(Continued)

OTHER PUBLICATIONS

Canon PRO-6000 Online Manual, Cover page and p. 346, retrieved from URL: http://cdn.cnetcontent.com/a9/b9/a9b957fd-5b5e-4695-9dba-02ca33c8841b.pdf.
(Continued)

*Primary Examiner* — Julian D Huffman
(74) *Attorney, Agent, or Firm* — Scully, Scott, Murphy & Presser, P.C.

(57) ABSTRACT

An image forming apparatus, having a first container with a first compartment, a second container with a second compartment, a recorder, a display, and a controller, is provided. The controller controls the display to display a first screen and a second screen. The first screen contains a first object having a form that reflects an amount of a colorant in the first compartment and a second object having a form that reflects an amount of the colorant in the second compartment. The second screen contains a third object having a form that reflects one of the amount of the colorant in the first compartment, the amount of the colorant in the second
(Continued)

compartment, and a total amount of the colorant in the first compartment and the second compartment.

20 Claims, 22 Drawing Sheets

Related U.S. Application Data continuation of application No. 16/218,607, filed on Dec. 13, 2018, now Pat. No. 10,800,179.

(52) U.S. Cl.
CPC ....... *B41J 2/17513* (2013.01); *B41J 2/17523* (2013.01); *B41J 2/17553* (2013.01); *B41J 29/13* (2013.01); *G06F 3/0481* (2013.01); *B41J 2002/17573* (2013.01); *B41J 2002/17576* (2013.01); *B41J 2002/17589* (2013.01)

(56) References Cited

U.S. PATENT DOCUMENTS

| | | |
|---|---|---|
| 2006/0007254 A1 | 1/2006 | Tanno et al. |
| 2008/0204488 A1 | 8/2008 | Usui |
| 2013/0100473 A1 | 4/2013 | Ono |
| 2013/0249988 A1 | 9/2013 | Mihara |
| 2015/0224783 A1 | 8/2015 | Koganehira et al. |
| 2016/0200115 A1 | 7/2016 | Niiyama |
| 2020/0094571 A1 | 3/2020 | Hwang et al. |

FOREIGN PATENT DOCUMENTS

| | | | | |
|---|---|---|---|---|
| JP | 2005-1149 A | | 1/2005 | |
| JP | 2005001149 A | * | 1/2005 | |
| JP | 2005-96250 A | | 4/2005 | |
| JP | 2008-213162 A | | 9/2008 | |
| JP | 2013-092816 A | | 5/2013 | |
| JP | 2013-159070 A | | 8/2013 | |
| KR | 20110003280 A | * | 1/2011 | ............. G06F 9/453 |
| WO | WO-2014034110 A1 | * | 3/2014 | .......... B41J 2/17509 |

OTHER PUBLICATIONS

"Professional Fine Art Photographers Prepare to Obsess as Canon U.S.A. Announces New Large-Format imagePROGRAF Inkjet Printer", Press Release, Melville, N.Y., Jul. 20, 2017.

Japanese Notice of Reasons for Refusal dated Nov. 2, 2021 received in Japanese Application No. 2017-252598, together with an English-language translation.

Japanese Decision of Refusal dated Jan. 11, 2022 received in Japanese Application No. 2017-252598, together with an English-language translation.

* cited by examiner

IMAGE FORMING APPARATUS AND COMPUTER-READABLE STORAGE MEDIUM

CROSS REFERENCE TO RELATED APPLICATIONS

This application is a continuation of U.S. patent application Ser. No. 17/020,917, filed Sep. 15, 2020, which is a continuation of U.S. patent application Ser. No. 16/218,607, filed Dec. 13, 2018, now U.S. Pat. No. 10,800,179, which claims priority under 35 U.S.C. § 119 from Japanese Patent Application No. 2017-252598, filed Dec. 27, 2017, the entire subject matter of which are incorporated herein by reference.

BACKGROUND

Technical Field

The present disclosure is related to an aspect of an image forming apparatus having two (2) containers to store a colorant.

Related Art

An image forming apparatus may indicate an amount of a colorant, such as ink and toner, remaining in a container, on a screen of a display device. A user may view the screen and recognize the remainder amount of the colorant. For example, a cartridge being the container to store the colorant may be exchangeable with another cartridge, and the user viewing the remainder amount of the colorant may recognize that the cartridge should be replaced with a new cartridge or should be refilled soon.

Meanwhile, an inkjet printer having two (2) containers to store a colorant, which are a main tank and a subsidiary tank, is known. The colorant may be stored in the main tank and flow into the subsidiary tank by effects of, for example, hydraulic difference and gravity.

SUMMARY

The image forming apparatus having a display device may display various types of information in a standby screen, including, not only the remainder amount of the colorant, but also, for example, functions available from the image forming apparatus. In this regard, the standby screen may not necessarily display detailed information concerning the remainder amount of the colorant but may display brief information to show a condition of the colorant, and the detailed information may be displayed in a different specific screen to indicate the remainder amount of the colorant.

The present disclosure is advantageous in that an image forming apparatus having a display and multiple containers to store a colorant, by which a user may recognize a remainder of the colorant in the containers easily, is provided.

According to an aspect of the present disclosure, an image forming apparatus, including a first container having a first compartment, the first compartment being configured to store a colorant; a second container having a second compartment, the second compartment being configured to be connected with the first container; a recorder connected with the second container; a display; and a controller, is provided. The controller is configured to control the display to display a first screen containing a first object, the first object having a form that reflects an amount of the colorant stored in the first compartment in the first container, and a second object, the second object having a form that reflects an amount of the colorant stored in the second compartment in the second container; and control the display to display a second screen containing a third object, the third object having a form that reflects one of the amount of the colorant stored in the first compartment in the first container; the amount of the colorant stored in the second compartment in the second container; and a total amount of the colorant stored in the first compartment in the first container and the colorant stored in the second compartment in the second container.

According to another aspect of the present disclosure, a non-transitory computer readable storage medium storing computer readable instructions that are executable by a computer in an image forming apparatus, the image forming apparatus having a first container including a first compartment, the first compartment being configured to store a colorant, a second container including a second compartment, the second compartment being configured to be connected with the first container, a recorder connected with the second container, and a display, is provided. The computer readable instructions, when executed by the computer, causing the computer to determine a first remainder value reflecting an amount of the colorant stored in the first compartment in the first container; determine a second remainder value reflecting an amount of the colorant stored in the second compartment in the second container; control the display to display a first screen containing a first object, the first object having a form that reflects the determined first remainder value, and a second object, the second object having a form that reflects the determined second remainder value; and control the display to display a second screen containing a third object, of which displayable area is smaller than a total displayable area in the first screen, the total displayable area including a displayable area for the first object and a displayable area for the second object. The third object has a form that reflects one of the first remainder value, the second remainder value, and a sum of the first remainder value and the second remainder value.

According to another aspect of the present disclosure, an image forming apparatus, including a first container having a first compartment, the first compartment being configured to store a colorant; a second container having a second compartment, the second compartment being configured to be connected with the first container; a recorder connected with the second container; a display; and a controller, is provided. The controller is configured to control the display to display a first screen containing a first object, the first object having a form that reflects an amount of the colorant stored in the second compartment in the second container; and control the display to display a second screen containing a second object, the second object having a form that reflects one of an amount of the colorant stored in the first compartment in the first container, an amount of the colorant stored in the second compartment in the second container, and a total amount of the colorant stored in the first compartment in the first container and the second compartment in the second container.

BRIEF DESCRIPTION OF THE ACCOMPANYING DRAWINGS

FIG. 1A is a perspective exterior view of a printer 10 according to a first embodiment of the present disclosure with a cover 87 at a covering position. FIG. 1B is a perspective exterior view of the printer 10 according to the first embodiment of the present disclosure with the cover 87 at an exposing position.

Figure 5:
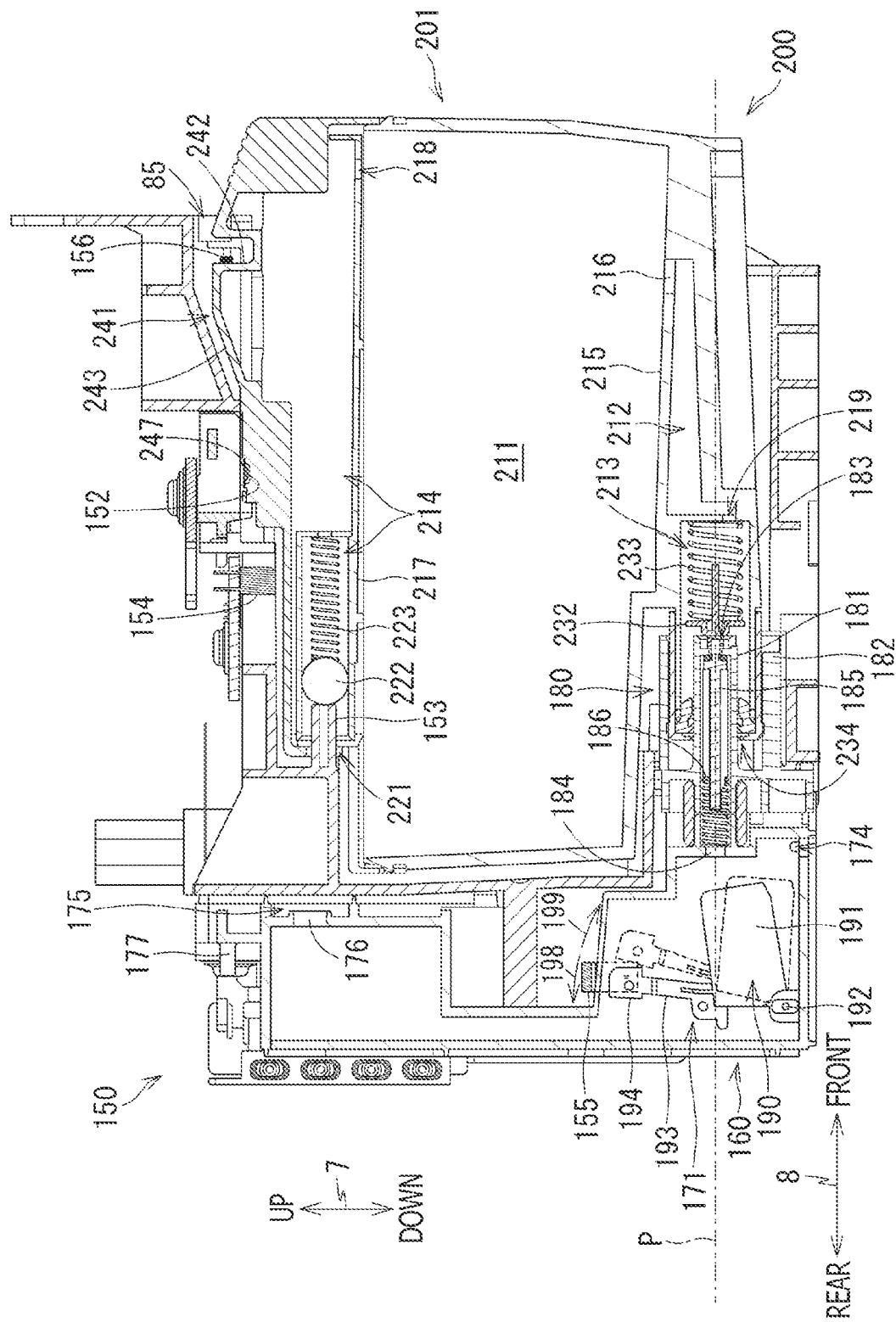

FIG. 5 is a cross-sectional view of the attachment case 150 with the cartridge 200 attached thereto in the printer 10 according to the first embodiment of the present disclosure.

Figure 6:
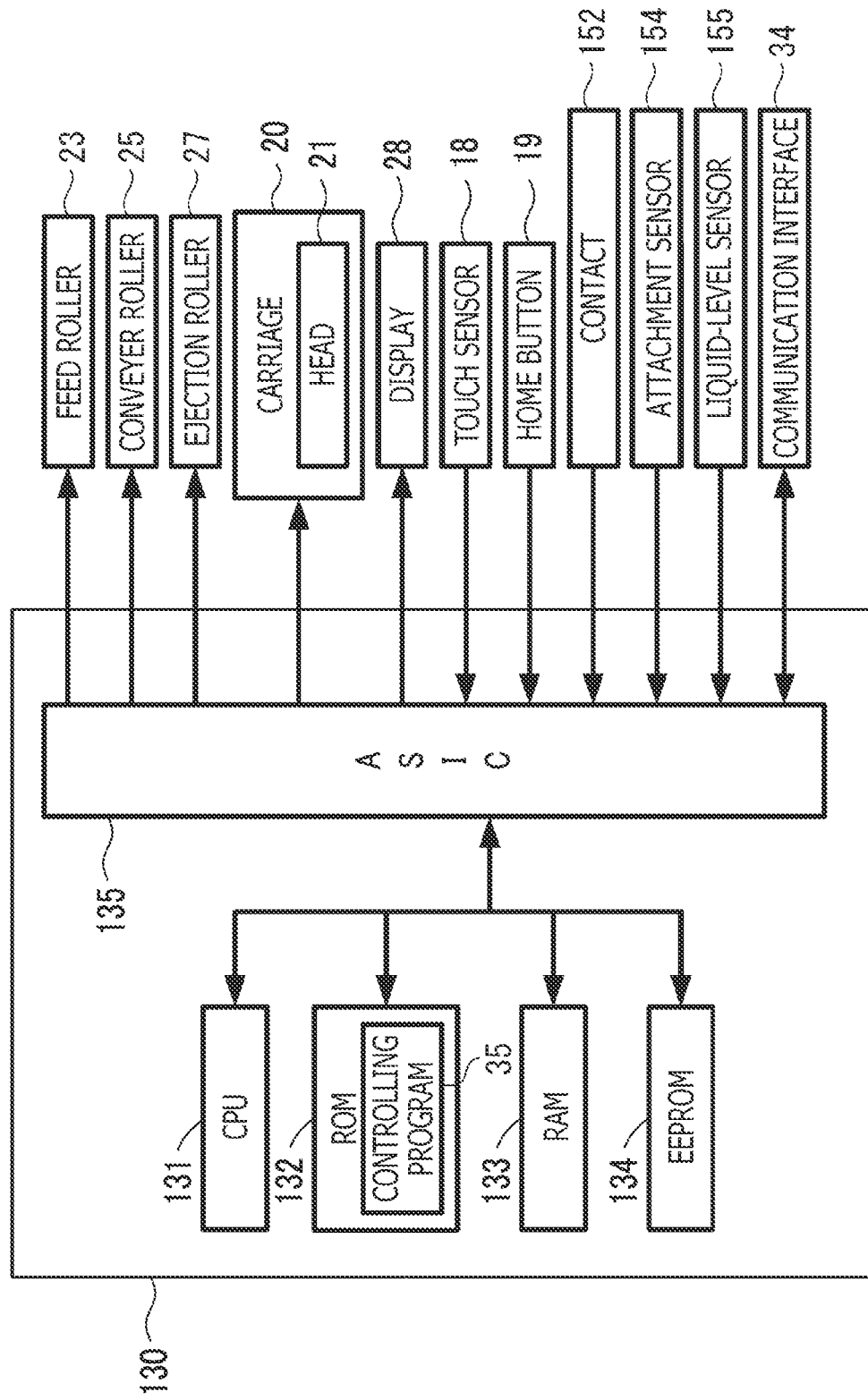

FIG. 6 is a block diagram to illustrate a functional configuration in the printer 10 according to the first embodiment of the present disclosure.

Figure 7:
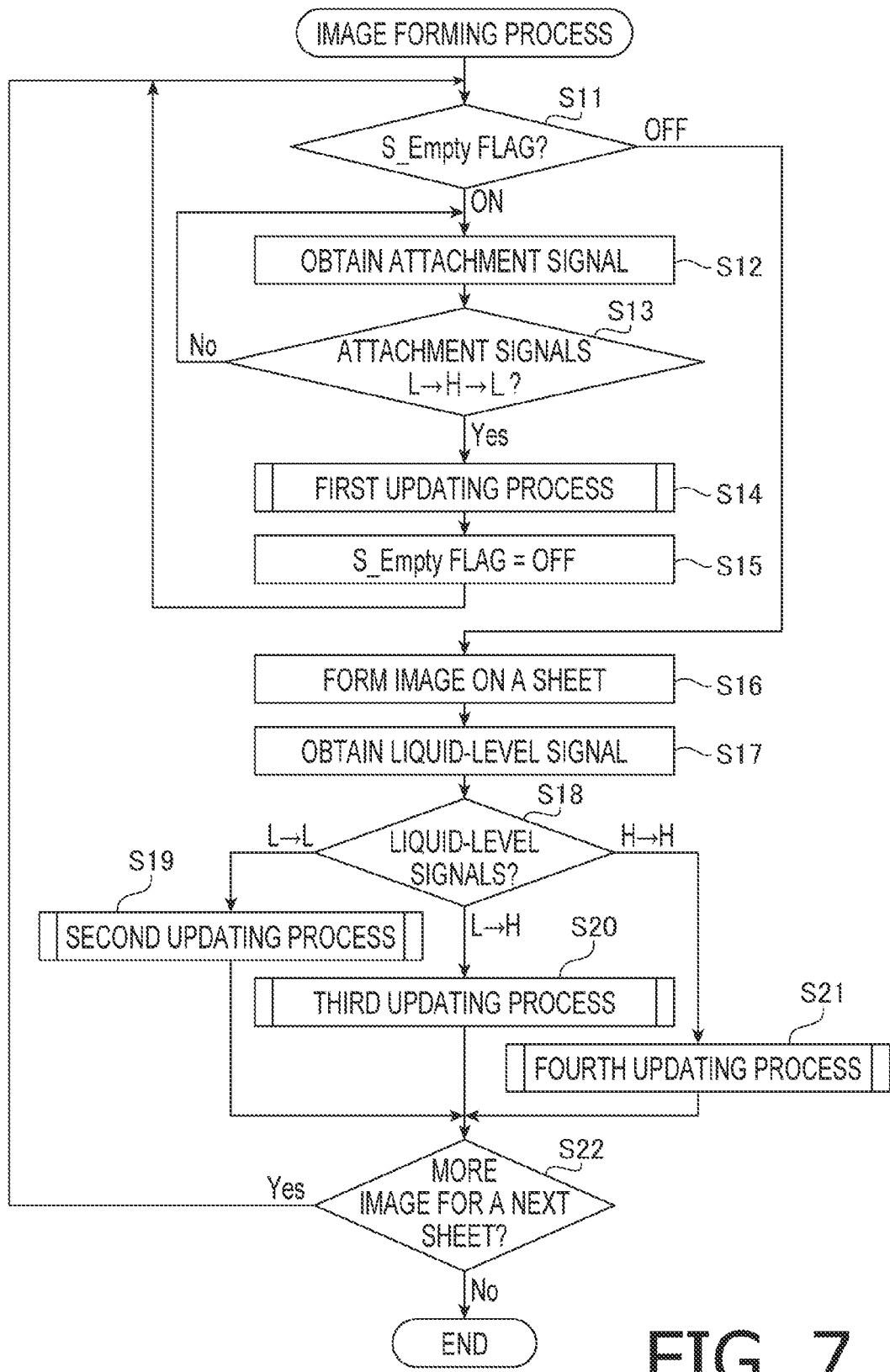

FIG. 7 is a flowchart to illustrate flows of steps in an image forming process to be conducted in the printer 10 according to the first embodiment of the present disclosure.

FIGS. 8A-8D are flowcharts to illustrate flows of steps in first, second, third, and fourth updating processes to be conducted in the printer 10 according to the first embodiment of the present disclosure.

Figure 9A:
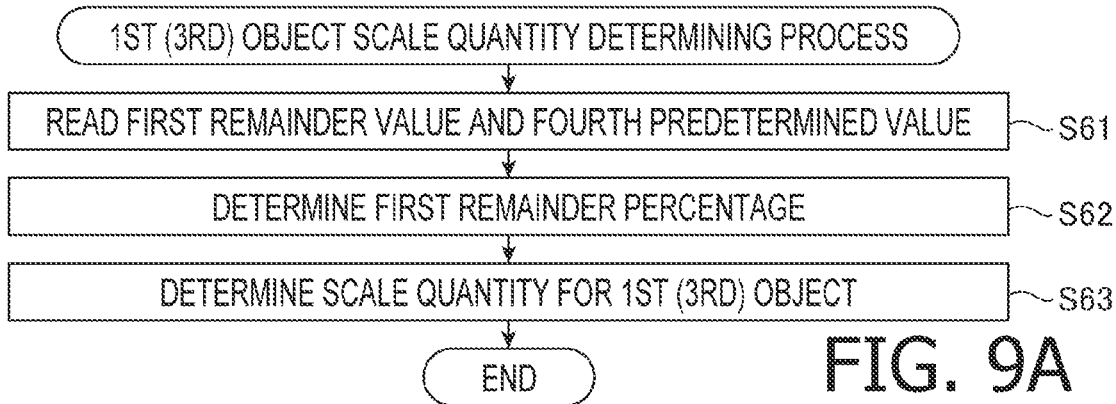
Figure 9B:
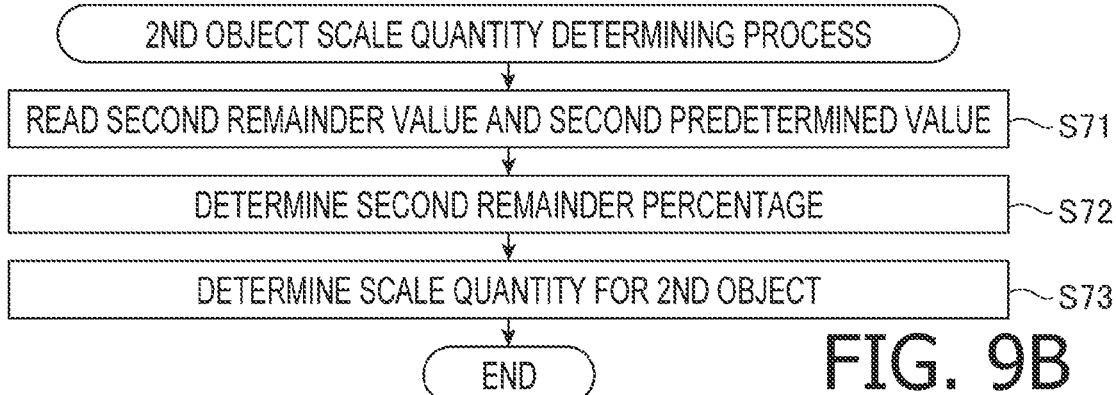
Figure 9C:
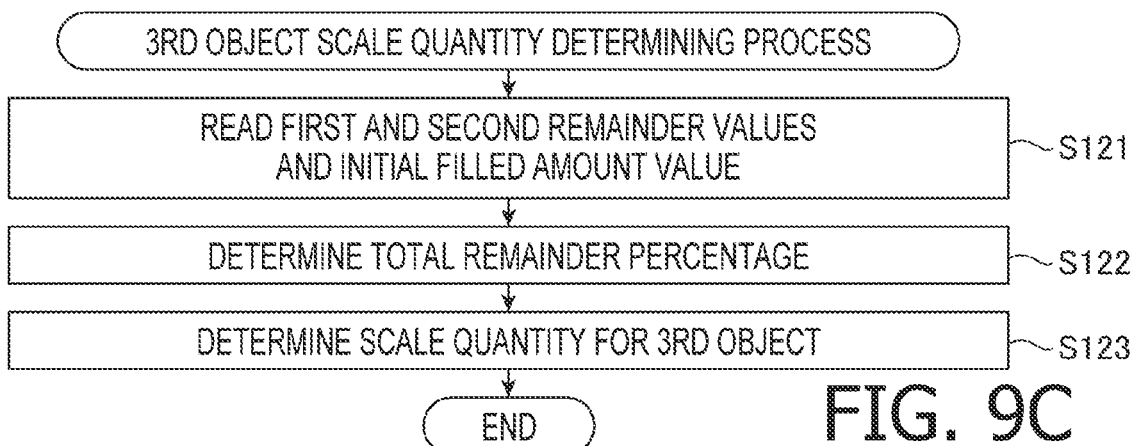
Figure 9D:
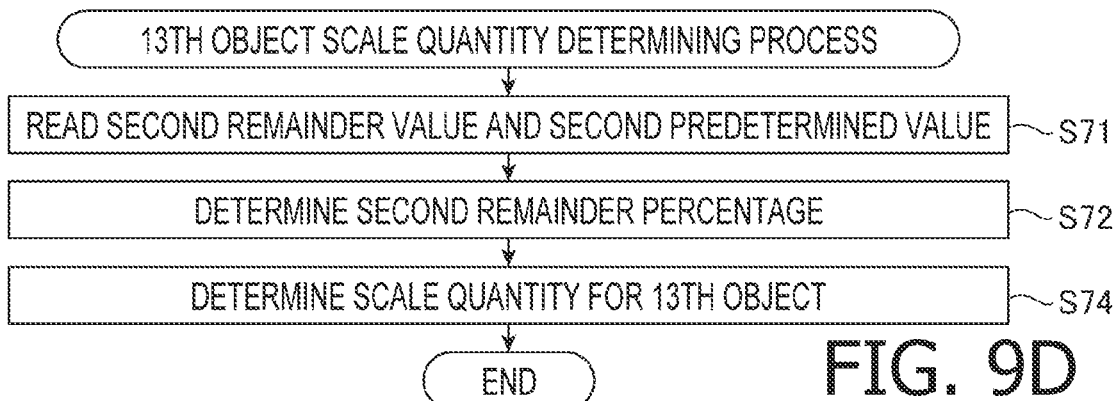

FIGS. 9A-9B are flowcharts to illustrate flows of steps in first and second object scale quantity determining processes to be conducted in the printer 10 according to the first embodiment of the present disclosure. FIG. 9C is a third object scale quantity determining process to be conducted in the printer 10 according to a second modified example of the first embodiment of the present disclosure. FIG. 9D is a thirteenth object scale quantity determining process to be conducted in a printer 100 according to a second embodiment of the present disclosure.

Figure 10:
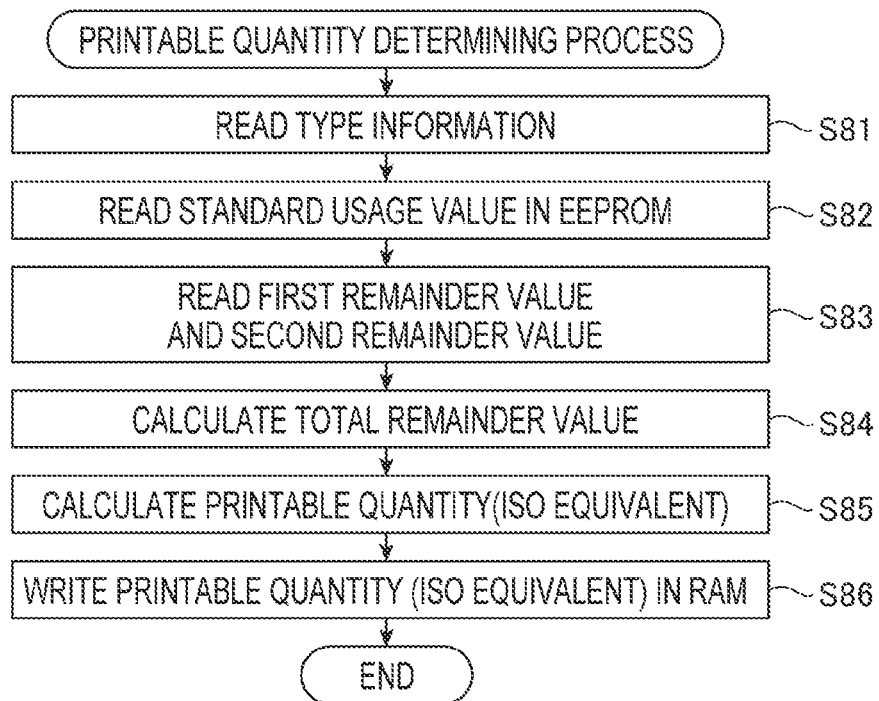

FIG. 10 is a flowchart to illustrate a flow of steps in a printable quantity determining process to be conducted in the printer 10 according to the first embodiment of the present disclosure.

Figure 11A:
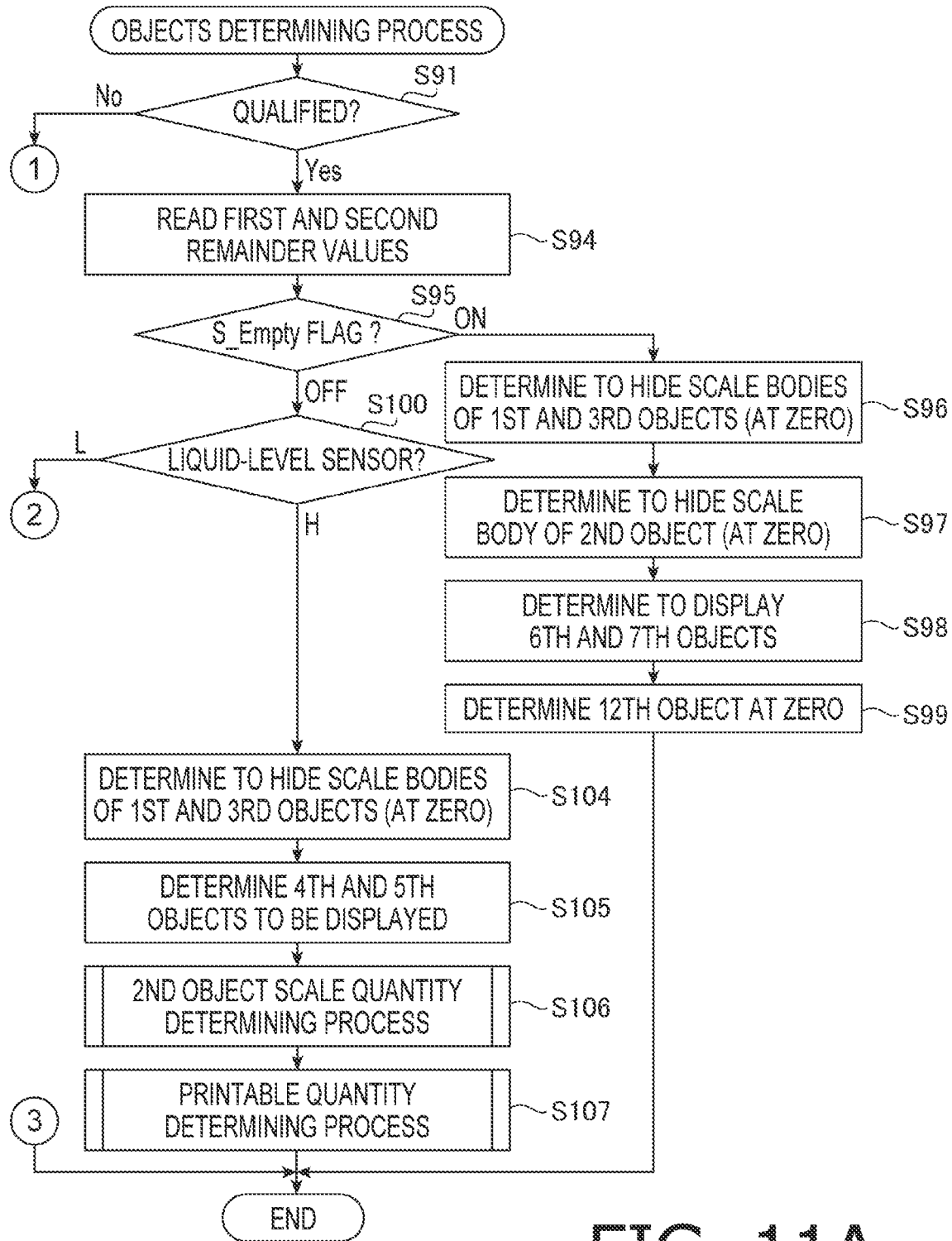
Figure 11B:
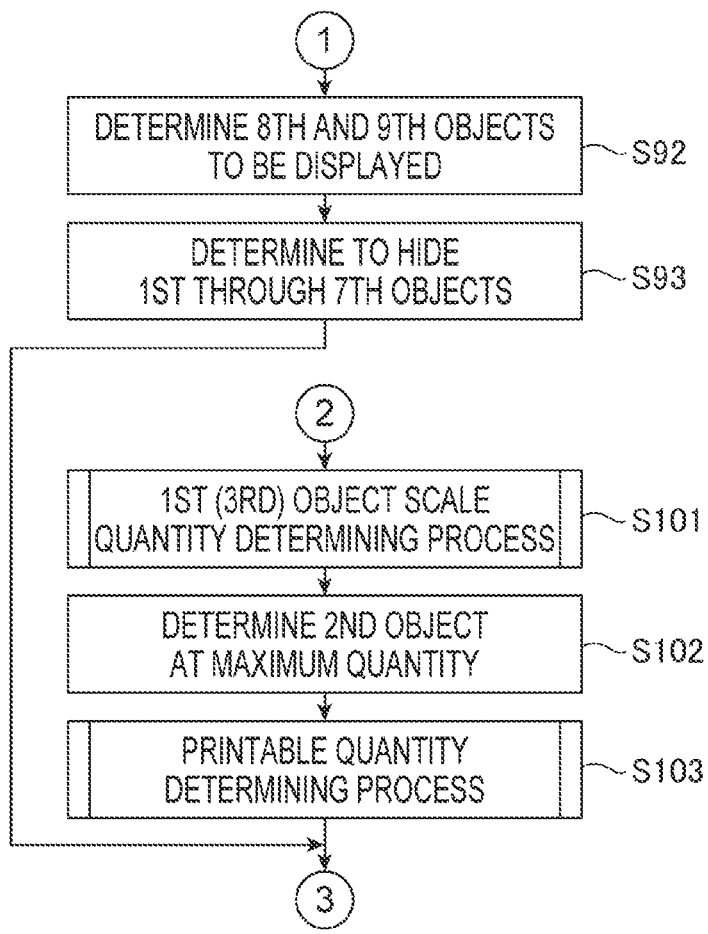

FIGS. 11A-11B are a flowchart to illustrate flows of steps in an objects determining process to be conducted in the printer 10 according to the first embodiment of the present disclosure.

Figure 12:
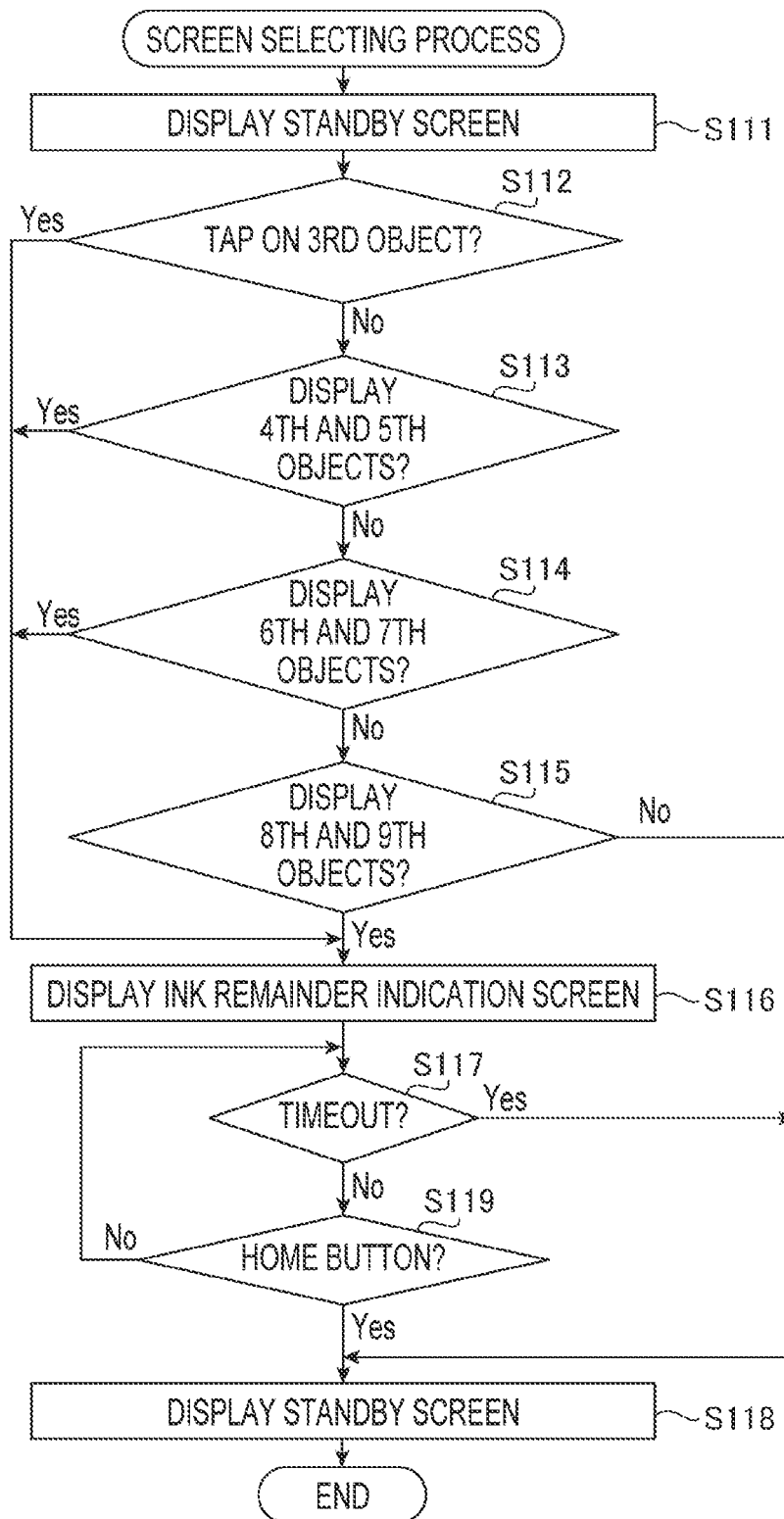

FIG. 12 is a flowchart to illustrate flows of steps in a screen selecting process to be conducted in the printer 10 according to the first embodiment of the present disclosure.

Figure 13:
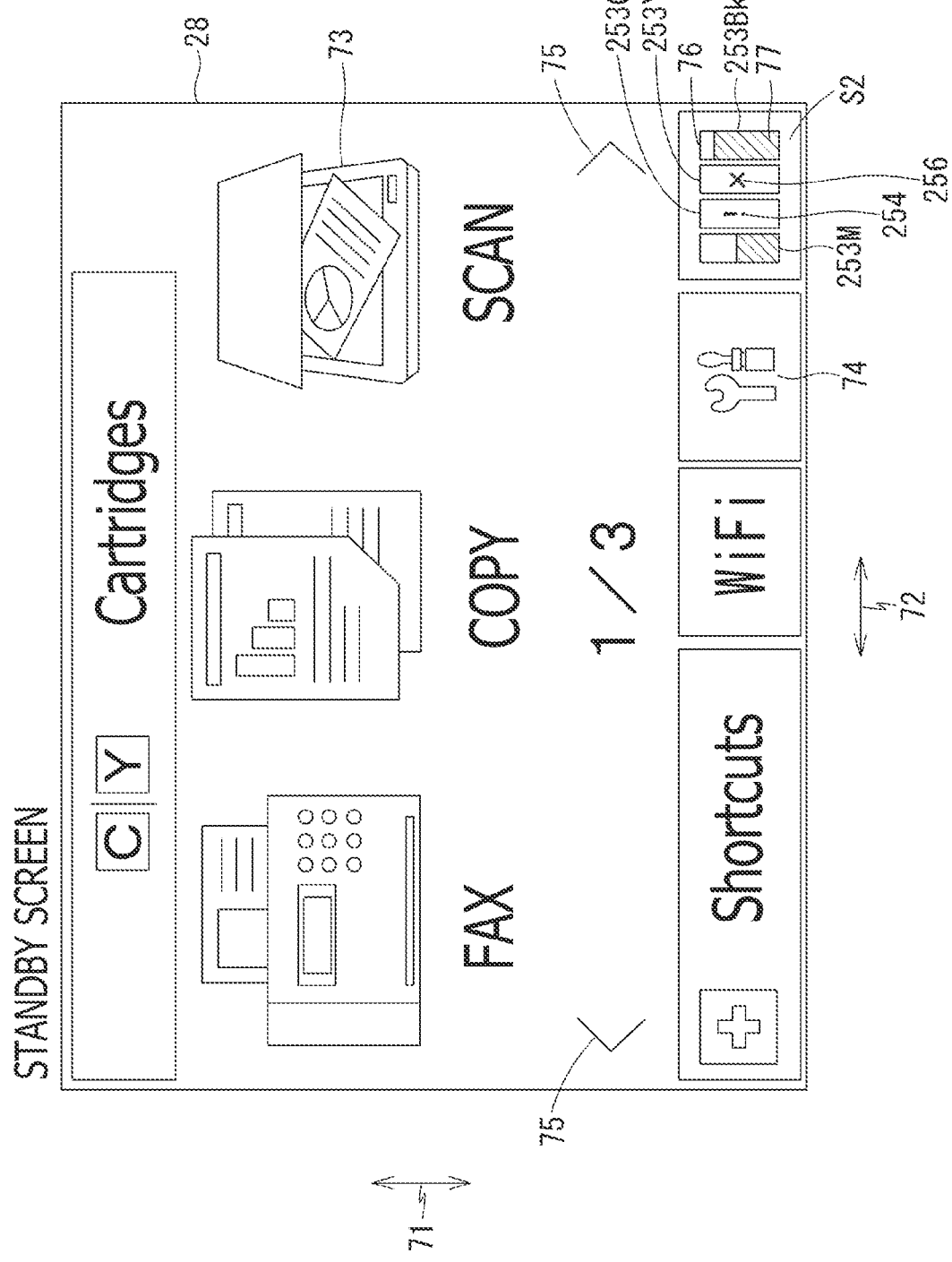

FIG. 13 is an illustrative view of a standby screen to be displayed in a display 28 in the printer 10 according to the first embodiment of the present disclosure.

Figure 14:
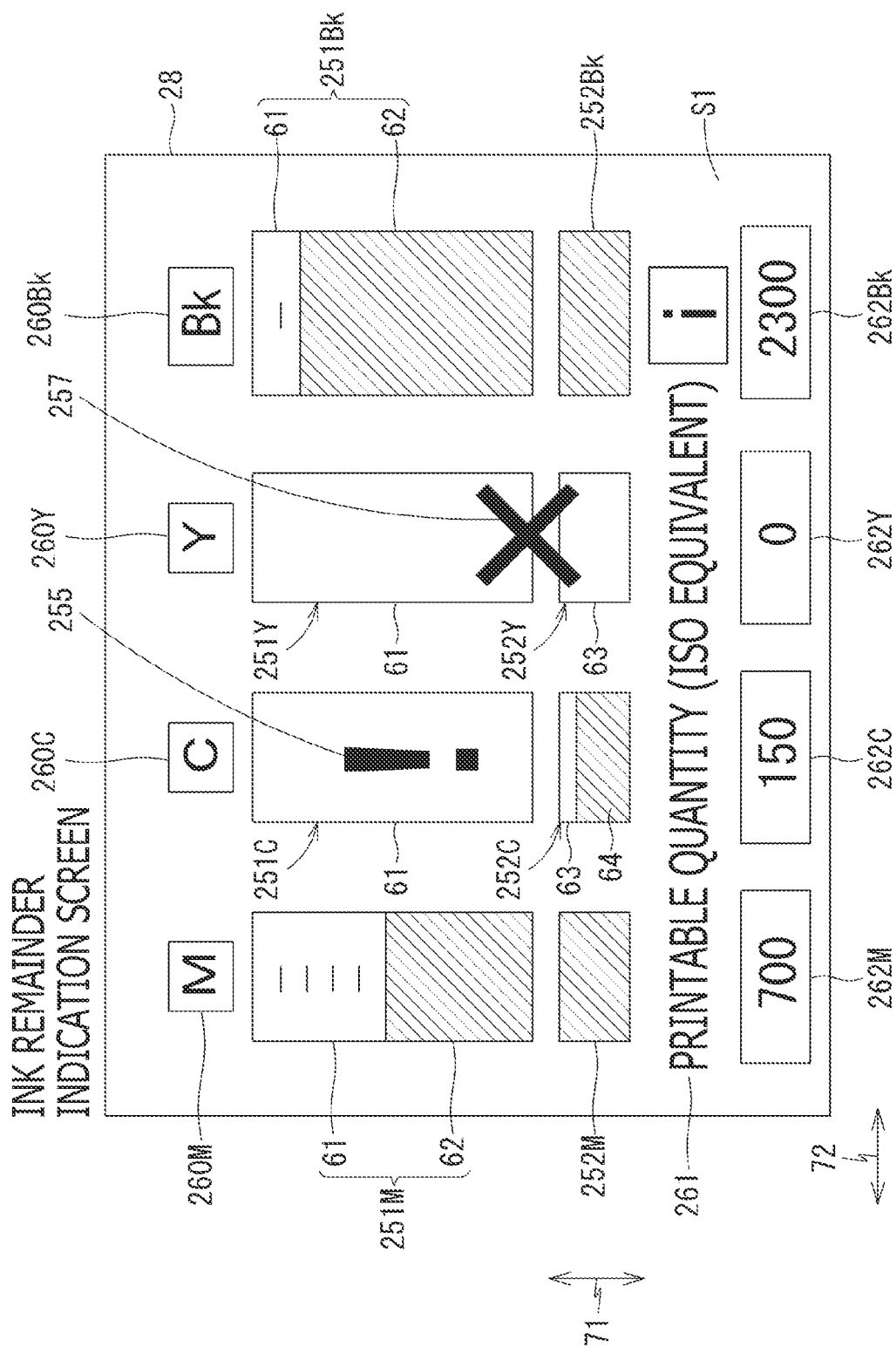

FIG. 14 is an illustrative view of an ink remainder indication screen to be displayed in the display 28 in the printer 10 according to the first embodiment of the present disclosure.

Figure 15A:
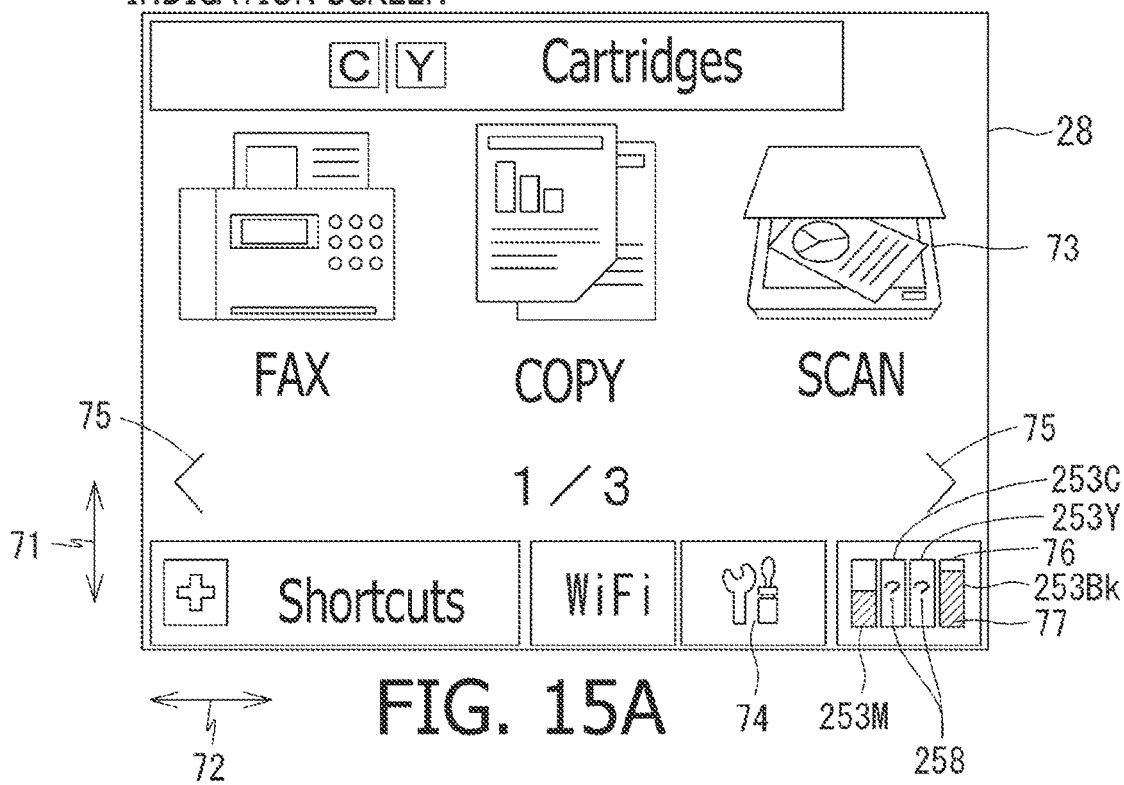
Figure 15B:
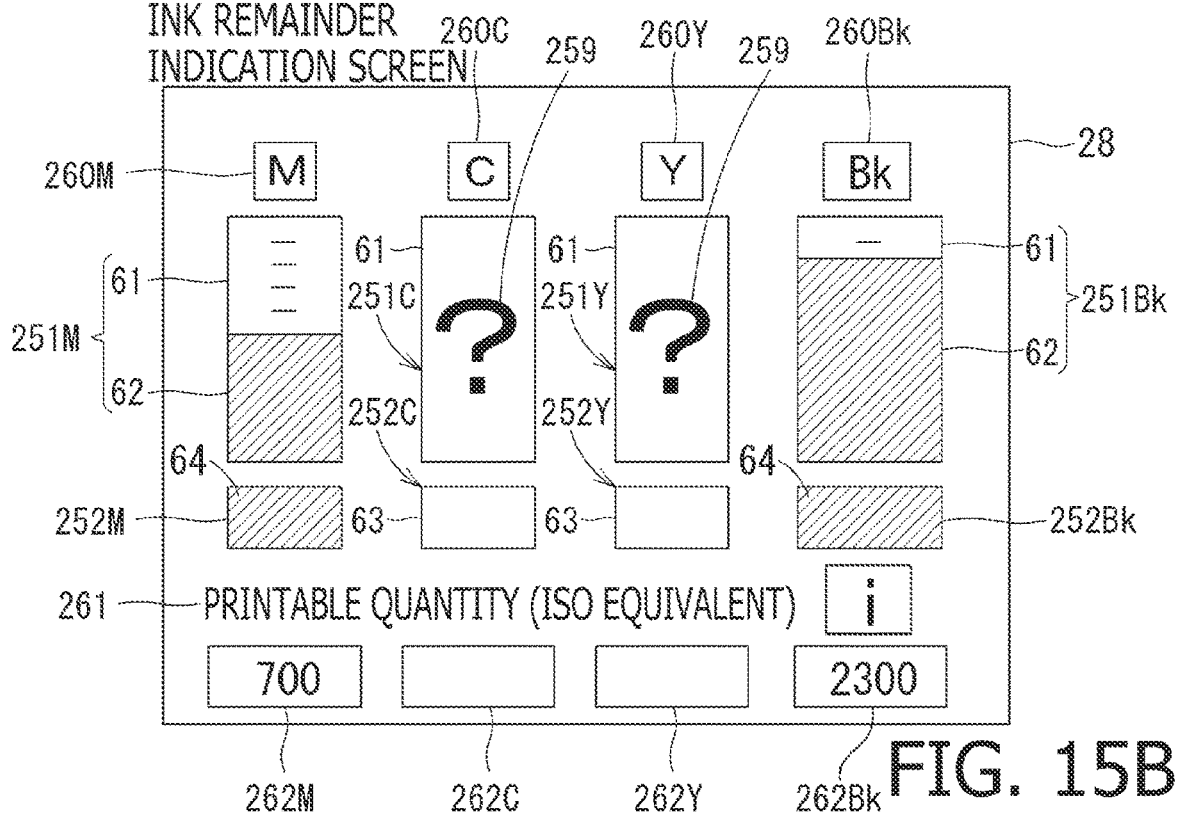

FIG. 15A illustrates a standby screen to be displayed in the display 28 in the printer 10 according to the first embodiment of the present disclosure. FIG. 15B illustrates an ink remainder indication screen to be displayed in the display 28 in the printer 10 according to the first embodiment of the present disclosure.

Figure 16A:
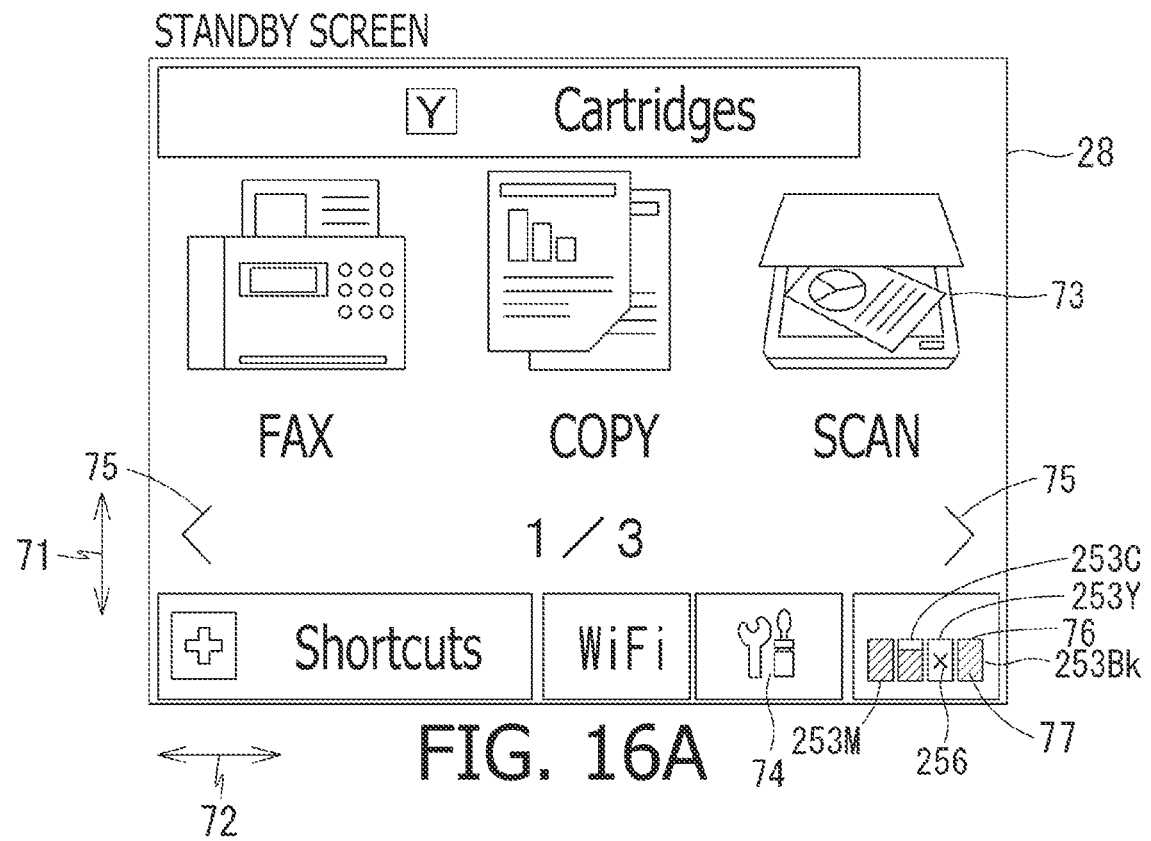
Figure 16B:
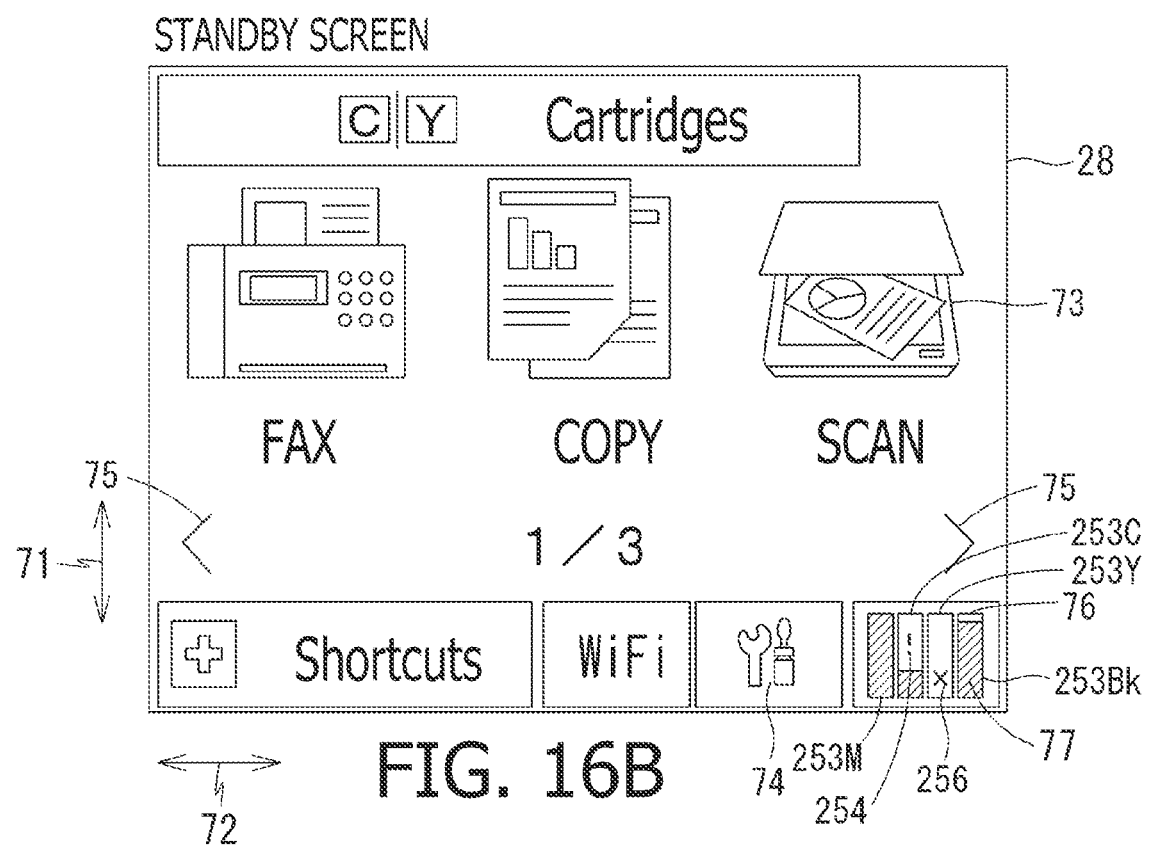

FIG. 16A illustrates a standby screen to be displayed in the display 28 in the printer 10 according to a first modified example of the first embodiment of the present disclosure. FIG. 16B illustrates a standby screen to be displayed in the display 28 in the printer 10 according to the second modified example of the first embodiment of the present disclosure.

Figure 17:
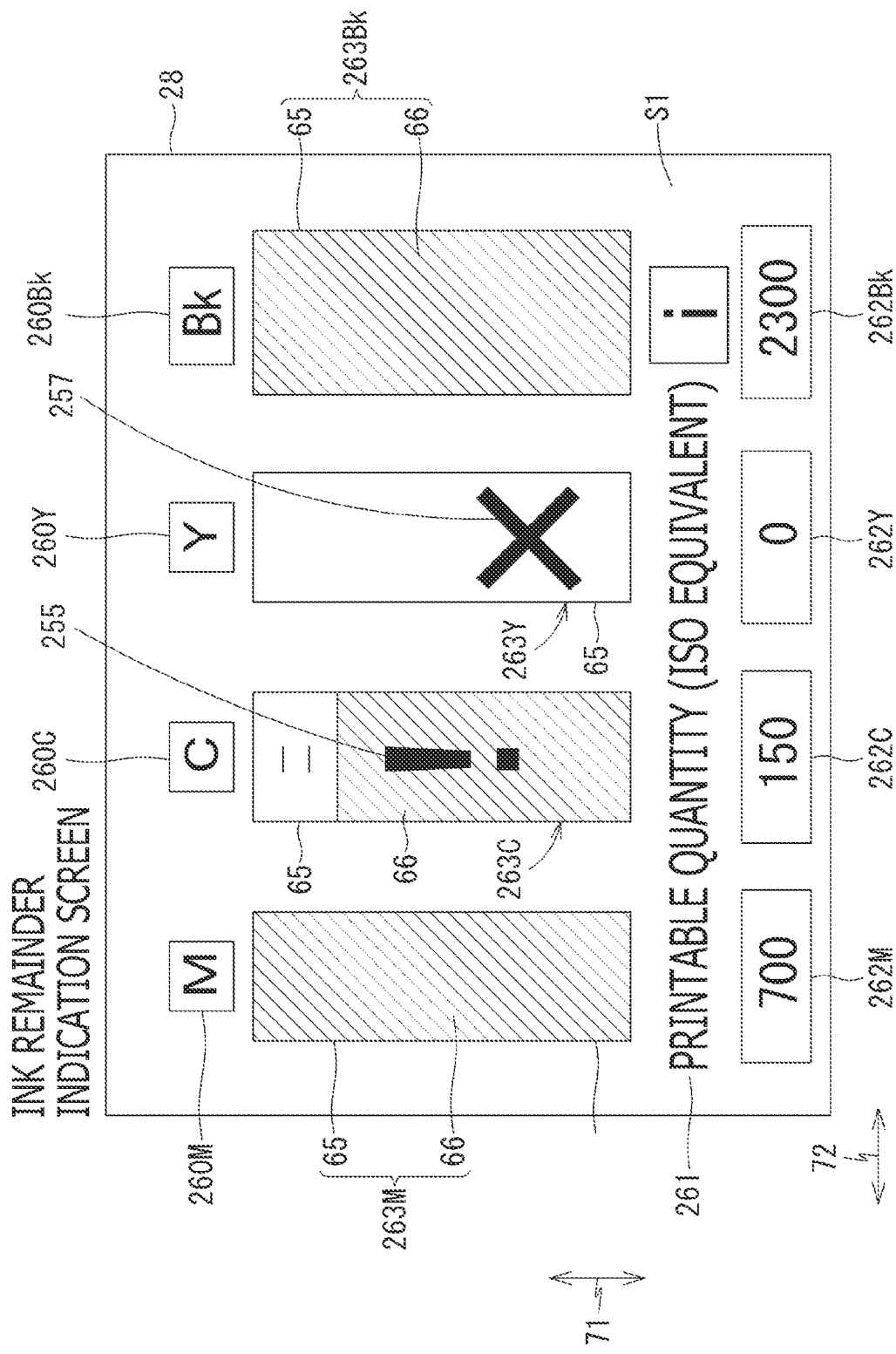

FIG. 17 illustrates an ink remainder indication screen to be displayed in a display device in a printer according to a second embodiment of the present disclosure.

Figure 18:
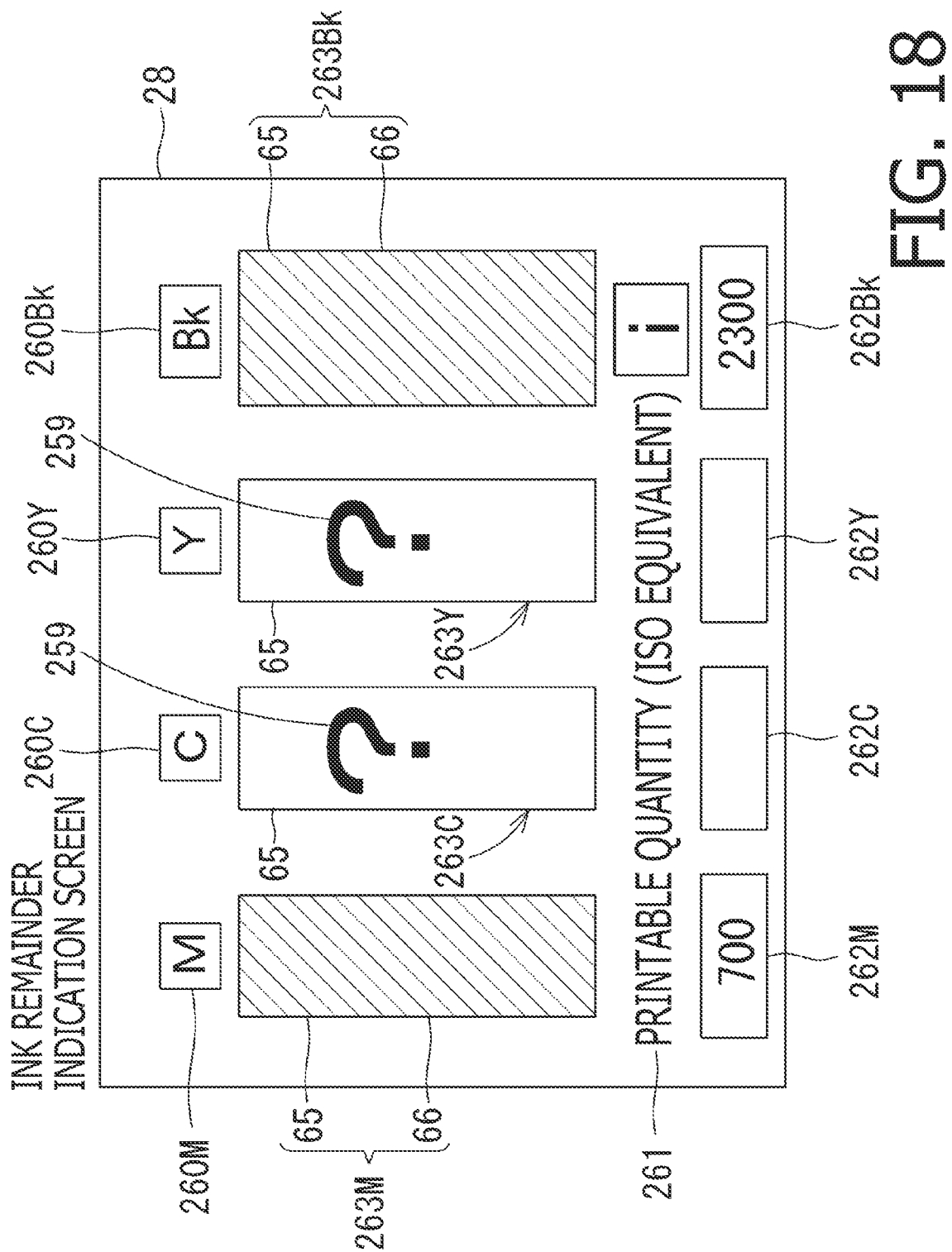

FIG. 18 illustrates an ink remainder indication screen to be displayed in a display device in a printer according to the second embodiment of the present disclosure.

Figure 19A:
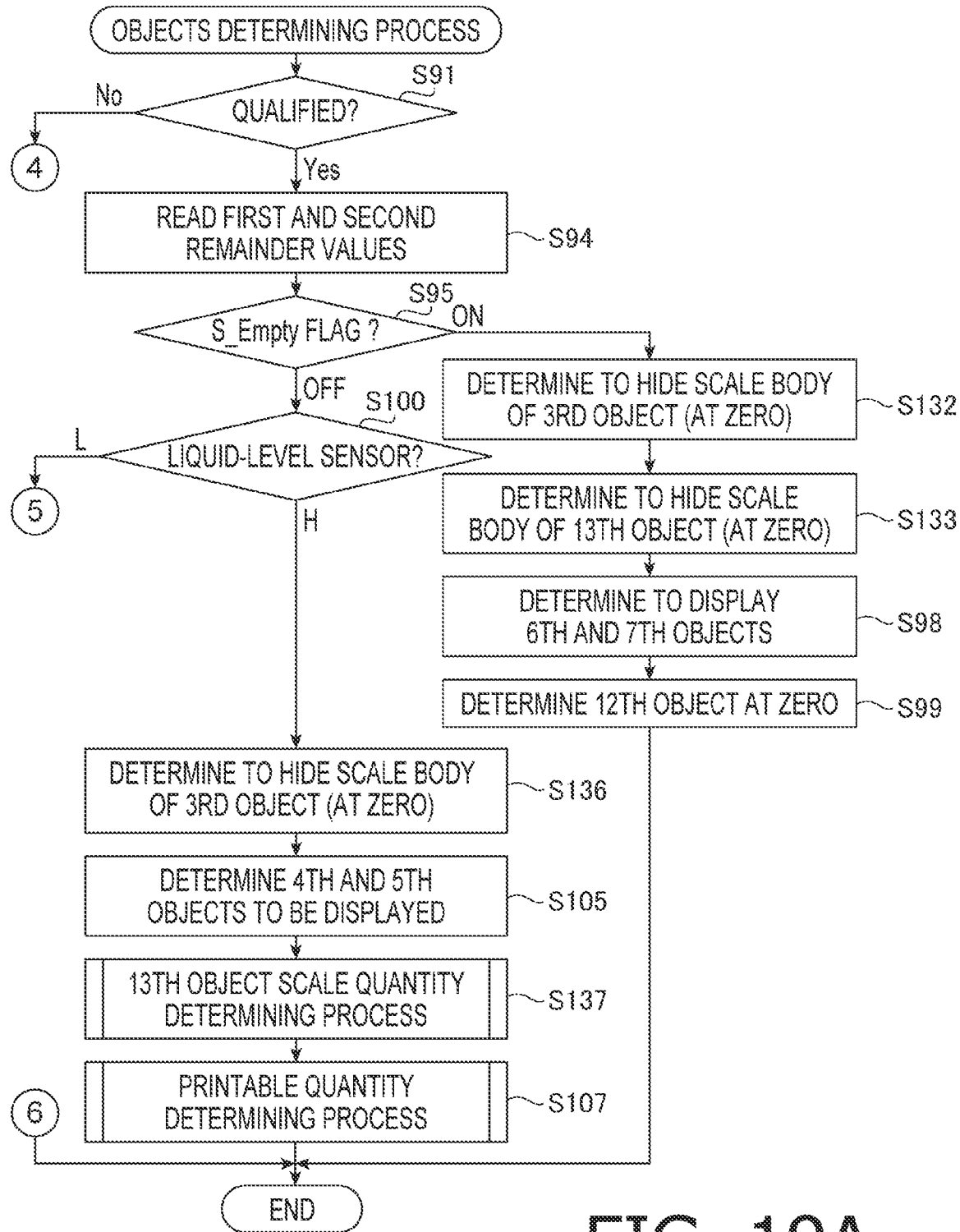
Figure 19B:
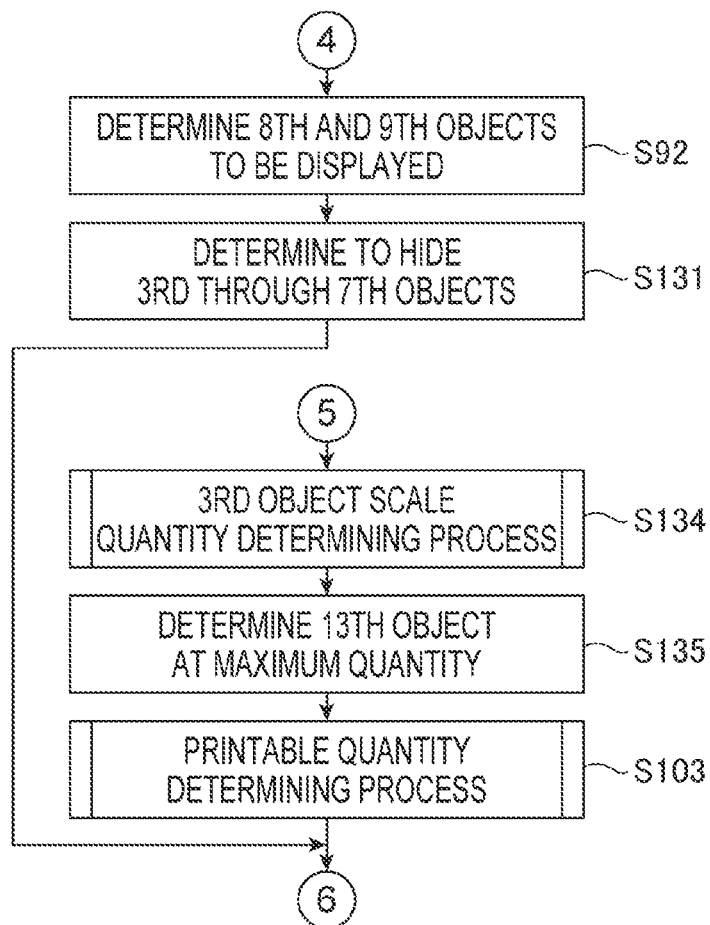

FIGS. 19A-19B are a flowchart to illustrate flows of steps in an objects determining process to be conducted in the printer 10 according to the second embodiment of the present disclosure.

DETAILED DESCRIPTION

Hereinafter, exemplary embodiments according to the present disclosure will be described in detail with reference to the accompanying drawings. It is noted that various connections may be set forth between elements in the following description. These connections in general and, unless specified otherwise, may be direct or indirect and that this specification is not intended to be limiting in this respect. For example, an order to process steps in a flowchart described below may not necessarily be fixed but may be altered within a scope of the present invention.

In the following description, positional relation within a printer 10 and each part or item included in the printer 10 will be mentioned on basis of a user's position to use the printer 10 placed on a horizontal surface, as indicated by the bi-directionally pointing arrows in some of the drawings. For example, in FIG. 1A, a vertical axis between an upper side and a lower side in the drawing may be defined as a vertical direction 7. While a side, on which an opening 13 is arranged, is defined as a front side to the user, a horizontal axis between the front side and a rear side opposite from the front side may be defined as a front-rear direction 8. Further, a horizontal axis between a right-hand side and a left-hand side to the user when the user faces toward the front side of the printer 10 may be defined as a widthwise direction 9. The vertical direction 7, the front-rear direction 8, and the widthwise direction 9 intersect orthogonally to one another.

First Embodiment

Overall Configuration of the Printer 10

The printer 10 may form images on sheets in an inkjet recording technique. The printer 10 has a body 14, which is in an approximate shape of a rectangular box. The printer 10 may not necessarily be a single-functioned printer but may be a multifunction device having other functions such as a facsimile transmission function, a scanning function, and a copying function.

On a front side of the body 14, arranged is a display 28, which will be described further below.

Figure 1A:
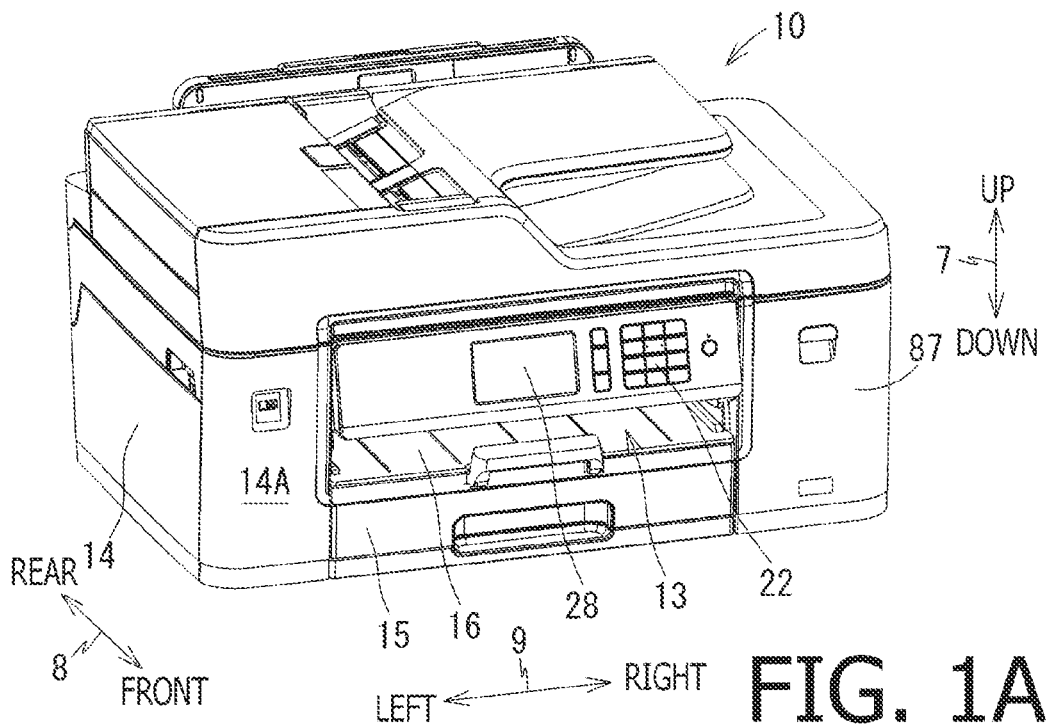
Figure 1B:
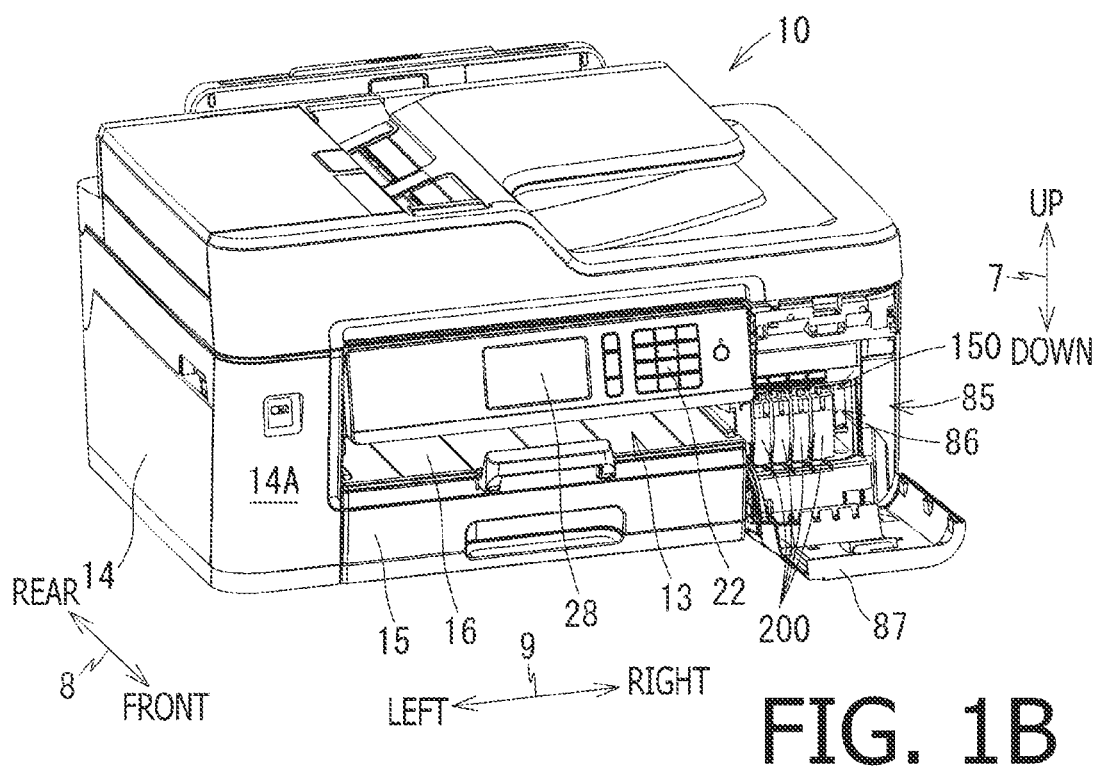
Figure 2:
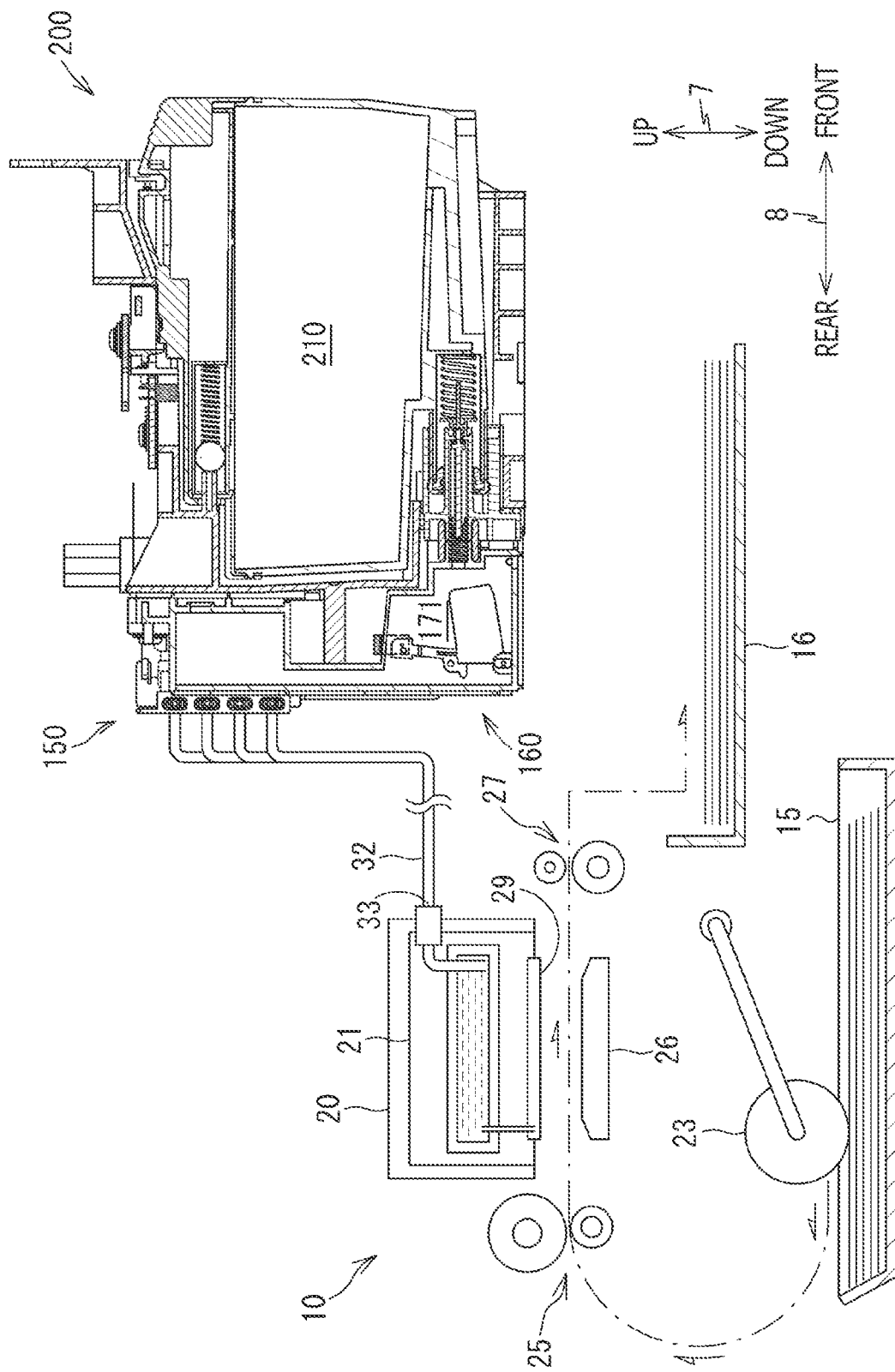
FIG. 2 is an illustrative cross-sectional view of the printer 10 according to the first embodiment of the present disclosure.

In the body 14, as shown in FIGS. 1A-1B and 2, arranged are a feeder tray 15, a feed roller 23, a conveyer roller 25, a head 21 with a plurality of nozzles 29, a platen 26 arranged to face toward the head 21, an ejection roller 27, an ejection tray 16, an attachment case 150, and a tube 32. To the attachment case 150, a cartridge 200 may be detachably attached. The cartridge 200 attached to the attachment case 150 is connected with the head 21 through the tube 32.

The printer 10 may drive the feed roller 23 and the conveyer roller 25 to rotate and convey a sheet loaded in the feeder tray 15 to a position of the platen 26. The printer 10 controls the head 21 to discharge ink, which may be supplied from the cartridge 200 attached to the attachment case 32 through the tube 32, from the nozzles 29. Thus, the ink discharged from the nozzles 26 may land on the sheet and record an image on the sheet. The printer 10 may drive the ejection roller 27 to eject the sheet with the image formed thereon at the ejection tray 16.

The head 21 is mounted on a carriage 20, which reciprocates in a main scanning direction. The main scanning direction extends in a direction of depth in FIG. 2 and intersects with a conveying direction, in which the sheet may be conveyed by the conveyer roller 25. The carriage 20 may be moved in the main scanning direction by a driving force from a motor (not shown). The printer 10 may control the conveyer roller 25 to pause and control the carriage 20 to move in the main scanning direction and the head 21 to discharge the ink from the nozzles 29. Thereby, a row of image may be recorded in a linear path on the sheet that faces with the head 21 while the head 21 moves in the main scanning direction. The linear path faces with the head 21 while the head 21 moves in the main scanning direction. The printer 10 may further control the conveyer roller 25 to convey the sheet for a predetermined amount so that a next linear path in the sheet may face with the head 21 and another row of image may be recorded in the next linear path. Operations of recording a row of image and conveying the sheet for a next linear path may be repeated alternately for a plurality of times to form an image on the sheet.

Cover 87

As shown in FIGS. 1A-1B, on a front face 14A of the body 14, at a rightward area, formed is an opening 85. The body 14 has a cover 87. The cover 87 is pivotable between a covering position, in which the opening 85 is closed (see FIG. 1A), and an exposing position, in which the opening 85 is exposed (see FIG. 1B). The cover 87 may be pivotably supported by, for example, a lower edge of the body 14, to pivot about a pivot axis, which extends in the widthwise direction 9. Inside the body 14, in an attachment cavity 86, which continues from the opening 85 in the front-rear direction, arranged is the attachment case 150.

Attachment Case 150

Figure 3:
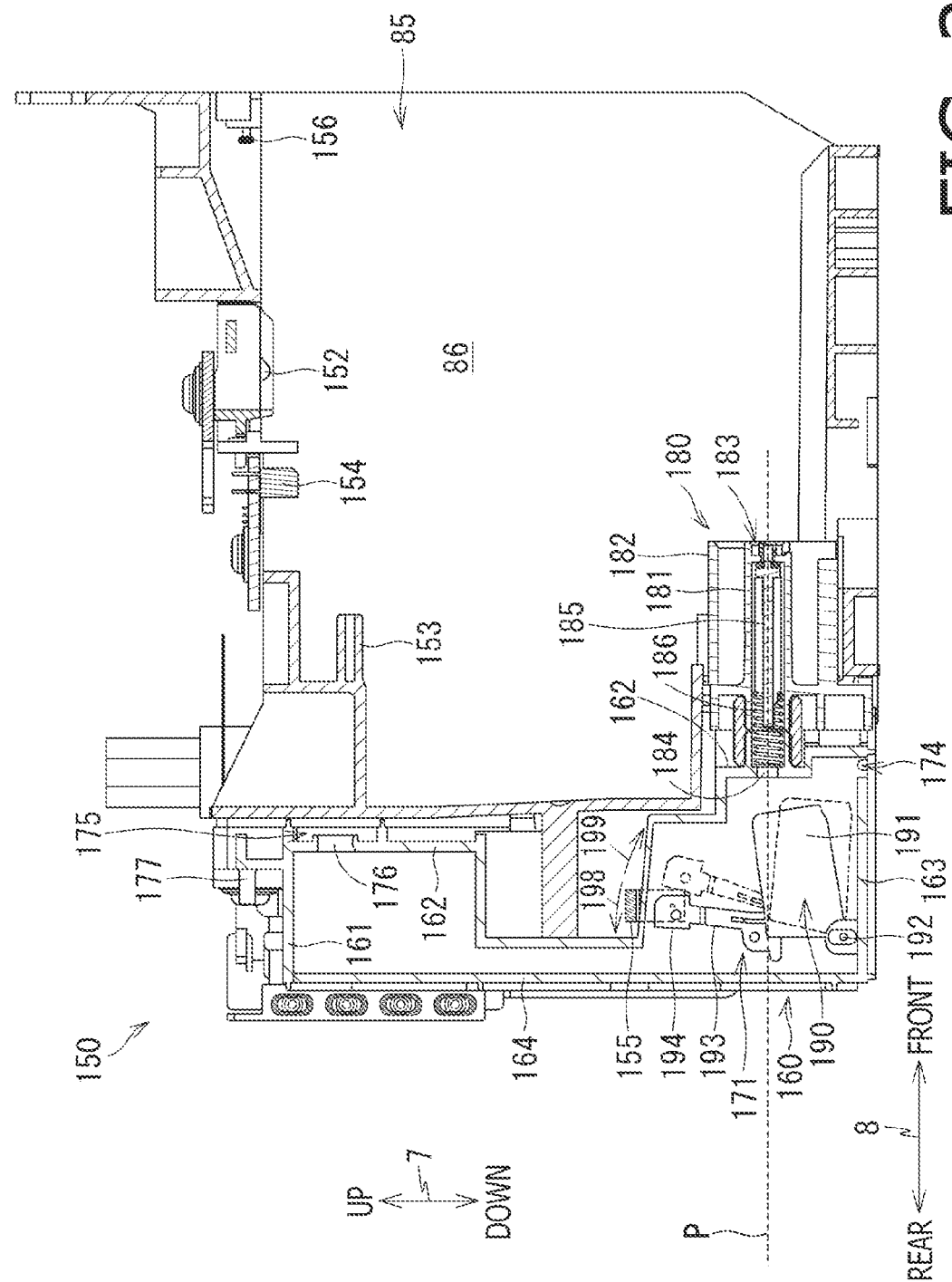
FIG. 3 is a cross-sectional view of an attachment case 150 in the printer 10 according to the first embodiment of the present disclosure.

The attachment case 150 as shown in FIG. 3 includes a contact 152, a rod 153, an attachment sensor 154, a liquid-level sensor 155, and a locking pin 156. The attachment case 150 may accommodate a plurality of, e.g., four (4), cartridges 200 each containing ink in a different color, which may be, for example, black, cyan, magenta, and yellow. In this regard, the attachment case 150 has a set of the contact 152, the rod 153, the attachment sensor 154, and the liquid-level sensor 155, for each of the four cartridges 200. In the following paragraphs, the terms "the contact 152," "the rod 153," "the attachment sensor 154," and "the liquid-level sensor 155" may mean four (4) contacts 152, four (4) rods 153, four (4) attachment sensors 154, and four (4) liquid-level sensors 155, for the cartridges 200 for black, cyan, magenta, and yellow, respectively. Meanwhile, a quantity of the cartridges 200 to be mounted in the attachment case 150 may not necessarily be limited to four but may be less than four, e.g., one, or more than four. In the following paragraphs, among the four identical items, e.g., the contacts 152, the rods 153, the attachment sensors 154, and the liquid-level sensors 155, solely one of them may be described as a representative.

The attachment case 150 has a shape of a box having an inner cavity to accommodate the cartridges 200. The inner cavity in the attachment case 150 is limited by a ceiling, a bottom, a rear wall, and a pair of side walls, which define an upper end, a lower end, a rear end in the front-rear direction 8, and widthwise ends in the widthwise direction 9, respectively. A frontward part of the attachment case 150 across from the rear wall in the front-rear direction 8 forms the opening 85 in the body 14. When the cover 87 is at the exposing position, the inner cavity in the attachment case 150 may be exposed outward through the opening 85.

The cartridges 200 may be attached to and removed from the attachment case 150 through the opening 85 in the body 14. In particular, each cartridge 200 may be pushed rearward through the opening 85 to be attached to the attachment case 150 and may be pulled frontward through the opening 85 to be removed from the attachment case 150.

Contacts 152

The contacts 152 are arranged on the ceiling of the attachment case 150 and protrude downward in the inner cavity from the ceiling. Each contact 152 is located at a position, where the contact 152 may contact electrodes 248 (see FIG. 4A) on the cartridge 200, which will be described further below, when the cartridge 200 is attached to the attachment case 150. The contact 152 is electrically conductive and resiliently deformable in the vertical direction 7. The contact 152 is electrically connected with the controller 130.

Rods 153

The rods 153 (see FIG. 3) protrude frontward from the rear wall of the attachment case 150. Each rod 153 is located at a position higher than a joint 180, which will be described further below, on the rear wall of the attachment case 150. The rod 153 may enter an air valve compartment 214 (see FIG. 4B) in the cartridge 200 through an air communication hole 221 (see FIGS. 4A-4B), which will be described further below, while the cartridge 200 is in transition to be attached to the attachment case 150. The rod 153 in the air valve compartment 214 allows the air valve compartment to be in fluid communication with the atmosphere.

Attachment Sensors 154

The attachment sensors 154 (see FIG. 3) are arranged on the ceiling of the attachment case 150. Each attachment sensor 154 may detect a condition of a corresponding one of the cartridges 200, i.e., whether the cartridge 200 is attached to the attachment case 150 or not. The attachment sensor 154 may include a light emitter and a light receiver, which are not shown but may be spaced apart from each other in the widthwise direction 9. When the cartridge 200 is attached to the attachment case 150, a light-blocking rib 245 (see FIGS. 4A-4B) on the cartridge 200 is located between the light emitter and the light receiver in the attachment sensor 154. In other words, the light emitter and the light receiver in the attachment sensor 154 are arranged to face each other across the light-blocking rib 245 on the cartridge 200 when the cartridge 200 is attached to the attachment case 150.

The attachment sensor 154 outputs different signals depending on light-receiving conditions of the light receiver, i.e., whether or not the light receiver receives the light emitted in the widthwise direction 9 from the light emitter. The signals output from the light receiver indicating the light-receiving condition of the light receiver in the attachment sensor 154 will be called as an attachment signal. The attachment sensor 154 may output a lower-leveled signal to the controller 130 in response to, for example, an intensity of the light received in the light receiver being less than a threshold intensity. On the other hand, the attachment sensor 154 may output a higher-leveled signal to the controller 130 in response to the intensity of the light received in the light receiver being greater than or equal to the threshold intensity.

Liquid-Level Sensors 155

Each of the liquid-level sensors 155 may detect a position of a detectable part 194 (see FIG. 5) in an actuator 190, which will be described further below. In particular, the liquid-level sensor 155 may detect whether or not the detectable part 194 is at a detectable position. The liquid-level sensor 155 includes a light emitter and a light receiver, which are not shown but may be spaced apart from each other in the widthwise direction 9. In other words, the light emitter and the light receiver in the liquid-level sensor 155 are arranged to face each other across the detectable part 194 when the detectable part 194 is at the detectable position. The liquid-level sensor 155 may output different signals depending on light-receiving conditions of the light receiver, i.e., whether or not the light receiver receives the light emitted from the light emitter. The signals output from the light receiver indicating the light-receiving condition of the light receiver in the liquid-level sensor 155 will be called as a liquid-level signal.

Locking Pins 156

The locking pin 156 is located at an upper end in the inner cavity of the attachment case 150 in proximity to the opening 85 and has a shape of a rod longitudinally extending in the widthwise direction 9. The locking pin 156 is fixed to the sideward walls of the attachment case 150 at widthwise ends thereof. The locking pin 156 extends in the widthwise direction 9 crossing through the inner cavity that may accommodate the four cartridges 200. The locking ping 56 may hold the cartridges 200 attached to the attachment case 150 at the position shown in FIG. 5. The cartridges 200 attached to the attachment case 150 may engage with the locking pin 156.

Tanks 160

The printer 10 has four (4) tanks 160 for the four (4) cartridges 200. In particular, the printer 10 has four (4) reservoir sets of tanks 160 and cartridges 200: a tank 160 to store the magenta ink, which corresponds to a cartridge 200 to store the magenta ink; a tank 160 to store the cyan ink, which corresponds to a cartridge 200 to store the cyan ink; a tank 160 to store the yellow ink corresponding to a cartridge 200 to store the yellow ink; and a tank 160 to store the black ink, which corresponds to a cartridge 200 to store the black ink.

The tanks 160 are located at positions rearward with respect to the rear wall of the attachment case 150. Each tank 160 has, as shown in FIG. 3, an upper wall 161, a front wall 162, a lower wall 163, a rear wall 164, and a pair of sidewalls which are not shown. The front wall 162 may include a plurality of walls that are in different positions from one another in the front-rear direction 8. Inside the tank 160, formed is a liquid compartment 171.

Among the walls that form the tank 160, at least a part that faces the liquid-level sensor 155 is translucent. Therefore, the light emitted from the liquid-level sensor 155 may be transmitted through the wall that faces the liquid-level sensor 155. The rear wall 164 may include, at least partly, a sheet of film fused to edges of the upper wall 161, the lower wall 163, and the sidewalls. Meanwhile, the sidewalls of the tank 160 may be unified with the attachment case 150 or may be independent from the attachment case 150. The tanks 160 adjoining along the widthwise direction 9 are divided by bulkheads, which are not shown. The tanks 160 may be in similar or identical configuration to one another.

The liquid compartment 171 is continuous with an ink channel, which is not shown, through a liquid outlet 174. A lower end of the liquid outlet 174 is defined by the lower wall 163, which defines the lower end of the liquid compartment 171. The liquid outlet 174 is located to be lower than the joint 180, and in particular, a lower end of a through hole 184. The ink channel continuous with the liquid outlet 174 is continued to the tube 32. Therefore, the liquid compartment 171 is continuous with the head 21 through the liquid outlet 174, the ink channel, and the tube 32. In other words, the ink stored in the liquid compartment 171 may be supplied to the head 21 through the liquid outlet 174, the ink channel, and the tube 32. The ink channel and the tube 32, which are continuous with the liquid outlet 174, are continued to the liquid compartment 171 at one end, i.e., the liquid outlet 174, and to the head 21 at the other end 33 (see FIG. 2).

The liquid compartment 171 is in fluid communication with the atmosphere through the air communication compartment 175. In particular, the air communication compartment 175 is continuous with the liquid compartment 171 though a through hole 176, which is formed through the front wall 162 of the tank 160. Moreover, the air communication compartment 175 is continuous with the atmosphere outside the printer 10 through an air communication port 177 and a tube, which is now shown but is connected with the air communication port 177. In other words, the air communication compartment 175 is in fluid communication with the liquid compartment 171 at one end, i.e., at the through hole 176, and to the atmosphere outside the printer 10 at the other end, i.e., at the air communication port 177. Meanwhile, the air communication compartment 175 is continuous with the atmosphere through the air communication port 177 and the tube which is not shown.

Joints 180

The joint 180 includes, as shown in FIG. 3, a needle 181 and a guide 182. The needle 181 is tubular and has an inner cavity serving as a fluid channel therein. The needle 181 protrudes frontward from the front wall 162, which defines the front end of the liquid compartment 171. The needle 181 is formed to have an opening 183 at a protruded end thereof. The fluid channel inside the needle 181 is continuous with the liquid compartment 171 through the through hole 184 formed in the front wall 162. The needle 181 is in fluid communication with the atmosphere outside the tank 160 at one end, i.e., through the opening 183, and with the liquid compartment 171 at the other end, i.e., through the through hole 184. The guide 182 is in a cylindrical shape arranged around the needle 181. The guide 182 protrudes frontward from the front wall 162 and is open frontward at the protruded end thereof.

In the inner cavity inside the needle 181, arranged are a valve 185 and a coil spring 186. The valve 185 is movable in the inner cavity inside the needle 181 between a closed position and an open position along the front-rear direction 8. The valve 185 at the closed position closes the opening 183 and at the open position opens the opening 183. The coil spring 186 urges the valve 185 in a direction to move from the open position toward the closing position, i.e., frontward, in the front-rear direction 8.

Actuator 190

In the liquid compartment 171, arranged is an actuator 190. The actuator 190 is pivotably supported by a supporting member, which is not shown but is arranged in the liquid compartment 171, to pivot in directions indicated by counterclockwise and clockwise arrows 198, 199 (see FIG. 3). The actuator 190 may pivot between positions indicated by solid lines and broken lines in FIG. 3. Meanwhile, the actuator 190 is restricted by a stopper, which is not shown, e.g., an inner wall in the liquid compartment 171, from pivoting in the direction indicated by the counterclockwise arrow 198. The actuator 190 includes a float 191, a shaft 192, an arm 193, and the detectable part 194.

The float 191 is made of a material, of which specific gravity is smaller than the ink to be stored in the liquid compartment 171. The shaft 192 protrudes in the widthwise direction 9 from a rightward face and a leftward face of the float 191. The shaft 192 is inserted in a hole, which is not shown but is formed in the supporting member for the actuator 190. Thereby, the actuator 190 is pivotably supported by the supporting member to pivot about the shaft 192. The arm 193 extends upward from the float 191. The detectable part 194 is arranged at a protruded end of the arm 193. The detectable part 194 may be a piece of plate spreading in the vertical direction 7 and the front-rear direction 8. The detectable part 194 is either made of a material or in a color that blocks the light emitted from the light emitter of the liquid-level sensor 155.

When a level of the ink in the liquid compartment 171 is higher than or equal to a threshold position P, the actuator 190, pivoted in the direction of the counterclockwise arrow 198 by its buoyancy, is held by the stopper at a detectable position indicated by the solid lines in FIG. 3. On the other hand, when the level of the ink in the liquid compartment 171 descends to be lower than the threshold position P, the actuator 190 pivots in the direction of the clockwise arrow 199. Therefore, the detectable part 194 moves to a position displaced from the detectable position. In other words, the detectable part 194 moves to a position corresponding to an amount of the ink remaining in the liquid compartment 171.

The threshold position P may be at a same height as an axial center of the needle 181 in the vertical direction 7 and at a same height as a center of an ink supplier port 234, which will be described further below. However, the threshold position P is not necessarily limited as long as the threshold position P is higher than the liquid outlet 174. For example, the threshold position P may be at a same height as an upper end or a lower end of the inner cavity in the needle 181 or may be at a same height as an upper end or a lower end of the ink supplier port 234.

When the level of the ink in the liquid compartment 171 is higher than or equal to the threshold position P, the light emitted from the light emitter in the liquid-level sensor 155 is blocked by the detectable part 194. Therefore, the light from the light emitter may not reach the light receiver, and the liquid-level sensor 155 may output a lower-leveled (L) signal to the controller 130. On the other hand, when the level of the ink in the liquid compartment 171 is lower than the threshold position P, the light emitted from the light emitter may reach the light receiver; therefore, the liquid-level sensor 155 may output a higher-leveled (H) signal to the controller 130. In other words, when the signal from the liquid-level sensor 155 is the lower-leveled signal, the level of the ink in the liquid compartment 171 is higher than or equal to the threshold position P. On the other hand, when the signal from the liquid-level sensor 155 is the higher-leveled signal, the level of the ink in the liquid compartment 171 is lower than the threshold position P. Thus, the controller 130 may detect the level of the ink in the liquid compartment 171, whether the level of the ink is higher than or equal to or lower than the threshold position P, based on the signal output from the liquid-level sensor 155.

Cartridges 200

Figure 4A:
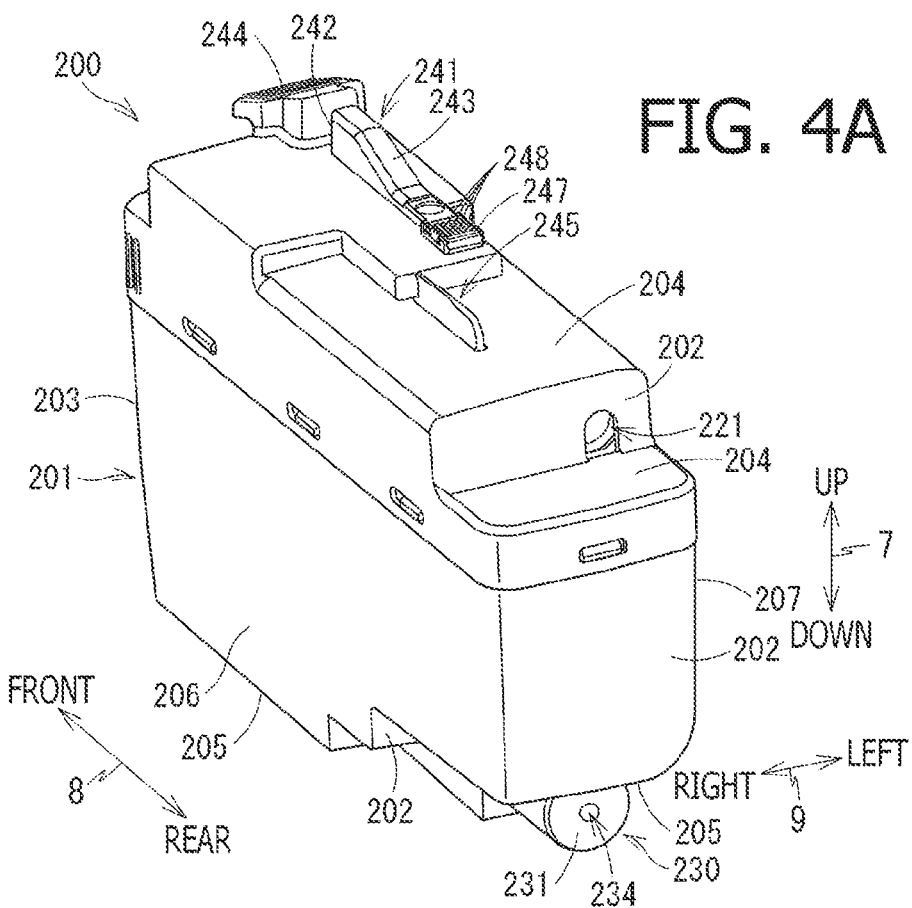
FIGS. 4A and 4B are a perspective view and a cross-sectional view of a cartridge 200 for the printer 10 according to the first embodiment of the present disclosure.

The cartridges 200 are reservoirs, each having the liquid compartment 210 (see FIG. 2) to store a colorant, e.g., the ink. The liquid compartment 210 is defined by walls that may be made of, for example, resin. The cartridge 200 may be in a shape thinner in the widthwise direction 9, and of which dimensions in the vertical direction 7 and the front-rear direction 8 are greater than a dimension in the widthwise direction 9, as shown in FIG. 4A. The cartridges 200 to store inks in different colors may be either in a same shape or in different shapes. At least a part of the walls that form each cartridge 200 is translucent. Therefore, the user may visually recognize the level of the ink stored in the liquid compartment 210 from the outside through the translucent part.

Each cartridge 200 has a body 201 and a supplier tube 230. The body 201 includes a rear wall 202, a front wall 203, an upper wall 204, a lower wall 205, and a pair of sidewalls 206, 207. The rear wall 202 may include a plurality of walls that are in different positions from one another in the front-rear direction 8. The upper wall 204 may include a plurality of walls that are in different positions from one another in the vertical direction 7. The lower wall 205 may include a plurality of walls that are in different positions from one another in the vertical direction 7.

Figure 4B:
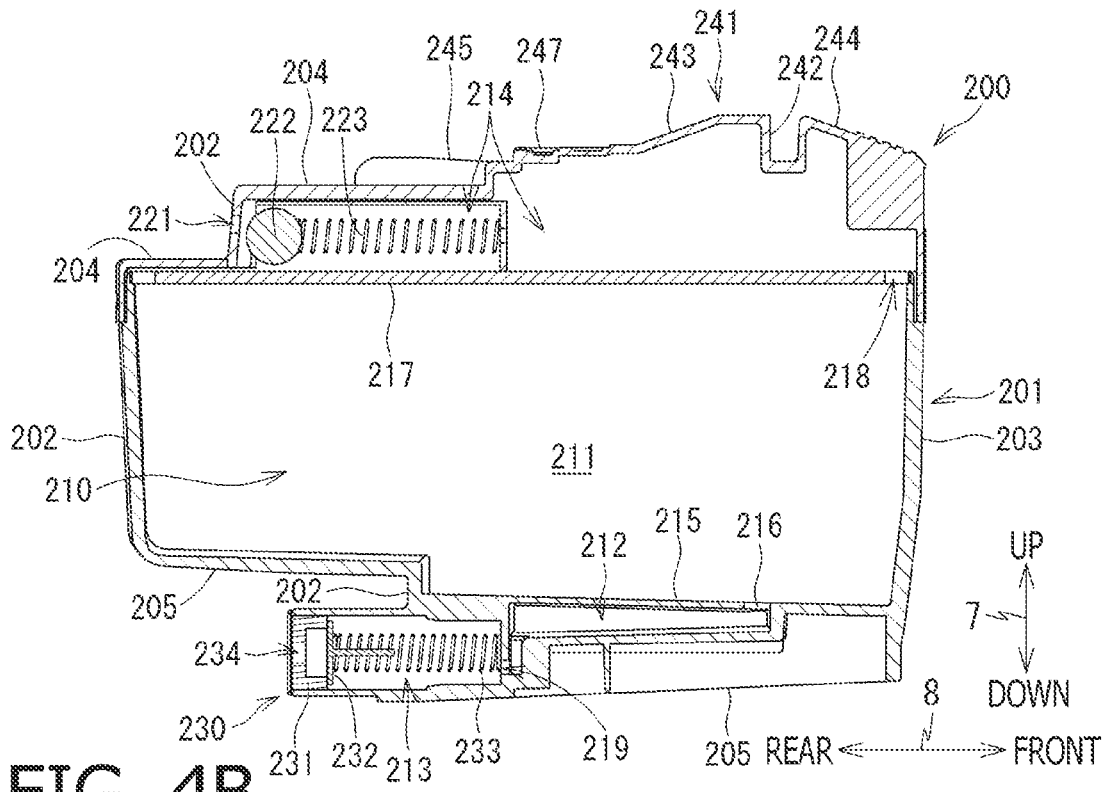

Inside each cartridge 200, as shown in FIG. 4B, formed are the liquid compartment 210, an ink valve compartment 213, and the air valve compartment 214. The liquid compartment 210 includes an upper liquid compartment 211 and a lower liquid compartment 212. The upper liquid compartment 211, the lower liquid compartment 212, and the air valve compartment 214 form the inner cavity in the body 201. Meanwhile, the ink valve compartment 213 forms an inner cavity in the supplier tube 230. The liquid compartment 210 may store the ink therein. The air valve compartment 214 connects the liquid compartment 210 to be in fluid communication with the atmosphere outside the cartridge 200.

The upper liquid compartment 211 and the lower liquid compartment 212 are separated from each other in the vertical direction 7 by a bulkhead 215 that divides the inner cavity in the body 201. Meanwhile, the upper liquid compartment 211 and the lower liquid compartment 212 are in fluid communication with each other through a through hole 216, which is formed through the bulkhead 215. The upper liquid compartment 211 and the air valve compartment 214 are separated from each other in the vertical direction 7 by a bulkhead 217 that divides the inner cavity in the body 201. Meanwhile, the upper liquid compartment 211 and the air valve compartment 214 are in fluid communication with each other through a through hole 218, which is formed through the bulkhead 217. The ink valve compartment 213 is in fluid communication with a lower end of the lower liquid compartment 212 through a through hole 219.

The air valve compartment 214 is continuous with the atmosphere outside the cartridge 200 through an air communication port 221, which is formed in the rear wall 202, at an upper position in the cartridge 200. Therefore, the air valve compartment 214 is in fluid communication with the liquid compartment 210, more specifically, to the upper liquid compartment 211, at one end, i.e., at the through hole 218, and with the atmosphere outside the cartridge 200 at the other end, i.e., at the air communication port 221. The air valve compartment 214 is in fluid communication with the atmosphere through the air communication port 221. Meanwhile, in the air valve compartment 214, arranged are a valve 222 and a coil spring 223. The valve 222 is movable in the air valve compartment 214 between a closed position and an open position along the front-rear direction 8. The valve 222 at the closed position closes the air communication port 221 and at the open position opens the air communication port 221. The coil spring 223 may urge the valve 222 in a direction to move from the open position toward the closed position, i.e., rearward, in the front-rear direction 8.

As the cartridge 200 moves to be attached to the attachment case 150, the rod 153 may enter the air valve compartment 214 through the air communication port 221. The rod 153 entering the air valve compartment 214 may move the valve 222 frontward from the closed position against the urging force of the coil spring 223. When the valve 222 reaches the open position, the upper liquid compartment 11 becomes in fluid communication with the atmosphere. Meanwhile, the structure to open the air communication port 221 may not necessarily limited to those described above. For example, the rod 153 may push and tear a film that seals the air communication port 221 open.

The supplier tube 230 protrudes rearward from the rear wall 202 at a lower position in the body 201. The supplier tube 230 is open rearward at a protrusive end, i.e., a rear end, thereof. In this regard, the ink valve compartment 213 connects the liquid compartment 210, which is continuous with the ink valve compartment 213 through the through hole 219, with the atmosphere outside the cartridge 200. Thus, the ink valve compartment 213 is in fluid communication with the liquid compartment 210, more specifically, to the lower liquid compartment 212, at one end, i.e., at the through hole 219, and to the atmosphere outside the cartridge 200 at the other end, i.e., at an ink supplier compartment 234, which will be described further below. In the ink valve compartment 213, arranged are a packing 231, a valve 232, and a coil spring 233.

At a center in the packing 231, formed through in the front-rear direction 8 is the ink supplier port 234. An inner diameter of the ink supplier port 234 is substantially smaller than an outer diameter of the needle 181. The valve 232 may move between the closed position and the open position along the front-rear direction 8. The valve 232 at the closed position contacts the packing 231 and closes the ink supplier port 234. The valve 232 at the open position is separated from the packing 231 and opens the ink supplier port 234. The coil spring 233 may urge the valve 232 in a direction to move from the open position toward the closed position, i.e., rearward, in the front-rear direction 8. The urging force of the coil spring 233 is greater than the urging force of the coil spring 186.

As the cartridge 200 moves to be attached to the attachment case 150, the supplier tube 230 may enter the guide 182, and the needle 181 may enter the ink valve compartment 213 through the ink supplier port 234. The needle 181 entering the ink valve compartment 213 may resiliently deform the packing 231 and liquid-tightly fit in an inner peripheral surface of the ink supplier port 234. As the cartridge 200 is pushed further in the attachment case 150, the needle 181 may move the valve 232 frontward against the urging force of the coil spring 233. Meanwhile, the valve 232 may move the valve 185 protruding through the opening 183 rearward against the urging force of the coil spring 186.

As the valve 185 moves rearward, the ink supplier port 234 and the opening 183 are connected, and the ink valve compartment 213 in the supplier tube 230 and the inner cavity in the needle 181 are connected with each other, as shown in FIG. 5. In other words, under the condition where the cartridge 200 is attached to the attachment case 150, the ink valve compartment 213 and the inner cavity in the needle 181 form a channel, which connects the liquid compartment 210 in the cartridge 200 with the liquid compartment 171 in the tank 160.

Moreover, under the condition where the cartridge 200 is attached to the attachment case 150, as shown in FIG. 5, a part of the liquid compartment 210 and a part of the liquid compartment 171 overlap each other in a view along a horizontal direction. Therefore, the ink stored in the liquid compartment 210 may flow in the liquid compartment 171 in the tank 160 through the supplier tube 230 and the joint 180 that are connected with each other by an effect of a hydraulic difference.

On the upper wall 204 of the cartridge 200, formed is a protrusion 241. The protrusion 241 protrudes upward from an upward surface of the upper wall 204 and longitudinally extends in the front-rear direction 8. The protrusion 241 includes a locking surface 242 and a slope surface 243, which are located to be higher than the upper wall 204. The locking surface 242 faces frontward and spreads in the vertical direction 7 and the widthwise direction 9. In this regard, the locking surface 242 may spread substantially orthogonally to the upper wall 204. The slope surface 243 inclines with respect to the upper wall 204 to face upper-rearward.

The locking surface 242 may, under the condition where the cartridge 200 is attached to the attachment case 150, contact the locking pin 156. The slope surface 243 may, as the cartridge 200 moves to be attached to the attachment case 150, guide the locking pin 156 to a position where the locking pin 156 contacts the locking surface 242. While the locking surface 242 and the locking pin 156 are maintained in contact with each other, the cartridge 200 is maintained at an attachment position, as shown in FIG. 5, against the urging forces of the coil springs 186, 223, 233.

On the upward surface of the upper wall 204, at a frontward position with respect to the locking surface 242, arranged is a plate member, which extends upward from the upper wall 204. An upper surface of the plate member serves as an operative part 244, which may be operated by a user when the cartridge 200 is removed from the attachment case 150. Under the condition where the cartridge 200 is attached to the attachment case 150, and when the cover 87 is at the exposing position, the operative part 244 is accessible to the user. When the user pushes the operative part 244 downward, a front part of the cartridge 200 may pivot downward, and the locking surface 242 may move downward to be lower than the locking pin 156. Therefore, the cartridge 200 may be released from the attachment case 150.

On the upward surface of the upper wall 204, at a rearward position with respect to the protrusion 241, formed is a light-blocking rib 245. The light-blocking rib 245 protrudes upward from the upper face of the upper wall 204 and longitudinally extends in the front-rear direction 8. The light-blocking rib 245 is either made of a material or in a color that blocks the light emitted from the light emitter of the attachment sensor 154. The light-blocking rib 245 is, under the condition where the cartridge 200 is attached to the attachment case 150, located on a light path between the light emitter and the light receiver in the attachment sensor 154. Therefore, the attachment sensor 154 may output the lower-leveled signal to the controller 130 in response to the condition where the cartridge 200 is attached to the attachment case 150. On the other hand, the attachment sensor 154 may output the higher-leveled signal to the controller 130 in response to a condition where the cartridge 200 is not attached to the attachment case 150. Thus, the controller 130 may detect the condition of the cartridge 200 being attached to the attachment case 150 based on the signal output from the attachment sensor 154.

On the upward surface of the upper wall 204, at a position between the light-blocking rib 245 and the protrusion 241 in the front-rear direction 8, arranged is an IC chip 247, on which the electrodes 248 are mounted. The IC chip 247 includes a memory device, which is not shown, and the electrodes 248 are electrically connected with the memory device. The electrodes 248 on an upper surface of the IC chip 247 are exposed so that the electrodes 248 may be conductive with the contact 152. In this regard, under the condition where the cartridge 200 is attached to the attachment case 150, the electrodes 248 are electrically conducted with the contact 152. The controller 130 may read and write information in the memory device in the IC chip 247 through the contact 152 and the electrodes 248. In the following paragraphs, written description such as "reading information in the IC chip 247" and "writing information in the IC chip 247" may be equated with "reading information in the memory device in the IC chip 247" and "writing information in the memory device in the IC chip 247," respectively.

Controller 130

The controller 130 includes, as shown in FIG. 6, a CPU 131, a ROM 132, a RAM 133, an EEPROM 134, and an ASIC 135. The ROM 132 may store controlling program 35, by which the CPU 131 may control behaviors of the printer 10. The RAM 133 may serve as a storage area to store data and signals to be used by the CPU 131 as the CPU 131 executes programs, including the controlling program 35, temporarily, and as a work area for process the data and the information. The EEPROM 134 may store information, such as configuration information concerning the printer 10, which should be saved when the printer 10 is powered on and off.

The ASIC 135 may control behaviors of the feed roller 23, the conveyer roller 25, the ejection roller 27, and the heads 21. The controller 130 may drive a motor, which is not shown, through the ASIC 135 so that the feed roller 23, the conveyer roller 25, and the ejection roller 27 may rotate. Moreover, the controller 130 may output driving signals to drivable elements in the heads 21 through the ASIC 135 so that the heads 21 may discharge the inks through the nozzles 29. The ASIC 135 may output multiple types of driving signals depending on amounts of the inks to be discharged through the nozzles 29.

The ASIC 135 is electrically connected with the contacts 152, the attachment sensors 154, the liquid-level sensors 155, and a communication interface 34. The controller 130 may access the memory devices in the IC chips 247 in the cartridges 200 attached to the attachment case 152 through the contacts 152. The controller 130 may detect attachment or removal of the cartridges 200 to and from the attachment case 150 through the attachment sensors 154. Moreover, the controller 130 may detect the levels of the inks in the liquid compartments 171, i.e., whether the levels of the inks are higher or equal to the threshold position P or not, through the liquid-level sensors 155.

The EEPROM 134 may store information the cartridges 200 to be attached to the attachment case 150. In other words, the EEPROM 134 may store information concerning each cartridge 200, in association with the tank 160 which is connected with the cartridge 200. The information may include a flag called S_Empty flag, an initial first remainder value for each of the cartridges 200, and an initial second remainder value for each of the tanks 160, which will be described further below.

The S_Empty flag indicates whether the tank 160 is in an "ink-empty" condition. The S_Empty flag contains either a value representing "on," which indicates the tank 160 being in the ink-empty condition, or a value representing "off," which indicates the tank 160 being not in the ink-empty condition, given by the CPU 130. The ink-empty condition may be, for example, a condition, in which the level of the ink stored in the tank 160, i.e., the liquid compartment 171, is lowered to the position of the upper end of the liquid outlet 174. When the tank 160 is in the ink-empty condition, and if the head 21 continues discharging the ink in the ink-empty condition, the nozzles 29 may not be filled with the ink but the air may be mixed with the ink in the nozzles 29. In this regard, when the tank 160 is in the ink-empty condition, the head 21 may no longer be allowed to discharge the ink.

The ASIC 135 is connected with the display 28 and a touch sensor 18 laid over the display 28. The display 28 may display information, which may or may not be related to the printer 10, and include, for example, a liquid crystal display and an organic EL display. The touch sensor 18 may detect a position on a screen in the display 28 touched by the user and output information related to the position. Therefore, when an object is displayed in the display 28, and the user touches on the object, the controller 130 may detect a touching action by the user to the object. A user's touching action on an object in the display 28 may include, for example, tapping, pressing, and flicking.

The ASIC 135 is connected with a home button 19. When the user presses the home button 19, and an operating signal from the home button 19 is input in the controller 130, the ASIC 135 may display a standby screen (see FIG. 13) in the display 28. Actions of the controller 130 with the standby screen will be described further below.

The display 28 may display the standby screen, as shown in FIG. 13 and FIG. 15A, and an ink remainder indication screen, as shown in FIGS. 14 and 15B, in response to commands by the controller 130. Each screen to be displayed in the display 28 may contain one or more objects, which will be described further below. In the following paragraphs, objects related to the four colors, i.e., magenta, cyan, yellow, and black, may be distinguished by letters M, C, Y, and Bk, respectively. In other words, the letters M, C, Y, and BK, may be appended to objects related to the colors of magenta, cyan, yellow, and black, respectively. Meanwhile, an object without a letter M, C, Y, or Bk may represent the overall objects including the object M related to magenta, the object C related to cyan, the object Y related to yellow, and the object B, related to black when the objects may not necessarily be distinguished by the colors. For example, a thirteenth object 263M, a thirteenth object 263C, a thirteenth object 263Y, and a thirteenth object 263Bk related to magenta, cyan, yellow, and black, respectively, which will be described further below, may be collectively called as a thirteenth object 263. It may be noted that the ordinal terms (e.g., first, second, . . . etc.) appended to the objects to be displayed in the screens on the display 28 may not necessarily be related to an order of significance or appearance of some objects over the other objects but should be considered merely as names of the objects.

Standby Screen

The standby screen as shown in FIG. 13 may be displayed in the display 28 when the printer 10 is in a standby mode. The standby screen may include function objects 73, which represent functions such as facsimile, copy, and scan, that are available to the user from the printer 10. When the user taps on one of the function objects 73, an advanced screen, which is not shown, related to the selected function may be displayed. Moreover, the standby screen may include a setting object 74, through which the screen to be displayed may be switched from the standby screen to a setting screen (not shown), and scrolls object 75, through which the screen being displayed may be scrolled in the display 28.

The standby screen includes a third object 253, including third objects 253M, 253C, 253Y, 253Bk, which indicate remainder amounts of the inks stored in the four (4) cartridges 200. In the example shown in FIG. 13, the third object 253 is located at a lower-rightward area in the standby screen. Meanwhile, the location of the third object 253 may not necessarily be limited to the lower-rightward area but may be anywhere within the standby screen.

The third object 253 includes four (4) objects, which are the third object 253M, the third object 253C, the third object 253Y, and the third object Bk, aligning side by side in the order from left to right in the display 28. The third object 253M indicates a remainder amount of the magenta ink in the cartridge 200, the third object 253C indicates a remainder amount of the cyan ink in the cartridge 200, the third object 253Y indicates a remainder amount of the yellow ink in the cartridge 200, and the third object 253Bk indicates a remainder amount of the black ink in the cartridge 200.

The third object 253 includes a frame 76, which is in a rectangular shape elongated in a perpendicular direction 71, and a scale body 77, of which length in the perpendicular direction is variable according to a remainder amount of the ink in the cartridge 200. The scale body 77 may not be displayed when the remainder amount of the ink in the cartridge 200 is zero (0), i.e., none. In other words, when the remainder amount of the ink in the cartridge 200 is zero, the third object 253 solely includes the frame 76. When the remainder amount of the ink in the cartridge 200 is greater than zero, the third object 253 includes the frame 76 and the scale body 77, of which length corresponds to the remainder amount. For example, the scale body 77 may include one or more (e.g., from 1 to 20) scale blocks, of which quantity reflects the remainder amount of the ink in the cartridge 200. In this regard, the third object 253 may include a plurality of forms to express the remainder amount of the ink in the cartridge 200.

Meanwhile, the third object 253 may serve as a switcher object, through which the screen in the display 28 may be switched from the standby screen to an ink remainder indication screen (see FIG. 14). The ink remainder indication screen will be described further below.

The standby screen may include a fourth object 254, which is displayed under a certain condition. In particular, the fourth object 254 may be displayed when a cartridge 200 to be exchanged with a new cartridge 200 is contained. In other words, the fourth object 254 may express shortage of the ink in the cartridge 200 and prompt the user to exchange the cartridge 200 with a new cartridge 200.

The fourth object 254 may include, but not necessarily be limited to, an exclamation mark (!). The fourth object 254 may cause the user to intuitively recognize that the ink in the cartridge 200 is exhausted. The fourth object 254 may be, for another example, a sign, a character, or a figure other than the exclamation mark, as long as the fourth object 254 may be likely to cause the user to recognize the exhaustion of the ink in the cartridge 200.

The fourth object 254 may be displayed over the frame 76 in the third object 253 corresponding to the cartridge 200, which exhausted the ink therein. In the example shown in FIG. 13, the fourth object 254 is displayed over the frame 76 of the third object 253C for the cyan ink.

The standby screen may include a sixth object 256, which is displayed under a certain condition. In particular, the sixth object 256 may be displayed when the cartridge 200 no longer contains a sufficient amount of ink to continue printing. In this regard, the sixth object 256 may express insufficiency of the ink in the cartridge 200 and cause the user to recognize that image printing may not be continued unless the cartridge 200 is exchanged with a new cartridge 200.

The sixth object 256 may include, but not necessarily be limited to, a cross-out mark (x). The sixth object 256 may cause the user to recognize that the ink is exhausted in the cartridge 200 and in the tank 160, and image printing may not be continued. The sixth object 256 may be, for another example, a sign, a character, or a figure other than the cross-out mark as long as the sixth object 256 may be likely to cause the user to recognize that no image printing on a sheet may be continued.

The sixth object 256 may be displayed over the frame 76 of the third object 253 corresponding to the cartridge 200, which may no longer continue printing. In the example shown in FIG. 13, the sixth object 256 is displayed over the frame 76 of the third object 253Y for the yellow ink.

The standby screen may include an eighth object 258, as shown in FIG. 15A, which is displayed under a certain condition. The eighth object 258 may include, but not necessarily be limited to, a question mark (?). The eighth object 258 may be displayed when a type of the cartridge 200 is unidentifiable. In other words, the eighth object 258 may be displayed when a cartridge 200, of which type is unidentified, is currently attached to the attachment case 150. Therefore, the eighth object 258 may express unidentified status of the cartridge 200 and cause the user to recognize that a cartridge 200 unqualified for the printer 10 is attached to the attachment case 150, and no remainder amount of the ink in the cartridge 200 is displayable. The eighth object 258 may be, for another example, a sign, a character, or a figure other than the question mark as long as the eighth object 256 may be likely to cause the user to recognize that no remainder amount of the ink in the cartridge 200 is displayable.

The eighth object 258 may be displayed over the frame 76 of the third object 253 corresponding to the cartridge 200, of which remainder amount of the ink is not displayable. In the example shown in FIG. 15A, the eight object 256 is displayed over the frame 76 of the third object 253C for the cyan ink and the frame 76 of the third object 253Y for the yellow ink.

In response to a tapping action to the third object 253 by the user, the screen in the display 28 may be switched from the standby screen (see FIG. 13) to the ink remainder indication screen (see FIG. 14), which indicates remaining amounts of the inks.

Ink Remainder Indication Screen

The ink remainder indication screen includes, as shown in FIG. 14, a tenth object 260M containing a letter M for magenta, a tenth object 260C containing a letter C for cyan, a tenth object 260Y containing a letter Y for yellow, and a tenth object 260Bk containing letters Bk for black. Meanwhile, the tenth object 260 may not necessarily contain the letters M, C, Y, or Bk but may contain, for example, signs, characters, or figures, as long as the objects represent the colors of magenta, cyan, yellow, and black.

The ink remainder indication screen further includes a first object 251 and a second object 25M. The first object 251 indicates a remainder amount being an amount of the ink stored in the cartridge 200. The second object 252 indicates a remainder mount being an amount of the ink stored in the liquid compartment 171 in the tank 160 connected with the cartridge 200. The first object 251 is located at a lower position with respect to the tenth object 260, and the second object 252 is located at a lower position with respect to the first object 251. The tenth object 260 indicates a color of the ink corresponding to the first object 251 and the second object 252 located at the lower positions thereof.

The first object 251 includes a frame 61, which has a rectangular shape elongated in the perpendicular direction 71, and a scale body 62, of which length corresponds to the remainder amount of the ink in the cartridge 200. The scale body 62 may not be displayed when the remainder amount in the cartridge 200 is zero (0), i.e., none. In other words, when the remainder amount of the ink in the cartridge 200 is zero, the first object 251 solely includes the frame 61. When the remainder amount of the ink in the cartridge 200 is greater than zero, the first object 251 includes the frame 61 and the scale body 62, of which length corresponds to the remainder amount of the ink in the cartridge 200. For example, the scale body 62 may include one or more (e.g., from 1 to 20) scale blocks, of which quantity reflects the remainder amount of the ink in the cartridge 200. In this regard, the first object 251 may include a plurality of forms to express the remainder amount of the ink in the cartridge 200. The first objects 251M, 251C, 251Y, 251Bk for magenta, cyan, yellow, and black inks are arranged to align side by side along a crosswise direction 72.

The second object 252 includes a frame 63, which has a rectangular shape elongated in the perpendicular direction 71, and a scale body 64, of which length corresponds to the remainder amount of the ink in the tank 160. The scale body 64 may not be displayed when the remainder amount in the tank 160 is zero (0), i.e., none. In other words, when the remainder amount of the ink in the tank 160 is zero, the second object 252 solely includes the frame 63. When the remainder amount of the ink in the tank 160 is greater than zero, the second object 252 includes the frame 63 and the scale body 64, of which length corresponds to the remainder amount of the ink in the tank 160. For example, the scale body 62 may include one or more scale blocks, of which quantity reflects the remainder amount of the ink in the tank 160. In this regard, the second object 252 may include a plurality of forms to express the remainder amount of the ink in the tank 160. The second objects 252M, 252C, 252Y, 252Bk for magenta, cyan, yellow, and black inks are arranged to align side by side along the crosswise direction 72.

A width, i.e., a length in the crosswise direction 72, of the first object 251 and a width, i.e., a length in the crosswise direction 72, of the second object 252 may be the same. Optionally, the width of the first object 251 may vary depending on a type of the cartridge 200. For example, the first object 251 for the cartridge 200 in a regular type may have a width equal to the width of the second object 252, whereas the first object 251 for a large-capacity typed cartridge 200 may have a width greater than the width of the second object 252. In this regard, the user may recognize the type of the cartridge 200 being currently attached to the attachment case 150 by the width of the first object 251 with respect to the width of the second object 252.

The ink remainder indication screen may include a fifth object 255, which is displayed under a certain condition. The fifth object 255 may include, but not necessarily be limited to, an exclamation mark (!), similarly to the fourth object 254 described earlier. The fifth object 255 may be displayed over the frame 61 of the first object 251 corresponding to the cartridge 200, which exhausted the ink therein. In the example shown in FIG. 14, the fifth object 255 is displayed over the frame 61 of the first object 251C for the cyan ink. The fifth object 255 may express shortage of the ink in the cartridge 200 and cause the user to intuitively recognize that the ink in the cartridge 200 is exhausted. The fifth object 255 may not necessarily be the same mark as the fourth object 254 but may be in a sign, a character, or a figure different from the fourth object 254.

The ink remainder indication screen may include a seventh object 257, which is displayed under a certain condition. The seventh object 257 may include, but not necessarily be limited to, a cross-out mark (x), similarly to the sixth object 256 described earlier. The seventh object 257 may be displayed over the frame 61 of the first object 251 corresponding to the cartridge 200, which exhausted the ink therein, and the frame 63 of the second object 252 corresponding to the tank 160, which exhausted the ink therein. In the example shown in FIG. 14, the seventh object 257 is displayed over the frame 61 of the first object 251Y and the frame 63 of the second object 252Y for the yellow ink. The seventh object 257 may express insufficiency of the ink in the cartridge 200 and cause the user to intuitively recognize that image printing may not be continued unless the cartridge 200 is exchanged with a new cartridge 200. The seventh object 257 may not necessarily be the same mark as the sixth object 256 but may be in a sign, a character, or a figure different from the sixth object 256.

The ink remainder indication screen may include a ninth object 259, which is displayed under a certain condition. The ninth object 259 may include, but not necessarily be limited to, a question mark (?), similarly to the eighth object 258 described earlier. The ninth object 257 may be displayed over the frame 61 of the first object 251 corresponding to the cartridge 200, of which type is unidentifiable. In the example shown in FIG. 15B, the ninth object 259 is displayed over the frame 61 of the first object 251C for the cyan ink and the frame 61 of the first object 251Y for the yellow ink. The ninth object 259 may express unidentified status of the cartridge 200 and cause the user to recognize that a cartridge 200 unqualified for the printer 10 is attached to the attachment case 150, and no remainder amount of the ink in the cartridge 200 is displayable. The ninth object 259 may not necessarily be the same mark as the eighth object 258 but may be in a sign, a character, or a figure different from the eighth object 258.

The ink remainder indication screen includes an eleventh object 261 and a twelfth object 262. The eleventh object 261 includes a character string "Printable quantity (ISO equivalent)." The twelfth object 262 includes a numeric sign indicating a printable quantity and is located at a lower position with respect to the second object 252. The twelfth object 262 includes twelfth objects 262M, 262C, 262Y, 262Bk for magenta, cyan, yellow, and black, respectively. The twelfth object 261 may not necessarily contain a numeric sign but may contain a character, a figure, or a sign other than a numeric sign as long as the twelfth object 261 indicates the printable quantity.

The printable quantity (ISO equivalent) indicates a quantity of sheets printable in a current remainder amount of the ink if images are hypothetically printed in a test method compliant with requirements prescribed by International Organization for Standardization (ISO). A method to calculate the printable quantity (ISO equivalent) will be described further below.

The twelfth object 262M is located to be lower than the eleventh object 261M and lower than the tenth object 260M for magenta. The twelfth object 262M indicates a quantity of sheets printable by the remainder amount of the magenta ink in the cartridge 200 and the tank 160. In the example shown in FIG. 14, the twelfth object 262M indicates a quantity "700," which suggests that image printing on 700 sheets is presumed to be possible.

The twelfth object 262C is located to be lower than the eleventh object 261C and lower than the tenth object 260C for cyan. The twelfth object 262C indicates a quantity of sheets printable by the remainder amount of the cyan ink in the cartridge 200 and the tank 160. In the example shown in FIG. 14, the twelfth object 262C indicates a quantity "150," which suggests that image printing on 150 sheets is presumed to be possible.

The twelfth object 262Y is located to be lower than the eleventh object 261Y and lower than the tenth object 260Y for yellow. The twelfth object 262Y indicates a quantity of sheets printable by the remainder amount of the yellow ink in the cartridge 200 and the tank 160. In the example shown in FIG. 14, the twelfth object 262Y indicates a quantity "0," which suggests that no image printing on a sheet is presumed to be possible.

The twelfth object 262Bk is located to be lower than the eleventh object 261Bk and lower than the tenth object 260Bk for black. The twelfth object 262Bk indicates a quantity of sheets printable by the remainder amount of the black ink in the cartridge 200 and the tank 160. In the example shown in FIG. 14, the twelfth object 262Bk indicates a quantity "2300," which suggests that image printing on 2300 sheets is presumed to be possible.

The quantity in the twelfth object 262 varies depending on the remainder amount of the ink in the cartridge 200 and the tank 160. Meanwhile, if the cartridge 200 unqualified for the printer 10 is attached to the attachment case 150, no remainder amount of the ink in the cartridge 200 may be displayable. Therefore, as shown in FIG. 15B, while the ninth object 259 is displayed over the frame 61 of the first object 251C for the cyan ink and the frame 61 of the first object 251Y for the yellow ink, the twelfth objects 262C, 262Y may be left blank to express that no remainder amount of the ink in the cartridges 200 for the cyan ink and the yellow ink is displayable.

A first display area dimension S1 (see FIG. 14), which is a size of a first displayable area being a displayable area in the ink remainder indication screen, is greater than a second display area dimension S2, (see FIG. 13) which is a size of a second displayable area being a displayable area to display the third object 253 in the standby screen. In other words, in the second displayable area, of which size is smaller, the remainder amount of the ink in the cartridge 200 may be displayed, whereas in the first displayable area, of which size is greater, the remainder amount of the ink in the cartridge 200 and in the tank 160, and the printable quantity (ISO equivalent) may be displayed. In the example shown in FIGS. 13 and 14, the first displayable area dimension S1 in the ink remainder indication screen is approximately 30 times as large as the second displayable area dimension S2 in the standby screen.

Processes in the Printer 10

Processes to be taken the printer 10 will be described with reference to the flowcharts shown in FIGS. 7-12 and the drawings in FIGS. 13 through 15A-15B. Processes described in the following paragraphs and illustrated in the flowcharts in FIGS. 7-12 may be implemented by the CPU 131 running the controlling program 35 stored in the ROM 132 or by a hardware circuit (not shown) mounted on the controller 130 (see FIG. 6). An order to process the steps in the flowcharts may not necessarily be fixed to the flow described below but may be altered within a scope of the present invention as set forth in the appended claims.

Image Forming Process

The controller 130 activates an image forming process as shown in FIG. 7 in response to input of a print command in the printer 10. The print command by the user may be received through, for example, but not necessarily limited to, the operation panel 22 or the display 28. For another example, the print command may be received from an external device through the communication interface 34. In the following paragraphs, each of the cartridges 200 for magenta, cyan, yellow, and black inks and each of the four tanks 160 for magenta, cyan, yellow, and black inks may be collectively called as the cartridge 200 and the tank 160, respectively, in the singular form. In other words, each of the steps in the processes described below may be repeated for four times for the four colored inks although the steps in the processes may be described solely once.

In S11, the controller 130 determines the value in the S_Empty flag for the cartridge 200. In other words, the controller 130 determines whether the printer 10 contains the sufficient amount of ink to print an image on a sheet. If the controller 130 determines that the S_Empty flags is on (S11: ON), in S12, the controller 130 obtains the attachment signal for the cartridge 200. In S13, the controller 130 determines whether the attachment signal for the cartridge 200 changes from the lower level (L) to the higher level (H) and thereafter from the higher level (H) to the lower level (L). In other words, the controller 130 monitors the changes in the attachment signals to determine whether the cartridge 200 with the lowered ink level has been exchanged with another cartridge 200.

In S13, if the controller 130 determines that the cartridge 200 has not been exchanged (S13: NO), the flow returns to S12 and obtains the attachment signal for another round. In S13, if the controller 130 determines that the cartridge 200 has been exchanged with another cartridge 200 (S13: YES), the flow proceeds to a first updating process in S14. Alternatively to S12-S13, the controller 130 may conduct another process to determine the exchange of the cartridges 200. For example, the controller 130 may read the IC chip 247 in the cartridge 200 to obtain a serial number of the cartridge 200 and determine whether the obtained serial number matches a serial number having been saved in the EEPROM 134.

First Updating Process

Figure 8A:
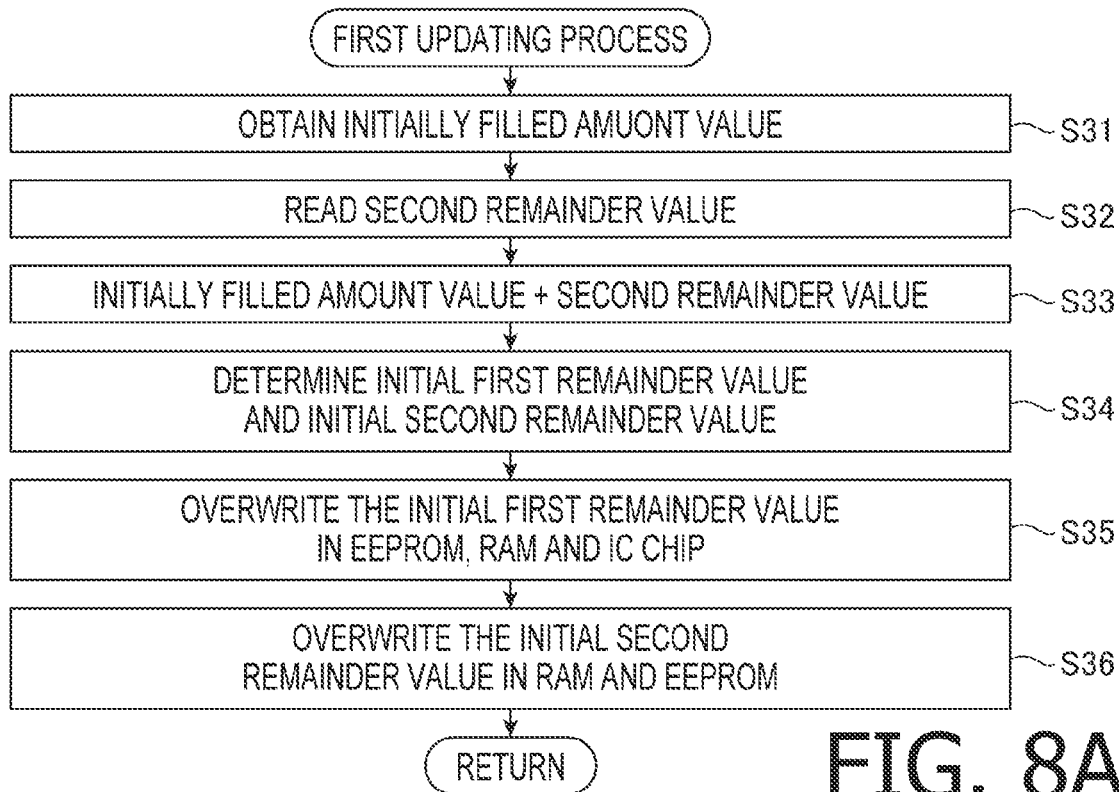

The first updating process shown in FIG. 8A may be conducted in order to update a first remainder value, which indicates the first remainder amount, and a second remainder value, which indicates the second remainder amount, when the cartridges 200 are exchanged. As mentioned earlier, the first remainder amount is an amount of the ink remaining in the cartridge 200, and the second remainder amount is an amount of the ink remaining in the tank 160.

In S31, the controller 130 obtains an initially filled amount value, which indicates an amount of the ink initially loaded in the cartridge 200. The controller 130 may read type information in the IC chip 247 in the cartridge 200 and obtain the initially filled amount value corresponding to the type information from the EEPROM 134. In the EEPROM 134, a table indicating correspondence between the type information and the initially filled amount value is prepared and stored in advance. Alternatively, the controller 130 may obtain an initial value for the first remainder value stored in the IC chip 247 in the cartridge 200 and use the obtained initial value as the initially filled amount value.

In S32, the controller 130 reads the second remainder value in the RAM 133. The second remainder value indicates an amount of the ink having been stored in the tank 160 immediately before the cartridge 200 was exchanged.

In S33, the controller 130 adds the initially filled amount value to the second remainder value to calculate a total remainder value, which indicates a total remainder amount of the ink. In S34, the controller 130 updates the first remainder value and the second remainder value for the new cartridge 200 based on the total remainder value calculated in S130. When the new cartridge 200 is attached to the attachment case 150, a portion of the ink in the cartridge 200 may flow into the liquid compartment 171 in the tank 160. In this regard, the level of the ink in the cartridge 200 may be lowered, and the level of the ink in the tank 160 may rise. In this regard, the updated first remainder value indicates the amount of the ink remaining in the cartridge 200 after the portion of the ink flowed into the tank 160, and the updated second remainder value indicates the amount of the ink in the tank 160 that accepted the ink flowed from the cartridge 200. The first remainder value and the second remainder value may be updated by, for example, calculation through a function formula or based on a table as described in the following paragraph.

The shapes of the liquid compartment 210 in the cartridge 200 and the liquid compartment 171 in the tank 160 are fixed and known to the manufacturer prior to shipping. Therefore, based on the shapes of the liquid compartment 210 and the liquid compartment 171, and based on the total remainder value, the first remainder value and the second remainder value are obvious to the manufacturer. Therefore, formulas, by which the first remainder value and the second remainder value are calculated based on the total remainder value, or a table, in which the total remainder value is associated with the first remainder value and the second remainder value, may be prepared in advance and stored in the EEPROM 134 by the manufacturer. The controller 130 may determine the first remainder value and the second remainder value based on the formulas or the table.

In S35, the controller 130 saves the newly determined first remainder value as an initial first remainder value in the EEPROM 134 and in the RAM 133. Further, the controller 130 writes the new first remainder value over the existing first remainder value in the memory device in the IC chip 247. Moreover, the controller 130 saves the newly determined second remainder value as an initial second remainder value in the EPROM 134 and in the RAM 133. The first updating process ends thereat. The flow returns to S14 in FIG. 7.

Following the first updating process in S14, in S15, the controller 130 sets the S_Empty flag off and returns to S11.

In S11, the controller 130 determines the value in the S_Empty flag for the cartridge 200. If the controller 130 determines that the S_Empty flag is off (S11: OFF), in S16, the controller 130 forms an image on a sheet. Forming an image on a sheet consumes inks; therefore, the levels of the inks in the tanks 160 may be lowered. In this regard, in S17, the controller obtains the liquid-level signals before and after forming the image in S16 from the liquid-level sensor 155.

In S18, the controller 130 determines whether the obtained liquid-level signals indicate a change in the liquid level in the tank 160. If the controller 130 determines that the liquid-level signals stay unchanged at the lower level (L) (S18: L→L), the controller 130 determines that the ink in the cartridge 200 is not exhausted. In this regard, as mentioned earlier, the liquid-level sensor 155 outputs the lower-leveled signal (L) when the level of the ink in the liquid compartment 171 is higher than the threshold position P (see FIG. 3). The flow proceeds to S19, and the controller 130 conducts a second updating process.

Second Updating Process

Figure 8B:
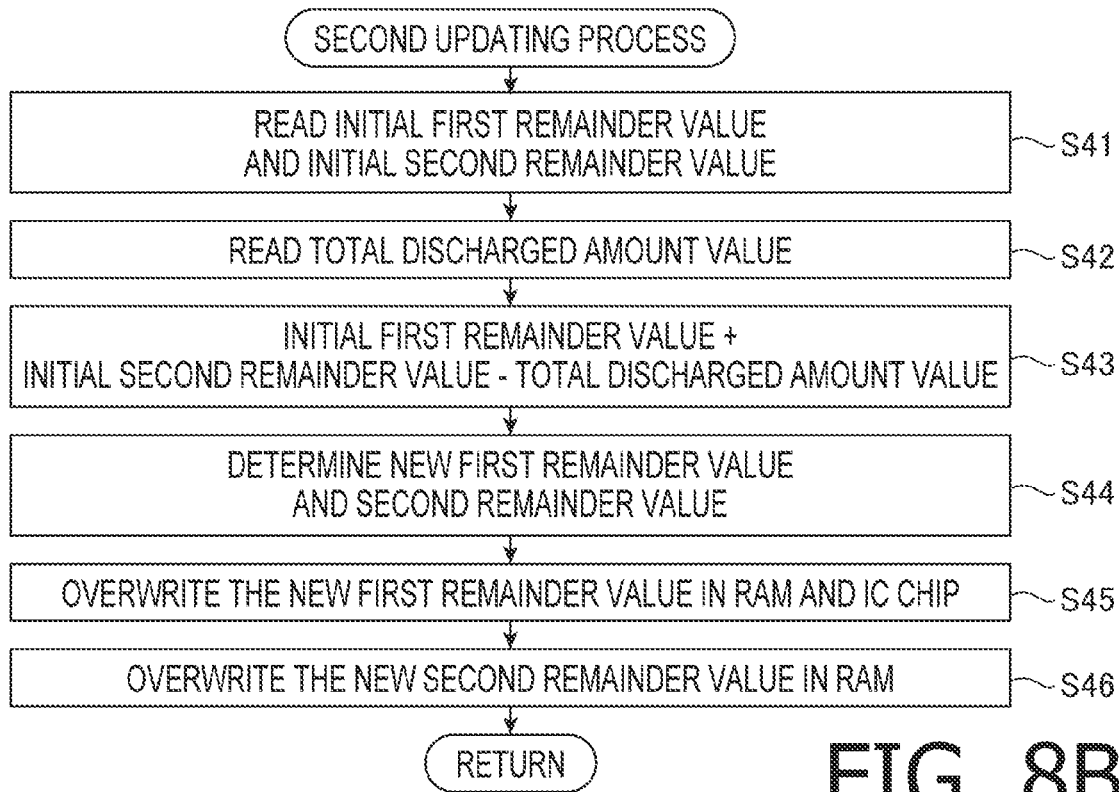

In the second updating process shown in FIG. 8B, the controller 130 may determine new values for the first remainder value and the second remainder value based on a discharged amount value, which indicates an amount of the ink discharged in the image forming in the past. The discharged amount value for the ink may be obtained, for example, by multiplying a voltage value, which may define a size of an ink droplet to be discharged from the head 21, by a quantity of ink droplets having been discharged in the image forming in the past. The controller 130 may calculate the discharged amount value each time when the controller 130 commands the head 21 to discharge the ink. The discharged amount values may be accumulated from the time of the exchange of the cartridges 200 up to the current moment. The accumulated discharged amount values will be called as a total discharged amount value. In other words, the total discharged amount value is a sum of the amount of the ink consumed by the head 21 from the time of the exchange of the cartridges 200 up to the current moment. The total discharged amount value may be stored in the EEPROM 134.

In the second updating process, in S41, the controller 130 reads the initial first remainder value in either the RAM 133 or the EEPROM 134 and reads the initial second remainder value in either the RAM 133 or the EEPROM 134. In S42, the controller 130 reads the total discharged amount value in the EEPROM 134. In S43, the controller 130 adds the initial first remainder value and the initial second remainder value read in S42 to calculate an initial total remainder value and subtracts the total discharged amount value from the initial total remainder value to calculate a current total remainder value. In S44, the controller 130 determines new values for the first remainder value and the second remainder value based on the formulas or the table, in the same manner as S34 in FIG. 8A.

In S45, the controller 130 stores the newly determined first remainder value in the RAM 133 and in the memory device in the IC chip 247 to overwrite the existing first remainder value in the memory device. Moreover, in S46, the controller 130 stores the newly determined second remainder value in the RAM 133. The second updating process ends thereat. The flow returns to S19 in FIG. 7.

Following the second updating process in S19, in S22, the controller 130 determines whether a next image to be printed on a new sheet is in queue. If the next image is in queue (S22: YES), the flow repeats S11 and the steps onward. If no next image is in queue (S22: NO), the image forming process ends thereat.

The first remainder value and the second remainder value may not necessarily be determined in the method described above but may be determined in a different method.

In S11, if the controller 130 determines that the S_Empty flags is off (S11: OFF), the controller 130 proceeds to S16, S17, and S18. In S18, if the controller 130 determines that the liquid-level signals changed from the lower level (L) to the higher level (H) (S18: L→H), in other words, if the controller 130 determines that the ink in the cartridge 200 is exhausted, in S20, the controller 130 conducts a third updating process.

Third Updating Process

Figure 8C:
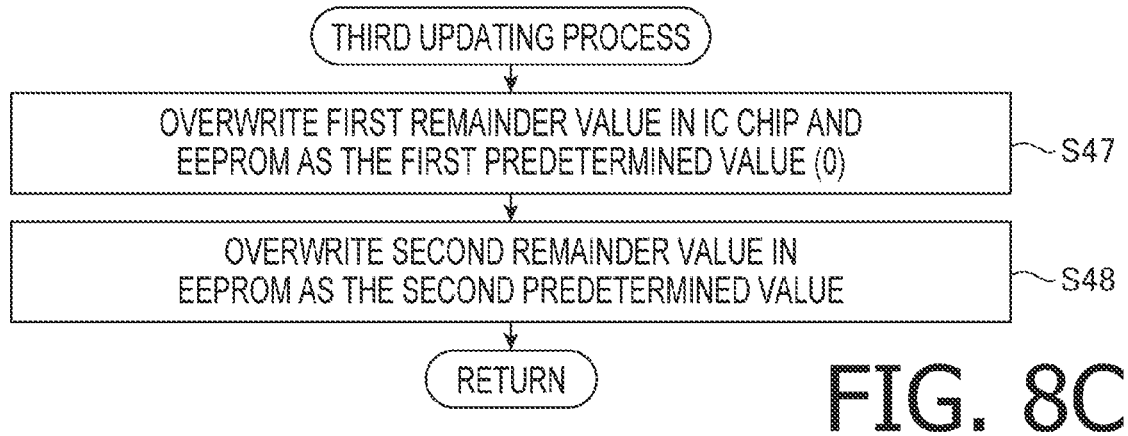

In the third updating process shown in FIG. 8C, the controller 130 may update the first remainder value and the second remainder value with a first predetermined value and a second predetermined value, respectively. That is, the discharged amount value indicating the estimated amount of the ink having been consumed in the image printing in the past may be different from an actual amount of the ink having been consumed. In this regard, the first remainder amount and the second remainder amount, which are updated each time an image is printed on a sheet, may contain accumulated differences. The third updating process may eliminate the differences contained in the first remainder amount and the second remainder amount.

In S47, the controller 130 writes the first predetermined value over the initial first remainder value having been stored in the memory device in the IC chip 247. The first predetermined value may be, for example, zero (0). In S48, the controller 130 saves the initial second remainder value as the second predetermined value in the EEPROM 134 and the RAM 133. The third updating process ends thereat. The second predetermined value indicates an amount of the ink in the liquid compartment 171 in the tank 160 when the level of the ink in the liquid compartment 171 is at the threshold position P and may be prepared in advance in the ROM 132.

Following the third updating process in S20, in S22, the controller 130 determines whether a next image to be printed on a new sheet is in queue. If the next image is in queue (S22: YES), the flow returns to S11 and proceeds to the steps onward. If no next image is in queue (S22: NO), the image forming process ends thereat.

In S11, if the controller 130 determines that the S_Empty flags is off (S11: OFF), the controller 130 proceeds to S16, S17, and S18. In S18, if the controller 130 determines that the liquid-level signal stay unchanged at the higher level (H) (S18: H→H), in S21, the controller 130 conducts a fourth updating process. In other words, once the ink in the cartridge 200 is exhausted, and until the cartridge 200 is exchanged with a new cartridge 200, the controller 130 repeats the fourth updating process.

Fourth Updating Process

Figure 8D:
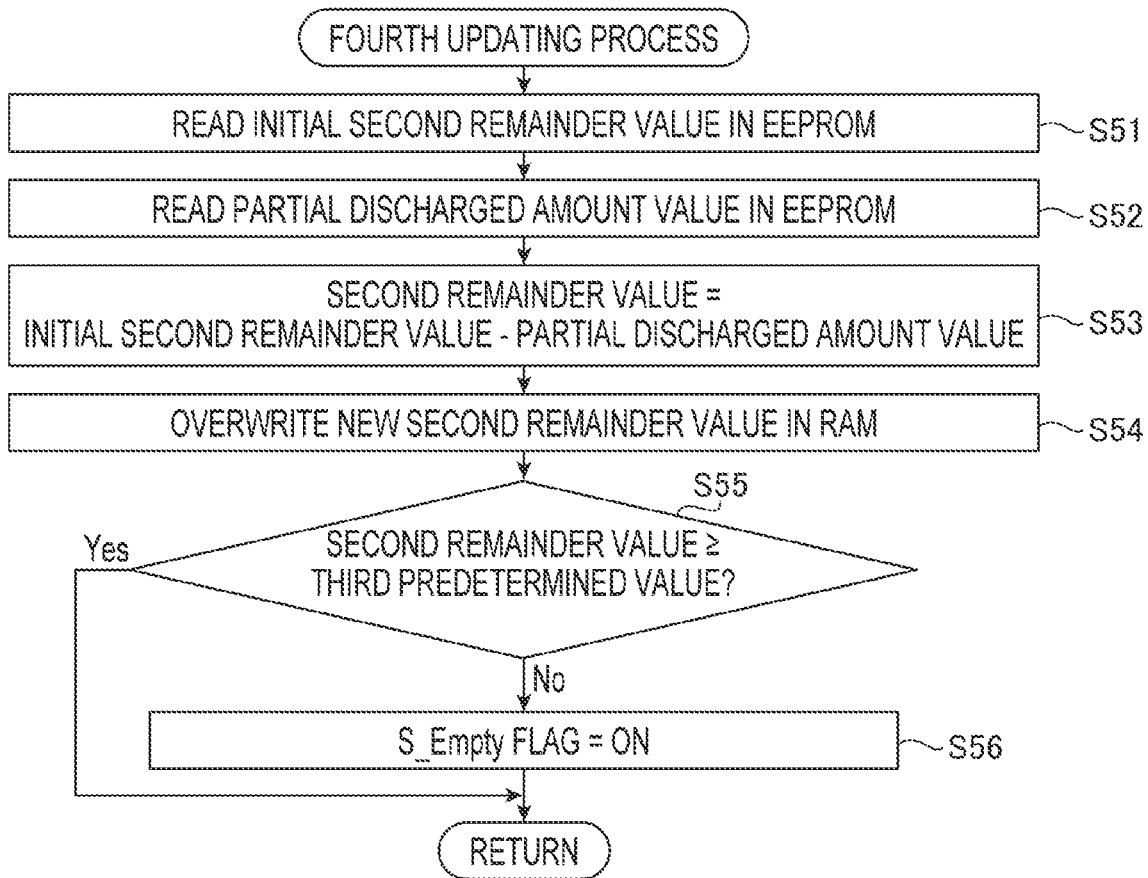

In the fourth updating process shown in FIG. 8D, the controller 130 calculates a value for the second remainder value and determine whether the calculated second remainder value indicates an amount, which is sufficient for printing an image continuously. In particular, in S51, the controller 130 reads the initial second remainder value in either the RAM 133 or the EEPROM 134. In S52, the controller 130 reads a partial discharged amount value in the EEPROM 134. The partial discharged amount value indicates a sum of the amounts of the ink discharged by the head 21 from the time, when the signals from the liquid-level sensor 155 changed from the lower-level (L) to the higher level (H), up to the current moment. In S53, the controller 130 subtracts the partial discharged amount value from the initial second remainder value read in S51 to calculate a new value for the second remainder value.

In S54, the controller 130 writes the new value for the second remainder value calculated in S53 over the existing second remainder value in the RAM 133 read in S51. Meanwhile, the first remainder value stays the same, without being overwritten, as the first predetermined value, i.e., zero (0), until the cartridge 200 is exchanged with a new cartridge 200.

In S55, the controller 130 determines whether the new second remainder value is greater than or equal to a third predetermined value, which may be a value corresponding to a remainder value of the ink, by which no image printing may be continued, and may be prepared in advance in the EEPROM 134.

In S55, if the controller 130 determines that the second remainder value is greater than or equal to the third predetermined value, in other words, if the image is continuously printable (S55: YES), skips S56 and ends the fourth updating process thereat. On the other hand, if the controller 130 determines that the second remainder value is smaller than the third predetermined value, in other words, if the image may not be continuously printed (S55: NO), in S56, the controller 130 sets the S_Empty flag on and ends the fourth updating process thereat.

In the image forming process, as described above, the first remainder value and the second remainder value may be determined based on the amount of the ink consumed each time when an image is printed on a sheet. Meanwhile, the first remainder value and the second remainder value may not necessarily be updated on a sheet basis but may be updated on basis of a different unit, for example, each time a row of image is printed in a path on a sheet. Moreover, the second updating process, the third updating process, and the fourth updating process may be conducted not only when an image is printed but also when the inks are discharged from the heads 21 for, for example, maintenance or cleaning.

The controller 130 determining the first remainder value and the second remainder value may proceed to an objects determining process shown in FIG. 11 and described in the following paragraphs. In the objects determining process, the controller 130 may determine whether the first through ninth objects 251-292 should be displayed or not, and in which the controller 130 determines the printable quantity.

Objects Determining Process

In the objects determining process shown in FIG. 11, in S91, the controller 130 determines whether the cartridge 200 currently attached to the attachment case 150 is a qualified cartridge 200. For example, the controller 130 may attempt to access the IC chip 247 and obtain a predetermined part of information in the type information. The controller 130 may determine that the cartridge 200 is qualified if the controller 130 was able to access the IC chip 247 and obtain the information from the IC chip 247. On the other hand, the controller 130 may determine that the cartridge 200 is unqualified if the controller 130 fails to access the IC chip 247 or obtain the information from the IC chip 247. If the controller 130 determines that the cartridge 200 is an unqualified cartridge (S91: NO), in S92, the controller 130 determines that the eighth object 258, e.g., the question mark (?), and the ninth object 259 are to be displayed.

In S93, the controller 130 determines that the scale body 62 in the first object 251, the scale body 64 in the second object 252, the scale body 77 in the third object 253, the fourth and fifth objects 254, 255 including the exclamation mark (!), and the sixth and seventh objects 256, 257 including the cross-out mark (x) are not to be displayed but to be hidden. The objects determining process ends thereat.

On the other hand, in S91, if the controller 130 determines that the cartridge 200 is qualified (S91: YES), in S94, the controller 130 reads the latest first remainder value and the latest second remainder value stored in the RAM 133. In S95, the controller 130 reads the values in the S_Empty flag to determine whether the amount of the remaining ink is sufficient to continue and print an image on a sheet.

In S95, if the controller 130 determines that the S_Empty flag is on (S95: ON), in other words, if the remainder amount of the ink is insufficient to continue image printing, in S96, the controller 130 determines to hide the scale body 62 in the first object 251. In other words, the controller 130 may determine the quantity of the scale blocks in the scale body 62 to be displayed to be zero. Moreover, in S97, the controller 130 determines to hide the scale body 64 in the second object 252. In other words, the controller 130 may determine the quantity of the scale blocks in the scale body 64 to be displayed to be zero. In S98, the controller 130 determines to display the fifth object 255 including the cross-out mark (x). In S99, the controller 130 determines the twelfth object 262 to indicate the printable quantity to be zero. The objects determining process ends thereat.

In S95, if the controller 130 determines that the S_Empty flag is off (S95: OFF), in other words, if the amount of the remaining ink is sufficient to continue and print an image on a sheet, in S100, the controller determines the value from the liquid-level sensor 155. In other words, the controller 130 determines whether the ink in the cartridge 200 is exhausted.

In S100, if the controller 130 determines that the value from the liquid-level sensor 155 indicates the lower level (S100: L), in other words, if the ink in the cartridge 200 is not exhausted, in S101, the controller 130 conducts a first (third) object scale quantity determining process, which is described in the following paragraphs.

First (Third) Object Scale Quantity Determining Process

In the first (third) object scale quantity determining process shown in FIG. 9A, the controller 130 may determine a quantity of the scale block(s) in the first object 251 and the third object 253 based on the first remainder value determined as above.

In S61, the controller 130 reads the first remainder value and a fourth predetermined value. The fourth predetermined value is determined depending on a type of the cartridge 200 attached to the attachment case 150. In particular, the fourth predetermined value is equal to the first remainder value under a condition where the cartridge 200 is newly attached to the attachment case 150 while the liquid compartment 171 in the tank 160 contains no ink therein, and as the ink flows from the cartridge 200 to the tank 160 due to the effect of the hydraulic difference, the surface level of the ink in the cartridge 200 and the surface level of the tank 160 become equal. The cartridge 200 to be newly attached to the attachment case 150 should contain a predetermined initially filled amount of the ink, which may vary depending on the type of the cartridge 200. The fourth predetermined value may be prepared in advance and stored in, for example, the EEPROM 134. The controller 13 may read the type information concerning the cartridge 200 in the IC chip 247 and read the fourth predetermined value in the EEPROM 134 corresponding to the type information having been read. The EEPROM 134 may store a table, in which the fourth predetermined value and the type information are associated with each other.

In S62, the controller 130 determines a first remainder ratio. In particular, the first remainder value is divided by the fourth predetermined value and multiplied by 100 to determine the first remainder ratio (%).

In S63, the controller 130 determines a quantity of the scale block(s) in the first object 251 and the third object 253 based on the first remainder ratio determined in S62. For example, if the first remainder ratio is greater than or equal to 0 (zero) % and smaller than 5%, the controller 130 may determine the quantity of the scale block to be one (1); if the first remainder ratio is greater than or equal to 5% and smaller than 10%, the controller 130 may determine the quantity of the scale blocks to be two (2). Thus, the quantity of the scale blocks may be incremented by one (1) as the first remainder ratio increments for 5%. Meanwhile, if the first remainder ratio is 95% or greater, even if the first remainder ratio is greater than 100%, the quantity of the scale blocks may be fixed to 20.

The quantity of the scale blocks may be determined depending on the first remainder ratio calculated with reference to the fourth predetermined value so that an amount of the ink to be indicated by a single scale block should not vary. While the printer 10 has the tank 160 additionally to the cartridge 200, after the ink in the cartridge 200 is exhausted, the printer 10 may continue printing images using the ink remaining in the tank 160. Meanwhile, the user may exchange the exhausted cartridge 200 with a new cartridge 200 before the ink in the tank 160 is completely exhausted. Therefore, an initial total remainder value, which indicates a total amount of the ink remaining in the cartridge 200 and the tank 160 immediately after the exchange of the cartridges 200, may vary depending on the amount of the ink remaining in the tank 160 before the exchange. Accordingly, if the quantity of the scale blocks is based on the initial total remainder value, an amount of the ink to be indicated by a single scale block may vary. In this regard, if the quantity of the scale blocks in the first object 251 and the third object 253 is based on the fourth predetermined value, which is fixed, the amount of the ink to be indicated by the single scale block should stay constant without varying.

Thus, the quantity of the scale blocks in the first object 251 and the third object 253 may be determined on basis of the fourth predetermined value, while the quantity of the scale blocks may be fixed to 20 when the first remainder ratio is 95% or greater, so that the user may be prevented from being confused. If, for example, the quantity of the scale blocks is determined on basis of the initially filled amount for the cartridge 200, the quantity of the scale blocks may be lower than the maximum quantity, e.g., 20, after the exchange of the cartridges 200 when the ink in the new cartridge 200 flows into the tank 160. In other words, there may be a case where the scale bodies 62, 77 in the first and third objects 251, 253 may not indicate the maximum quantity, i.e., 20 scale blocks, even though no image is printed yet in the ink from the newly attached cartridge 200, and such a case may be confusing to the user. If, for another example, the quantity of the scale blocks in the first and third objects 251, 253 is determined to be 21 when the first remainder ratio is greater than or equal to 100% and smaller than 105%, the maximum quantity for the scale blocks may vary depending on the amount of the ink remaining in the tank 160 at the time when the cartridges 200 are exchanged, and the user may be confused by the variable maximum quantity of the scale blocks. In this regard, the quantity of the scale blocks in the first object 251 and the third object 253 may be determined on basis of the fourth predetermined value, while the quantity of the scale blocks may be fixed to 20 when the first remainder ratio is 95% or greater, so that the quantity of the scale blocks in the first and third objects 251, 253 may be 20 at the greatest at all time until an image is printed on a sheet after the exchange of the cartridges 200. Thus, the user may be prevented from the potential confusion.

Following S63, the first (third) object scale quantity determining process ends thereat, and the flow returns to S101 in the objects determining process (see FIG. 11). In S102, the controller 130 determines the quantity of the scale blocks in the second object 252 to be the maximum value, i.e., 20. In S103, the controller 130 conducts the printable quantity (ISO equivalent) determining process and ends the objects determining process.

As suggested in the above paragraphs, the first object 251 and the third object 253 should display the equal quantity of scale blocks. Therefore, a ratio of the quantity of the scale blocks to be displayed with respect to the maximum quantity (e.g., 20) for the scale blocks in the first object 251 is equal to a ratio of the quantity of the scale blocks to be displayed with respect to the maximum quantity (e.g., 20) for the scale blocks in the third object 253. In this regard, the first object 251 and the third object 253 are displayed in conjunction with each other.

Printable Quantity Determining Process

In the printable quantity determining process, based on the first remainder value and the second remainder value determined in the first-fourth updating processes (see FIGS. 8A-8D), a quantity to be indicated in the twelfth object 262 (see FIG. 14) may be determined.

In S81, as shown in FIG. 10, the controller 130 reads the IC chip 247 in the cartridge 200 for the type information of the cartridge 200. In S82, the controller 130 extracts a standard usage value for the cartridge 200 from the type information. The standard usage value indicates a quantity of sheets per unit amount of ink printable in the test method prescribed by ISO. The standard usage value may be prepared in advance in a table in association with the type information and stored in the EEPROM 134.

In S83, the controller 130 reads the first remainder value and the second remainder value in the RAM 133 and, in S84, the controller 130 adds the first remainder value and the second remainder value to calculate the total remainder value.

In S85, the controller 130 multiplies the total remainder value by the standard usage value to calculate the printable quantity (ISO equivalent). In S86, the controller 130 saves the printable quantity (ISO equivalent) in the RAM 133. The printable quantity determining process ends thereat. The flow returns the objects determining process (see FIG. 11).

In S100 in the objects determining process, if the controller 130 determines that the value from the liquid-level sensor 155 indicates the higher level (H) (S100: H), in other words, the ink in the cartridge 200 is exhausted, the flow proceeds to S104. In S104, the controller 130 determines to display no scale block in the scale body 62 in the first object 251 is to be displayed. In S105, the controller 130 determines to display the fourth object 254 and the fifth object 255, which may include the exclamation mark (!). The controller 130 conducts a second object scale quantity determining process in S106, which is described in the following paragraphs, and the printable quantity determining process in S107, which is the same process as the printable quantity determining process (ISO equivalent) in S103.

Second Object Scale Quantity Determining Process

In the second object scale quantity determining process (see FIG. 9B), a quantity of the scale blocks in the first object 252 may be determined on basis of the second remainder value determined in the fourth updating process (see FIG. 8D).

In S71, the controller 130 reads the second remainder value in the RAM 133 and the second predetermined value in the EEPROM 134. In S72, the controller 130 determines a second remainder ratio. In particular, the second remainder value is divided by the second predetermined value and multiplied by 100 to determine the second remainder ratio (%). The second predetermined value indicates an amount of the ink in the tank 160 when the ink in the cartridge 200 is exhausted and may be prepared in advance in the ROM 132.

In S73, the controller 130 determines a quantity of the scale block(s) in the second object 252 based on the second remainder ratio determined in S72. For example, if the second remainder ratio is greater than or equal to 0 (zero) % and smaller than 5%, the controller 130 may determine the quantity of the scale block to be one (1); if the second remainder ratio is greater than or equal to 5% and smaller than 10%, the controller 130 may determine the quantity of the scale blocks to be two (2). Thus, the quantity of the scale blocks may be incremented by one (1) as the second remainder ratio increments for 5%. Meanwhile, if the second remainder ratio is 95% or greater, the quantity of the scale blocks may be fixed to 20.

The controller 130 may control the display 28 to display the standby screen or the ink remainder indication screen, which contains the objects determined to be displayed in the objects determining process in FIG. 11. In this regard, the third object 253 and the fourth object 254 containing the exclamation mark (!), the sixth object 256 containing the cross-out mark (x), and the eighth object 258 containing the question mark (?), which may be displayed in the standby screen; and the first object 251, the fifth object 255 containing the exclamation mark (!), the seventh object 257 containing the cross-out mark (x), and the ninth object 259 containing the question mark (?), which are to be displayed in the ink remainder indication screen; are displayed in conjunction with one another, respectively. In this regard, the third object 253 to be displayed in the standby screen is in a form downsized compared to the first object 251 to be displayed in the ink remainder indication screen. When the fourth object 254 containing the exclamation mark (!) is displayed in the standby screen, the fifth object 255 containing the exclamation mark (!) is displayed as well in the ink remainder indication screen. When the sixth object 256 containing the cross-out mark (x) is displayed in the standby screen, the seventh object 257 containing the cross-out mark (x) is displayed as well in the ink remainder indication screen. When the eighth object 258 containing the question mark (?) is displayed in the standby screen, the ninth object 259 containing the question mark (?) is displayed as well in the ink remainder indication screen.

Moreover, the controller 130 conducts a screen selecting process, in which the controller 130 may determine whether the standby screen is to be displayed in the display 28 or the ink remainder indication screen is to be displayed in the display 28, as shown in FIG. 12 and described in the following paragraphs. The controller 130 may switch the screens in the display 28 from the standby screen to the ink remainder indication screen, or vice versa, automatically or in response to a tapping action on the third object 253 by the user.

Screen Selecting Process

In the screen selecting process as shown in FIG. 12, in S111, the controller 130 controls the display 28 to display the standby screen (see FIG. 13). In S112, the controller 130 determines whether the user tapped on the third object 253. If the user's tapping action on the third object 253 is detected (S112: YES), the controller 130 conducts the image forming process shown in FIG. 7 and one of the first through fourth updating processes shown in FIGS. 8A-8D. Thereafter, in S116, based on the determinations made in the objects determining process shown in FIG. 11, the controller 130 controls the display 28 to display the ink remainder indication screen (see FIG. 14) in place of the standby screen (see FIG. 13).

Meanwhile, if no tapping action on the third object 253 is detected (S112: NO), the controller 130 conducts the image forming process shown in FIG. 7 and one of the first through fourth updating processes shown in FIGS. 8A-8D. Thereafter, the controller determines, in S113, whether the fourth object 254 and the fifth object 255 including the exclamation mark (!) are to be displayed; in S114, whether the sixth object 256 and the seventh object 257 including the cross-out mark (x) are to be displayed, or in S115, whether the eighth object 258 and the ninth object 259 including the question mark (?) are to be displayed.

If the controller 130 determines one of conditions in S113, S114, and S115 is satisfied, in other words, if the controller 130 determines, in S113, that the fourth object and the fifth object 255 are to be displayed (S113: YES); in S114, that the sixth object 256 and the seventh object 257 are to be displayed; or in S115, that the eighth object 258 and the ninth object 259 are to be displayed (S115: YES), the controller 130 controls the display 28 so that the screens transit from the ink remainder indication screen (see FIG. 14) automatically to the standby screen (see FIG. 13) regardless of the user's action on the display 28.

Meanwhile, the controller 130 activates a timer counter, which is not shown, to count a time length from a point, when the ink remainder indication screen is displayed in the display 28. The controller 130 continues displaying the ink remainder indication screen in the display 28 (S117: NO) until the time length counted by the timer counter exceeds a predetermined threshold length stored in the EEPROM 134. When the controller 130 determines that the time length counted by the timer counter exceeds the threshold length (S117: YES), in S118, the controller 130 controls the display 28 to display the standby screen automatically to replace the ink remainder indication screen regardless of the user's action on the display 28.

While the controller 130 continues displaying the ink remainder indication screen (S117: NO), the controller 130 monitors whether the home button 19 is pressed by the user. The controller 130 may determine that the home button 19 was pressed if the operating signal from the home button 19 is input (S119: YES). In S118, the controller 130 controls the display 28 to display the standby screen automatically to replace the ink remainder indication screen. The screen selecting process ends thereat.

Meanwhile, if the controller 130 determines, in S112, that no tapping action on the third object 253 is detected (S112: NO); in S113, that the fourth object and the fifth object 255 are not to be displayed (S113: NO); in S114, that the sixth object 256 and the seventh object 257 are not to be displayed; and in S115, that the eighth object 258 and the ninth object 259 are not to be displayed (S115: NO), in S118, the controller 130 controls the display 28 to continuously display the standby screen (see FIG. 13). The screen selecting process ends thereat.

Benefits by the First Embodiment

According to the first embodiment, the first object 251, which indicates the amount of the ink remaining in the cartridge 200, and the second object 252, which indicates the amount of the ink remaining in the tank 160, may be displayed in the ink remainder indication screen, while the third object 253, which indicates the amount of the ink remaining in the cartridge 200 alone may be displayed in the standby screen. The user viewing the third object 253 displayed in the standby screen may recognize conditions of the ink in the cartridge 200, which include, for example, that the cartridge 200 contains a sufficient amount of the ink, that the amount of the ink in the cartridge 200 may be insufficient, and that the cartridge 200 exhausted the ink. The user recognizing the condition of the ink in the cartridge 200 may tap on the third object 253 to switch the screens in the display 28 from the standby screen to the ink remainder indication screen so that the user may view the detailed condition of the ink in the cartridge 200. Thus, with the third object 253 being displayed in the standby screen, the user may be guided to the ink remainder indication screen displaying the first object 251 and the second object 252 easily to recognize the remainder amount of the ink.

According to the first embodiment, the detailed condition of the ink remaining in the cartridge 200 is displayed in the ink remainder indication screen, which has the larger area size, while the limited information concerning the remainder ink is displayed in the smaller area in the standby screen. In other words, the standby screen may provide the limited but minimal information to the user, while the ink remainder indication screen may provide the more detailed information to the user.

According to the first embodiment, the scale body 62 in the first object 251 and the scale body 77 in the third object 253 change the forms (e.g., quantity of the scale blocks) thereof in conjunction with each other. Therefore, the user may recognize that the first object 251 and the third object 253 represent the same situation, i.e., the remainder amount of the ink in the cartridge 200, easily. In other words, the user may be restrained from being confused by a wrong idea that the first object 251 and the third object 253 may represent different situations.

According to the first embodiment, the fourth object 254 including, for example, the exclamation mark (!), may be displayed in the standby screen. Therefore, the user may recognize that the attention should be paid to the information concerning the ink remainder. The user finding the fourth object 254 in the standby screen may tap on the third object 253 to switch the screens in the display 28 from the standby screen to the ink remainder indication screen and may recognize the detailed condition of the ink remainder in the cartridge 200. In this regard, the fourth object 254 being displayed in the standby screen may prompt the user to find the detailed information concerning the ink remainder.

According to the first embodiment, the sixth object 256 including, for example, the cross-out mark (x), may be displayed in the standby screen. Therefore, the user may recognize that the attention should be paid to the information concerning the ink remainder. The user finding the sixth object 256 in the standby screen may tap on the third object 253 to switch the screens in the display 28 from the standby screen to the ink remainder indication screen and may recognize the detailed condition of the ink remainder in the cartridge 200. In this regard, the sixth object 256 being displayed in the standby screen may prompt the user to find the detailed information concerning the ink remainder.

According to the first embodiment, the fifth object 255 including, for example, the exclamation mark (!), may be displayed in the ink remainder indication screen. Therefore, the user may recognize that the cartridge 200 exhausted the ink. Meanwhile, the fifth object 255 in the ink remainder indication screen shows the symbol (i.e., the exclamation mark) identical to the symbol in the fourth object 254 in the standby screen. Therefore, the user having seen the fourth object 254 in the standby screen may easily recognize the connection between the fifth object 255 and the fourth object 254 and may adapt himself/herself to the transition of the screens from the standby screen to ink remainder indication screen without confusion.

According to the first embodiment, the seventh object 257 including, for example, the cross-out mark (x), may be displayed in the ink remainder indication screen. Therefore, the user may recognize that the cartridge 200 needs to be exchanged with a new cartridge 200 in order to continue printing. Meanwhile, the seventh object 257 in the ink remainder indication screen shows the symbol (i.e., the cross-out mark) identical to the symbol in the sixth object 256 in the standby screen. Therefore, the user having seen the sixth object 256 in the standby screen may easily recognize the connection between the seventh object 257 and the sixth object 256 and may adapt himself/herself to the transition of the screens from the standby screen to ink remainder indication screen without confusion.

According to the first embodiment, the eighth object 258 including, for example, the question mark (?), may be displayed in the standby screen when the unqualified cartridge 200 is attached to the attachment case 150 and the remainder amount of the ink in the cartridge 200 is not achievable. Therefore, the user may recognize that the unqualified cartridge 200 is being used, and the remainder amount of the ink in the cartridge 200 is not available. In this regard, the user may be prevented from misunderstanding that the remainder amount of the ink is not displayed due to a technical problem in the printer 10.

According to the first embodiment, the ninth object 259 including, for example, the question mark (?), may be displayed in the ink remainder indication screen when the unqualified cartridge 200 is attached to the attachment case 150 and the remainder amount of the ink in the cartridge 200 is not achievable. Therefore, the user may recognize that the unqualified cartridge 200 is being used, and the remainder amount of the ink in the cartridge 200 is not available. In this regard, the user may be prevented from misunderstanding that the remainder amount of the ink is not displayed due to a technical problem in the printer 10. Moreover, the ninth object 259 in the ink remainder indication screen shows the symbol (i.e., the question mark) identical to the symbol in the eighth object 258 in the standby screen. Therefore, the user having seen the eighth object 258 in the standby screen may easily recognize the connection between the ninth object 259 and the eighth object 258 and may adapt himself/herself to the transition of the screens from the standby screen to ink remainder indication screen without confusion.

According to the first embodiment, if the fourth object 254, the sixth object 256, or the eighth object 258 is determined to be displayed, or if image printing is completed, the screen in the display 28 may be switched from the standby screen to the ink remainder indication screen without the user's tapping action on the third object 253. In other words, the user' manual operation to switch the screens may be omitted. Meanwhile, when the ink remainder indication screen is displayed in the display 28 for a predetermined length of time, the screen in the display 28 may automatically return to the standby screen. In other words, the user' manual operation to switch the screens may be omitted.

According to the first embodiment, the quantity of the scale blocks in the first object 251 may be determined by the ratio of the first remainder value with respect to the fourth predetermined value. Therefore, an amount of the ink indicated by a single block in the scale body 62 in the first object 251 may stay constant without varying regardless of the amount of the ink remained in the tank 160 at the time of the cartridge exchange. Therefore, the user may recognize the remainder amount of the ink in the cartridge 200 without confusion.

According to the first embodiment, if the first remainder ratio is greater than or equal to 100%, the quantity of the scale blocks in the first object 251 may be fixed to the maximum value therefor, e.g., 20. Therefore, the first object 251 may contain the maximum quantity of the scale blocks, indicating the cartridge 200 being substantially full, until the ink remained in the tank 160 at the time of the cartridge exchange is consumed. In other words, the quantity of the scale blocks in the first object 251 may not vary depending on the amount of the ink remaining in the tank 160 at the time of the cartridge exchange. Thus, the user may grasp the remainder amount of the ink in the cartridge 200 without confusion.

According to the first embodiment, when the signals from the liquid-level sensor 155 change from the lower level (L) to the higher level (H), the quantity of the scale blocks in the first object 251 may be determined to be zero (0) regardless of the calculated first remainder value, which may contain an error being a difference from the actual remainder amount of the ink in the cartridge 200. Therefore, the error contained in the total discharged amount value based on the calculation may be eliminated, and a more approximate remainder amount of the ink in the cartridge 200 may be displayed.

According to the first embodiment, the quantity of the scale blocks in the second object 252 may be maintained at the maximum quantity without changing until the ink in the cartridge 200 is exhausted. Once the ink in the cartridge 200 is exhausted, the quantity of the scale blocks in the second object 252 may be reduced according to the amount of the ink consumed in the printer 10. Therefore, the user's attention may be effectively focused on the first object 251 rather than the second object 252 while the ink remains in the cartridge 200 and may be drawn to the second object 252 once the ink in the cartridge 200 is exhausted. Thus, the information concerning the remainder amount of the ink may be effectively delivered to the user.

According to the first embodiment, exhaustion of the ink in the cartridge 200 may be determined on basis of the level of the ink detected by the liquid-level sensor 155 rather than the discharged amount value, which is based on the calculation. Therefore, exhaustion of the ink in the cartridge 200 may be determined correctly.

According to the first embodiment, the third object 253 including four (4) third objects 253M, 253C, 253Y, 253Bk may be displayed in the standby screen. In this regard, compared to a standby screen, in which four (4) first objects 251M, 251C, 251Y, 251Bk and four (4) second objects 252M, 252C, 252Y, 252Bk are displayed, appearance of the standby screen may be simplified. Therefore, the user may recognize the remainder amounts of the inks more easily.

According to the first embodiment, while the printer 10 has the tank 160 additionally to the cartridge 200, after the ink in the cartridge 200 is exhausted, the printer 10 may continue printing images using the ink remaining in the tank 160. Meanwhile, the user may exchange the exhausted cartridge 200 with a new cartridge 200 before the tank 160 exhausts the ink.

Second Embodiment

The first embodiment described the example of the ink remainder indication screen, which contains the first object 251 indicating the remainder amount of the ink in the cartridge 200 and the second object 252 indicating the remainder amount of the ink in the tank 160. In the following paragraphs, described will be an ink remainder indication screen, which may contain the second object 252 but may not contain the first object 251.

The printer 10 according to the second embodiment may be in the same structure as the printer 10 described in the first embodiment. In the following description, items or structures in the printer 10 which are substantially the same as or similar to those described in the first embodiment may be denoted by the same reference signs, and description of those may be omitted.

The display 28 in the printer 10 may display the standby screen as described in the first embodiment. Meanwhile the display 28 may display an ink remainder indication screen as shown in FIG. 17 in place of the ink remainder indication screen (see, for example, FIG. 14) described in the first embodiment.

Ink Remainder Indication Screen

The ink remainder indication screen includes, as shown in FIG. 17, a tenth object 260M containing a letter M for magenta, a tenth object 260C containing a letter C for cyan, a tenth object 260Y containing a letter Y for yellow, and a tenth object 260Bk containing letters Bk for black. Meanwhile, the tenth object 260 may not necessarily contain the letters M, C, Y, or Bk but may contain, for example, signs, characters, or figures, as long as the objects represent the colors of magenta, cyan, yellow, and black.

The ink remainder indication screen further includes a thirteenth object 263, which includes a thirteenth object 263M for magenta, a thirteenth object 263C for cyan, a thirteenth object 263Y for yellow, and a thirteenth object 263Bk for black. The thirteenth object 263 indicates a remainder amount being an amount of the ink stored in the tank 160. The thirteenth object 263 is located at a lower position with respect to the tenth object 260. The tenth object 260 indicates a color of the ink corresponding to the thirteenth object 263 located at the lower position thereof.

The thirteenth object 263 includes a frame 65, which has a rectangular shape elongated in the perpendicular direction 71, and a scale body 66, of which length corresponds to the remainder amount of the ink in the tank 160. The scale body 66 may not be displayed when the remainder amount in the tank 160 is zero (0), i.e., none. In other words, when the remainder amount of the ink in the tank 160 is zero, the thirteenth object 263 solely includes the frame 65. When the remainder amount of the ink in the tank 160 is greater than zero, the thirteenth object 263 includes the frame 65 and the scale body 66, in which a quantity of scale blocks corresponds to the remainder amount of the ink in the tank 160. In this regard, the thirteenth object 263 may include a plurality of forms to express the remainder amount of the ink in the tank 160.

The ink remainder indication screen may include a fifth object 255, which is displayed under a certain condition. The fifth object 255 may include, but not necessarily be limited to, an exclamation mark (!), similarly to the fourth object 254 described earlier in the first embodiment. The fifth object 255 may be displayed over the frame 65 of the thirteenth object 263, when the quantity of the scale blocks is not the maximum quantity. In the example shown in FIG. 17, the fifth object 255 is displayed over the frame 65 of the thirteenth object 263C for the cyan ink. The fifth object 255 may cause the user to intuitively recognize that the ink in the cartridge 200 is exhausted. The fifth object 255 may not necessarily be the same mark as the fourth object 254 but may be in a sign, a character, or a figure different from the fourth object 254.

The ink remainder indication screen may include a seventh object 257, which is displayed under a certain condition. The seventh object 257 may include, but not necessarily be limited to, a cross-out mark (x), similarly to the sixth object 256 described earlier in the first embodiment. The seventh object 257 may be displayed over the frame 65 of the thirteenth object 263 corresponding to the cartridge 200, which exhausted the ink therein. In the example shown in FIG. 17, the seventh object 257 is displayed over the frame 65 of the thirteenth object 263Y for the yellow ink. The seventh object 257 may cause the user to intuitively recognize that image printing may not be continued unless the cartridge 200 is exchanged with a new cartridge 200. The seventh object 257 may not necessarily be the same mark as the sixth object 256 but may be in a sign, a character, or a figure different from the sixth object 256.

The ink remainder indication screen may include, as shown in FIG. 18, a ninth object 259, which is displayed under a certain condition. The ninth object 259 may include, but not necessarily be limited to, a question mark (?), similarly to the eighth object 258 described earlier in the first embodiment. The ninth object 257 may be displayed over the frame 65 of the thirteenth object 263 corresponding to the cartridge 200, of which type is unidentifiable. In the example shown in FIG. 18, the ninth object 259 is displayed over the frame 65 of the thirteenth object 263C for the cyan ink and the frame 65 of the thirteenth object 263Y for the yellow ink. The ninth object 259 may cause the user to recognize that a cartridge 200 unqualified for the printer 10 is attached to the attachment case 150, and no remainder amount of the ink in the cartridge 200 is displayable. The ninth object 259 may not necessarily be the same mark as the eighth object 258 but may be in a sign, a character, or a figure different from the eighth object 258.

The ink remainder indication screen includes an eleventh object 261 and a twelfth object 262. The eleventh object 261 includes a character string "Printable quantity (ISO equivalent)." The twelfth object 262 may contain a numeric sign indicating a printable quantity and is located at a lower position with respect to the thirteenth object 263. The twelfth object 262 includes twelfth objects 262M, 262C, 262Y, 262Bk for magenta, cyan, yellow, and black, respectively. The twelfth object 261 may not necessarily contain a numeric sign but may contain a character, a figure, or a sign other than a numeric sign as long as the twelfth object 261 indicates the printable quantity.

The printable quantity (ISO equivalent) indicates a quantity of sheets printable in a current amount of the ink if images are hypothetically printed in a test method compliant with requirements prescribed by International Organization for Standardization (ISO).

The twelfth object 262M is located to be lower than the eleventh object 261M and lower than the tenth object 260M for magenta. The twelfth object 262M indicates a quantity of sheets printable by the remainder amount of the magenta ink in the cartridge 200 and the tank 160. In the example shown in FIG. 17, the twelfth object 262M indicates a quantity "700," which suggests that image printing on 700 sheets is presumed to be possible.

The twelfth object 262C is located to be lower than the eleventh object 261C and lower than the tenth object 260C for cyan. The twelfth object 262C indicates a quantity of sheets printable by the remainder amount of the cyan ink in the cartridge 200 and the tank 160. In the example shown in FIG. 17, the twelfth object 262C indicates a quantity "150," which suggests that image printing on 150 sheets is presumed to be possible.

The twelfth object 262Y is located to be lower than the eleventh object 261Y and lower than the tenth object 260Y for yellow. The twelfth object 262Y indicates a quantity of sheets printable by the remainder amount of the yellow ink in the cartridge 200 and the tank 160. In the example shown in FIG. 17, the twelfth object 262Y indicates a quantity "0," which suggests that image printing on no sheet is presumed to be possible.

The twelfth object 262Bk is located to be lower than the eleventh object 261Bk and lower than the tenth object 260Bk for black. The twelfth object 262Bk indicates a quantity of sheets printable by the remainder amount of the black ink in the cartridge 200 and the tank 160. In the example shown in FIG. 17, the twelfth object 262Bk indicates a quantity "2300," which suggests that image printing on 2300 sheets is presumed to be possible.

The quantity in the twelfth object 262 varies depending on the remainder amount of the ink in the cartridge 200 and the tank 160. Meanwhile, if the cartridge 200 unqualified for the printer 10 is attached to the attachment case 150, no remainder amount of the ink in the cartridge 200 may be displayable. Therefore, as shown in FIG. 18, while the ninth object 259 is displayed over the frame 65 of the thirteenth object 263C for the cyan ink and the frame 65 of the thirteenth object 263Y for the yellow ink, the twelfth objects 262C, 262Y may be left blank to express that no remainder amount of the ink in the cartridges 200 for the cyan ink and the yellow ink is displayable.

A first display area dimension S1 (see FIG. 17), which is a size of a first displayable area being a displayable area in the ink remainder indication screen, is greater than the second display area dimension S2, (see FIG. 13) which is a size of a second displayable area being a displayable area to display the third object 253 in the standby screen. In other words, in the second displayable area, of which size is smaller, the remainder amount of the ink in the cartridge 200 may be displayed, whereas in the first displayable area, of which size is greater, the remainder amount of the ink in the tank 160 and the printable quantity (ISO equivalent) may be displayed. In the example shown in FIGS. 13 and 17, the first displayable area dimension S1 in the ink remainder indication screen is approximately 30 times as large as the second displayable area dimension S2 in the standby screen.

The controller 130 in the printer 10 in the second embodiment may conducts the image forming process (see FIG. 7) and the first through fourth updating processes (see FIGS. 8A-8D), which may be identical to those described in the first embodiment. Meanwhile, the controller 130 in the printer 10 in the second embodiment may conduct an objects determining process described in the following paragraphs and shown in FIG. 19.

Objects Determining Process

In the objects determining process shown in FIG. 19, in S91, the controller 130 determines whether the cartridge 200 currently attached to the attachment case 150 is a qualified cartridge 200. For example, the controller 130 may attempt to access the IC chip 247 and obtain a predetermined part of information in the type information. The controller 130 may determine that the cartridge 200 is qualified if the controller 130 was able to access the IC chip 247 and obtain the information from the IC chip 247. On the other hand, the controller 130 may determine that the cartridge is unqualified if the controller 130 fails to access the IC chip 247 or obtain the information from the IC chip 247. If the controller 130 determines that the cartridge 200 is an unqualified cartridge (S91: NO), in S92, the controller 130 determines that the eighth object 258, e.g., the question mark (?), and the ninth object 259 are to be displayed.

In S131, the controller 130 determines that the scale body 66 in the thirteenth object 263, the scale body 77 in the third object 253, the fourth object 254 and the fifth object 255 including the exclamation mark (!), and the sixth object 256 and the seventh object 257 including the cross-out mark (x) are not to be displayed but to be hidden. The objects determining process ends thereat.

On the other hand, in S91, if the controller 130 determines that the cartridge 200 is qualified (S91: YES), in S94, the controller 130 reads the first remainder value and the second remainder value updated and stored in the RAM 133. In S95, the controller 130 reads the values in the S_Empty flag to determine whether the amount of the remaining ink is sufficient to continue and print an image on a sheet.

In S95, if the controller 130 determines that the S_Empty flag is on (S95: ON), in other words, if the remainder amount of the ink is insufficient to continue printing, in S132, the controller 130 determines to hide the scale body 77 in the third object 253. In other words, the controller 130 may determine the quantity of the scale blocks in the scale body 77 to be displayed to be zero. Moreover, in S133, the controller 130 determines to hide the scale body 66 in the thirteenth object 263. In other words, the controller 130 may determine the quantity of the scale blocks in the scale body 66 to be displayed to be zero. In S98, the controller 130 determines to display the fifth object 255 including the cross-out mark (x). In S99, the controller 130 determines the twelfth object 262 to indicate the printable quantity to be zero. The objects determining process ends thereat.

In S95, if the controller 130 determines that the S_Empty flag is off (S95: OFF), in other words, if the amount of the remaining ink is sufficient to continue and print an image on a sheet, in S100, the controller determines the value from the liquid-level sensor 155. In other words, the controller 130 determines whether the ink in the cartridge 200 is exhausted.

In S100, if the controller 130 determines that the value from the liquid-level sensor 155 indicates the lower level (L) (S100: L), in other words, if the ink in the cartridge 200 is not exhausted, in S134, the controller 130 executes a third object scale quantity determining process.

Third Object Scale Quantity Determining Process

In the third object scale quantity determining process, the controller 130 may determine a quantity of the scale block(s) in the third object 253 based on the first remainder value. The third object scale quantity determining process may be similar to the first (third) object scale quantity determining process in S101 (see FIG. 11 and FIG. 9A) described earlier in the first embodiment but is different from the first (third) object scale quantity determining process in that the quantity of the scale block(s) in the third object 253 alone may be determined. Following the third object scale quantity determining process in S134, the flow proceeds to S135 in FIG. 19.

In S135, the controller 130 determines the quantity of the scale blocks in the thirteenth object 263 to be the maximum value, i.e., 20. In S103, the controller 130 conducts the printable quantity (ISO equivalent) determining process described earlier in the first embodiment and ends the objects determining process.

In S100, if the controller 130 determines that the value from the liquid-level sensor 155 indicates the higher level (H) (S100: H), in other words, the ink in the cartridge 200 is exhausted, the flow proceeds to S136. In S136, the controller 130 determines to display no scale block in the scale body 77 in the third object 253 is to be displayed. In S105, the controller 130 determines to display the fourth object 254 and the fifth object 255, which may include the exclamation mark (!). The controller 130 conducts a thirteenth object scale quantity determining process in S137, which may be similar to the second object scale quantity determining process in S106 (see FIG. 11) and is described in the following paragraphs with reference to FIG. 9D.

Thirteenth Object Scale Quantity Determining Process

In the thirteenth object scale quantity determining process, a quantity of the scale blocks in the thirteenth object 263 may be determined on basis of the second remainder value determined in the fourth updating process (see FIG. 8D).

In S71, the controller 130 reads the second remainder value in the RAM 133 and the second predetermined value in the EEPROM 134. In S72, the controller 130 determines a second remainder ratio. In particular, the second remainder value is divided by the second predetermined value and multiplied by 100 to determine the second remainder ratio (%). The second predetermined value indicates an amount of the ink in the tank 160 when the tank 160 exhausts the ink therein and may be prepared in advance in the ROM 132.

In S74, the controller 130 determines a quantity of the scale block(s) in the thirteenth object 263 based on the second remainder ratio determined in S72. For example, if the second remainder ratio is greater than or equal to 0 (zero) % and smaller than 5%, the controller 130 may determine the quantity of the scale block to be one (1); if the second remainder ratio is greater than or equal to 5% and smaller than 10%, the controller 130 may determine the quantity of the scale blocks to be two (2). Thus, the quantity of the scale blocks may be incremented by one (1) as the second remainder ratio increments for 5%. Meanwhile, if the second remainder ratio is 95% or greater, the quantity of the scale blocks may be fixed to 20. Following the thirteenth object scale quantity determining process in S137, the flow proceeds to S107 in FIG. 19. In S107, the controller 130 conducts the printable quantity (ISO equivalent) determining process, which is similar to the printable quantity (ISO equivalent) determining process in S103 described earlier and ends the objects determining process.

Meanwhile, the controller 130 conducts the screen selecting process (see FIG. 12), which is similar to that described earlier in the first embodiment.

Benefits by the Second Embodiment

According to the second embodiment, with regard to the configuration identical to the configuration of the printer 10 in the first embodiment, the benefits achievable by the first embodiment may be similarly achievable.

Additionally, according to the second embodiment, the thirteenth object 263, which indicates the amount of the ink remaining in the tank 160, may be displayed in the ink remainder indication screen, while the third object 253, which indicates the amount of the ink remaining in the cartridge 200 may be displayed in the standby screen. The user viewing the third object 253 displayed in the standby screen may recognize conditions of the ink in the cartridge 200, which include, for example, that the cartridge 200 contains a sufficient amount of the ink, that the amount of the ink in the cartridge 200 may be insufficient, and that the cartridge 200 exhausted the ink. The user recognizing the condition of the ink in the cartridge 200 may tap on the third object 253 to switch the screens in the display 28 from the standby screen to the ink remainder indication screen so that the user may view the detailed condition of the ink in the printer 160. Thus, with the third object 253 being displayed in the standby screen, the user may be guided to the ink remainder indication screen displaying the thirteenth object 263 easily to recognize the remainder amount of the ink.

According to the second embodiment, the detailed condition of the ink remaining in the tank 160 is displayed in the ink remainder indication screen, which is larger in the area dimension, while the limited information concerning the remainder ink is displayed in the smaller area in the standby screen. In other words, the standby screen may provide the limited but minimal information to the user, while the ink remainder indication screen may provide the more detailed information to the user.

First Modified Example

In the first and second embodiments described above, the third object 253 in the standby screen may indicate the remainder amount of the ink in the cartridge 200. Meanwhile, the third object 253 in the standby screen may not necessarily indicate the remainder amount of the ink in the cartridge 200 but may indicate the remainder amount of the ink in the tank 160, as shown in FIG. 16A. In this regard, the third object 253 may change the form thereof in conjunction with the second object 252 described in the first embodiment or with the thirteenth object 263 described in the second embodiment. In other words, the third object 253 may contain the scale block(s), of which quantity is equal to the quantity of the scale block(s) in the second object 252 or the thirteenth object 263.

Moreover, the fourth object 254 including, for example, the exclamation mark (!), may be laid over the third object 253 when the ink in the cartridge 200 is exhausted. Further, the sixth object 256 including, for example, the cross-out mark (x), may be laid over the third object 253 when the ink in the tank 160 is exhausted. Moreover, the eighth object 258 including, for example, the question mark (?), may be displayed in the display 28 when an unqualified cartridge 200 is attached to the attachment case 150.

Benefits by the First Modified Example

According to the first modified example, the first object 251, which indicates the amount of the ink remaining in the cartridge 200, and the second object 252, which indicates the amount of the ink remaining in the tank 160, may be displayed in the ink remainder indication screen, while the third object 253, which indicates the amount of the ink remaining in the tank 160 may be displayed in the standby screen. The user viewing the third object 253 displayed in the standby screen may recognize conditions of the ink in the tank 160, which include, for example, that the tank 160 contains a sufficient amount of the ink, that the amount of the ink in the tank 160 may be insufficient, and that the tank 160 exhausted the ink. The user recognizing the condition of the ink in the tank 160 may tap on the third object 253 to switch the screens in the display 28 from the standby screen to the ink remainder indication screen so that the user may view the detailed condition of the ink in the cartridge 200 and in the tank 160. Thus, with the third object 253 being displayed in the standby screen, the user may be guided to the ink remainder indication screen displaying the first object 251 and the second object 252 easily to recognize the remainder amount of the ink easily.

According to the first modified example, the fourth object 254 including, for example, the exclamation mark (!), may be laid over the third object 253 so that the user may recognize that the ink in the cartridge 200 is exhausted.

Second Modified Example

In the first and second embodiments described above, the third object 253 in the standby screen may indicate the remainder amount of the ink in the cartridge 200. Meanwhile, the third object 253 in the standby screen may not necessarily indicate the remainder amount of the ink in the cartridge 200 but may indicate the total remainder amount of the ink in the cartridge 200 and the tank 160, as shown in FIG. 16B.

The controller 130 may conduct a third object scale quantity determining process, as shown in FIG. 9C to determine a quantity of the scale blocks in the third object 253.

In S121, the controller 130 reads the first remainder value and the second remainder value in the RAM 133 and the initially filled amount value in the EEPROM 134. In S122, the controller 130 determines a total remainder ratio. In particular, the first remainder value and the second remainder value are summed to calculate the total remainder value, and the total remainder value is divided by the initially filled amount value and multiplied by 100 to determine the total remainder ratio (%).

In S123, the controller 130 determines a quantity of the scale block(s) in the third object 253 based on the total remainder ratio determined in S122. For example, if the total remainder ratio is greater than or equal to 0 (zero) % and smaller than 5%, the controller 130 may determine the quantity of the scale block to be one (1); if the total remainder ratio is greater than or equal to 5% and smaller than 10%, the controller 130 may determine the quantity of the scale blocks to be two (2). Thus, the quantity of the scale blocks may be incremented by one (1) as the total remainder ratio increments for 5%. Meanwhile, if the total remainder ratio is 95% or greater, the quantity of the scale blocks may be fixed to 20.

Moreover, the fourth object 254 including, for example, the exclamation mark (!), may be laid over the third object 253 when the ink in the cartridge 200 is exhausted. Further, the sixth object 256 including, for example, the cross-out mark (x), may be laid over the third object 253 when the ink in the tank 160 is exhausted. Moreover, the eighth object 258 including, for example, the question mark (?), may be displayed in the display 28 when an unqualified cartridge 200 is attached to the attachment case 150.

Benefits by the Second Modified Example

According to the second modified example, the first object 251, which indicates the amount of the ink remaining in the cartridge 200, and the second object 252, which indicates the amount of the ink remaining in the tank 160, may be displayed in the ink remainder indication screen, while the third object 253, which indicates the total amount of the ink remaining in the cartridge 200 and the tank 160 may be displayed in the standby screen. The user viewing the third object 253 displayed in the standby screen may recognize conditions of the ink in the cartridge 200 and the tank 160, which include, for example, that the printer 10 is loaded with a sufficient amount of the ink, that the amount of the ink in the printer 10 may be insufficient, and that the printer 10 exhausted the ink. The user recognizing the condition of the ink in the printer 10 may tap on the third object 253 to switch the screens in the display 28 from the standby screen to the ink remainder indication screen so that the user may view the detailed condition of the ink in the cartridge 200 and in the tank 160. Thus, with the third object 253 being displayed in the standby screen, the user may be guided to the ink remainder indication screen displaying the first object 251 and the second object 252 easily to recognize the remainder amount of the ink.

According to the second modified example, the fourth object 254 including, for example, the exclamation mark (!), may be laid over the third object 253 so that the user may recognize that the ink in the cartridge 200 is exhausted.

More Examples

Although examples of carrying out the invention has been described, those skilled in the art will appreciate that there are numerous variations and permutations of the image forming apparatus and the computer-readable storage medium that fall within the spirit and scope of the invention as set forth in the appended claims.

For example, the colorant to be used to form images on sheets in the printer 10 may not necessarily be limited to ink, but may be, for example, toner.

For another example, the ink in the cartridge 200 may not necessarily be conveyed to the tank 160 by the effect of the hydraulic difference but may be conveyed by, for example, the effect of gravity or a driving mechanism such as a pump. When the ink is to be conveyed from the cartridge 200 to the tank by the driving mechanism, the tank may be mounted on, for example, the head 21.

For another example, the printer 10 may not necessarily be equipped with both the cartridge 200 and the tank 160 but may be equipped with the tank 160 alone or the cartridge 200 alone. If, for example, the printer 10 is equipped with the tank 160 alone, a remainder amount of the ink remaining in the tank 160 when the signals from the liquid-level sensor 155 shifts from the lower level (L) to the higher level (H) may be determined to be the initially filled amount. For another example, the initially filled amount value may be manually input by the user in the controller 130 when the user loads the ink in the tank 160. The controller 130 may calculate the second remainder value based on the initially filled amount value and the total discharged amount value and display the printable quantity calculated on the ISO equivalent basis or the consumption basis.

For another example, the scale bodies 62, 64, 77, 66 in the first, second, third, and thirteenth objects 251, 252, 253, 263 may not necessarily change the forms thereof stepwise in blocks but may change the forms thereof gradually without blocks. In other words, the first object 251 and the third object 253 may increase or reduce the size thereof depending on the first remainder value, and the second object 252 and the thirteenth object 263 may increase or reduce the size thereof depending on the second remainder value. For another example, the quantity of the scale blocks may not necessarily be limited to 20 but may be, for example, 10 or 5 as long as the scale body includes a plurality of scale blocks.

For another example, the shapes of the first object 251, the second object 252, and the third object 253 may not necessarily be limited to the rectangles elongated in the perpendicular direction 71 but may be in other shapes, including, for example, circles.

For another example, the screen in the display 28 may not necessarily be switched from the standby screen to the ink remainder indication screen automatically regardless of the user's manual operation to the display 28 when image printing is completed, the ink in the cartridge 200 is exhausted, the ink in the tank 160 is exhausted, or an unqualified cartridge 200 is attached to the attachment case 150, but the screens in the display 28 may be switched solely depending on the user's operation, such as the tapping action on the third object 253.

For another example, in the screen selecting process (see FIG. 12) in the first embodiment, the screen in the display 28 is switched from the standby screen to the ink remainder screen automatically regardless of the user's manual operation to the display 28 when the fourth and fifth objects 254, 255 including the exclamation mark (!) are determined to be displayed (S113), when the sixth and seventh objects 256, 257 including the cross-out mark (x) are determined to be displayed (S114), or when the eighth and ninth objects 258, 259 including the question mark (?) are determined to be displayed (S115). However, the screen in the display 28 may be switched from the standby screen to the ink remainder indication screen automatically when the image forming process (see FIG. 7) is conducted in place of the steps 113-S115. In other words, the controller 130 may switch the screens in the display 28 from the standby screen to the ink remainder indication screen automatically when image printing is conducted. When image printing is activated, the controller 130 may switch the screens from the standby screen to the ink remainder indication screen automatically each time a remainder amount of the ink is updated. Thereby, the user may recognize the detailed transition of the ink remainder amount.

What is claimed is:

1. An image forming apparatus, comprising:
    a first cartridge configured to store first ink;
    a first tank configured to receive the first ink from the first cartridge and to store the first ink therein;
    a head configured to discharge the first ink;
    a carriage on which the head is mounted;
    a display;
    a touch sensor configured to be laid over the display; and
    a controller
    configured to cause the display to display a first screen including an object and a second screen thereon,
        wherein the first screen is different from the second screen,
        wherein the second screen includes a first rectangle and a second rectangle,
        wherein the first rectangle indicates an amount of the first ink in the first cartridge,
        wherein the second rectangle indicates an amount of the first ink in the first tank,
        wherein the first rectangle has a first area and the second rectangle has a second area,
        wherein the first area becomes smaller in response to decreasing of the amount of the first ink in the first cartridge,
        wherein the second area becomes smaller in response to decreasing of the amount of the first ink in the first tank,
        wherein the touch sensor is configured to detect that the object on the first screen was touched and output information which indicates that the object was touched,
        wherein the controller is further configured to:
            determine whether the controller received the information which indicates that the object was touched; and
            cause the display to transit from the first screen to the second screen when the controller received the information which indicates that the object was touched.

2. The image forming apparatus according to claim 1, wherein the controller is further configured to cause the display to interchangeably display the first screen and the second screen thereon.

3. The image forming apparatus according to claim 1, wherein the object indicates the amount of the first ink.

4. The image forming apparatus according to claim 1, wherein the controller is further configured to:
    determine whether a time length counted by a timer counter exceeds a predetermined threshold length, and
    cause the display to transit from the second screen to the first screen when the time length counted by the timer counter exceeds the predetermined threshold length.

5. The image forming apparatus according to claim 1, further comprising a button;
    wherein the controller is further configured to cause the display to transit from the second screen to the first screen when the button is pressed.

6. The image forming apparatus according to claim 1, wherein the first rectangle and the second rectangle are arranged along a first direction.

7. The image forming apparatus according to claim 6, wherein the first rectangle has a first side extending along the first direction and a second side extending perpendicularly to the first direction.

8. The image forming apparatus according to claim 7, wherein the first side is longer than the second side.

9. The image forming apparatus according to claim 1, wherein the first area is larger than the second area when the first cartridge is full and the first tank is full.

10. The image forming apparatus according to claim 1, wherein the first rectangle is spaced from the second rectangle.

11. The image forming apparatus according to claim 1, wherein the controller is further configured to cause the display to display a first mark thereon when the first ink in the first cartridge has been exhausted.

12. The image forming apparatus according to claim 11, wherein the first mark is an exclamation mark.

13. The image forming apparatus according to claim 12, wherein the controller is further configured to cause the display to display a second mark thereon when the first ink in both the first cartridge and the first tank has been exhausted.

14. The image forming apparatus according to claim 13, wherein the second mark is a cross-out mark.

15. The image forming apparatus according to the claim 1,
wherein the controller is further configured to cause the display to display a first mark and a second mark thereon.

16. The image forming apparatus according to claim 15,
wherein the first mark is displayed when the first ink in the first cartridge has been exhausted,
wherein the second mark is displayed when the first ink in both the first cartridge and the first tank has been exhausted,
wherein the first mark has a first shape and the second mark has a second shape, and
wherein the first shape is different from the second shape.

17. The image forming apparatus according to claim 15, wherein the first mark overlaps with the first rectangle and the second mark overlaps with the first rectangle and the second rectangle.

18. The image forming apparatus according to claim 1, further comprising:

a second cartridge configured to store second ink, wherein the first ink has a first color and the second ink has a second color which is different from the first color; and
a second tank configured to receive the second ink from the second cartridge and to store the second color ink therein,
wherein the head is configured to receive the second ink from the second tank and to discharge the second ink,
wherein first cartridge has a first ink storable capacity and the second cartridge has a second ink storable capacity, and the first ink storable capacity is greater than the second ink storable capacity,
wherein the controller is further configured to cause the display to display a third rectangle and a fourth rectangle together with the first rectangle and the second rectangle thereon, the third rectangle indicating an amount of the second ink in the second cartridge and the fourth rectangle indicating an amount of the second ink in the second tank,
wherein the third rectangle has a third area and the fourth rectangle has a fourth area,
wherein the third area is larger than the fourth area, and
wherein the first area is larger than the third area.

19. The image forming apparatus according to claim 1,
wherein the first area has a first side extending along a first direction and a second side extending along a second direction perpendicular to the first direction,
wherein the second area has a third side extending along the first direction and a fourth side extending along the second direction,
wherein the first side becomes shorter while the second side does not become shorter when the first area becomes smaller in response to decreasing of the amount of the first ink in the first cartridge, and
wherein the third side becomes shorter while the fourth side does not become shorter when the second area becomes smaller in response to decreasing of the amount of the first ink in the first tank.

20. The image forming apparatus according to claim 19,
wherein the first side is longer than the second side,
wherein the third side is longer than the fourth side, and
wherein the first side is longer than the third side in the first direction.

* * * * *